United States Patent [19]

Sato et al.

[11] Patent Number: 5,371,561
[45] Date of Patent: Dec. 6, 1994

[54] DATA PRINTING APPARATUS

[75] Inventors: Yuta Sato; Minoru Matsuzaki, both of Tokyo; Masaharu Hamada, Okaya; Junichi Itoh; Yuji Imai, both of Tokyo, all of Japan

[73] Assignee: Olympus Optical Co., Ltd., Tokyo, Japan

[21] Appl. No.: 866,151

[22] Filed: Apr. 9, 1992

[30] Foreign Application Priority Data

Apr. 15, 1991 [JP] Japan ................ 3-111064
Mar. 24, 1992 [JP] Japan ................ 4-066255

[51] Int. Cl.$^5$ ................................ G03B 17/24
[52] U.S. Cl. ................................ 354/105; 355/40
[58] Field of Search .............. 355/40, 41, 43; 354/105, 106; 352/92

[56] References Cited

U.S. PATENT DOCUMENTS

| | | | |
|---|---|---|---|
| 4,508,438 | 4/1985 | Kanaoka et al. | 355/40 |
| 4,544,259 | 10/1985 | Kanaoka et al. | 355/40 |
| 4,548,492 | 10/1985 | Kanaoka et al. | 352/92 |
| 4,553,833 | 11/1985 | Kanaoka et al. | 355/40 |
| 4,705,372 | 11/1987 | Lapeyre | 354/106 |
| 4,864,149 | 9/1989 | Matsumoto | 355/41 |
| 5,023,637 | 6/1991 | Lorton et al. | 354/106 |
| 5,093,682 | 3/1992 | Hicks | 355/40 |
| 5,128,702 | 7/1992 | Ogawa et al. | 354/106 |
| 5,155,513 | 10/1992 | Matsumura et al. | 354/106 |

FOREIGN PATENT DOCUMENTS

| | | |
|---|---|---|
| 55-2608 | 1/1980 | Japan . |
| 55-57836 | 4/1980 | Japan . |
| 57-55131 | 11/1982 | Japan . |
| 60-166937 | 8/1985 | Japan . |
| 60-166938 | 8/1985 | Japan . |
| 3-233540 | 10/1991 | Japan . |

Primary Examiner—Monroe H. Hayes
Attorney, Agent, or Firm—Frishauf, Holtz, Goodman & Woodward

[57] ABSTRACT

A data printing apparatus of this invention controls the emission timing or the emission interval of a light-emitting means on the basis of a signal according to traveling of a sheet film along a traveling path so as to print data free from blurring of characters or a variation in interval between characters on the sheet film having no perforations. After an exposure operation is ended, the apparatus feeds the sheet film from an exposure position along a spool wall. Light corresponding to digital numerals representing a date is emitted by light-emitting elements, and the date to be printed by the light-emitting elements is focused on the sheet film by an optical system. The date on the sheet film is printed during traveling of the sheet film along the spool wall. The apparatus also includes a photoreflector, arranged in a traveling chamber of the film, for detecting an emulsion portion on which an object image from a photographing lens is exposed, and the remaining frame portion on the basis of a difference in reflectance, and a timer for measuring a moving time from when the frame portion is detected by the photoreflector until the emulsion portion is detected thereby, and controls the emission timings of the light-emitting elements on the basis of the moving time.

27 Claims, 40 Drawing Sheets

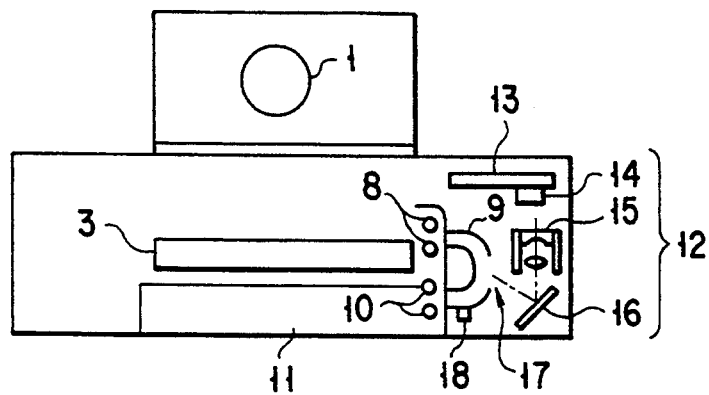
F I G. 1
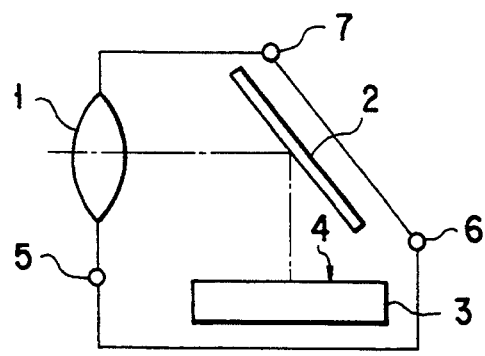
F I G. 2A
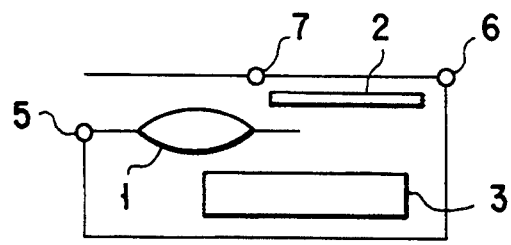
F I G. 2B

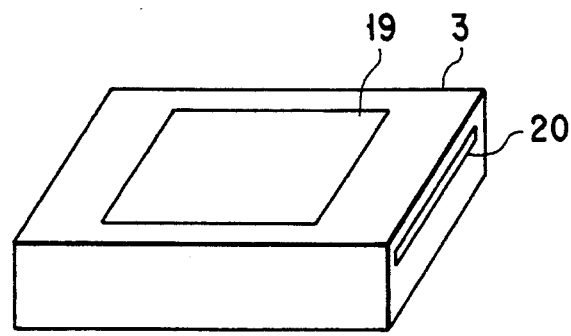
F I G. 3
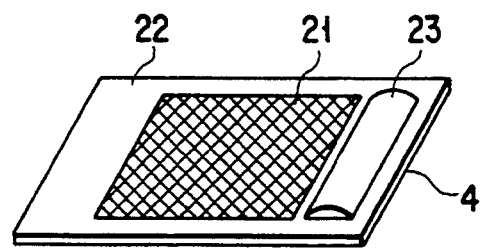
F I G. 4
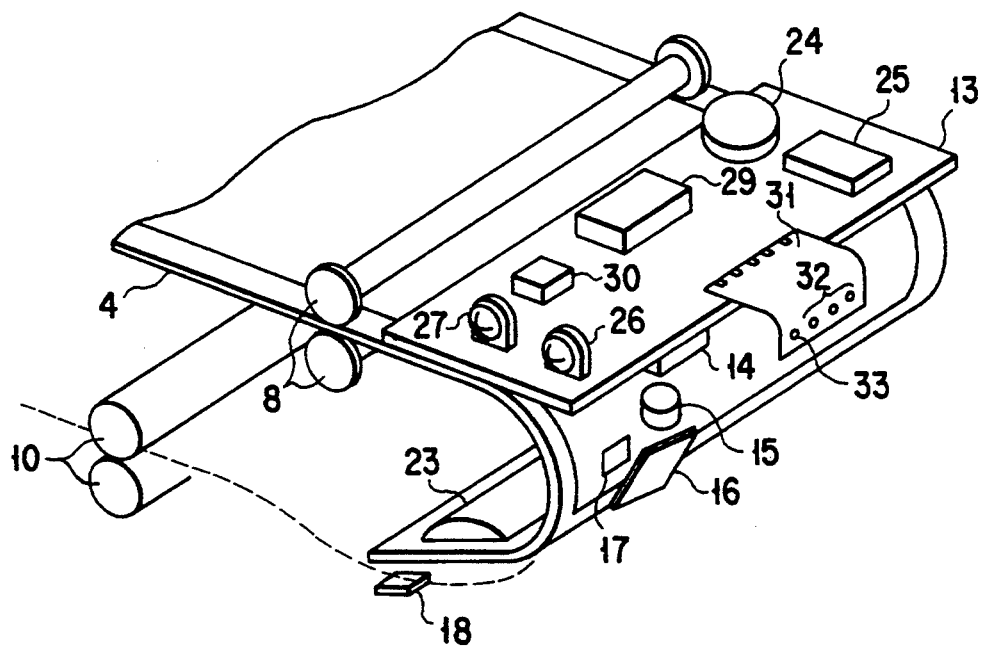
F I G. 5

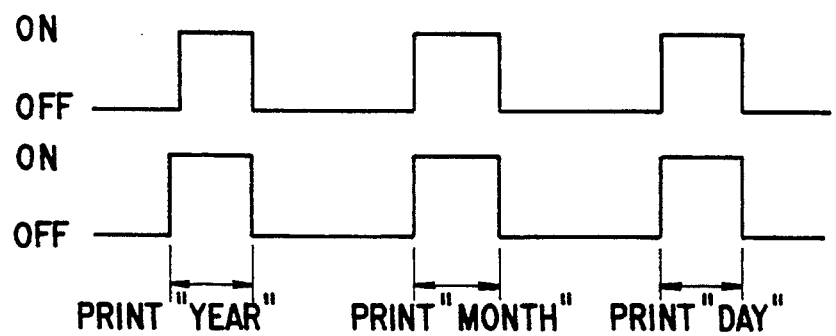
FIG. 12A UPPER-DIGIT LED
FIG. 12B LOWER-DIGIT LED
PRINT "YEAR"  PRINT "MONTH"  PRINT "DAY"
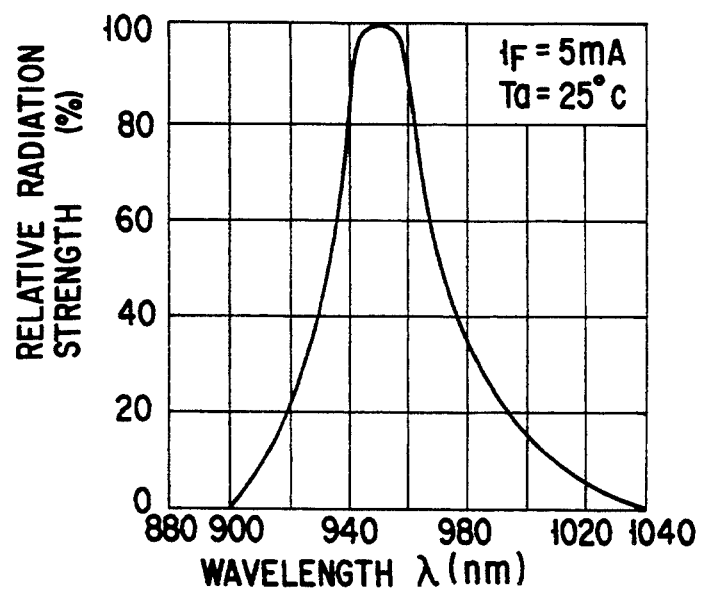
F I G. 13
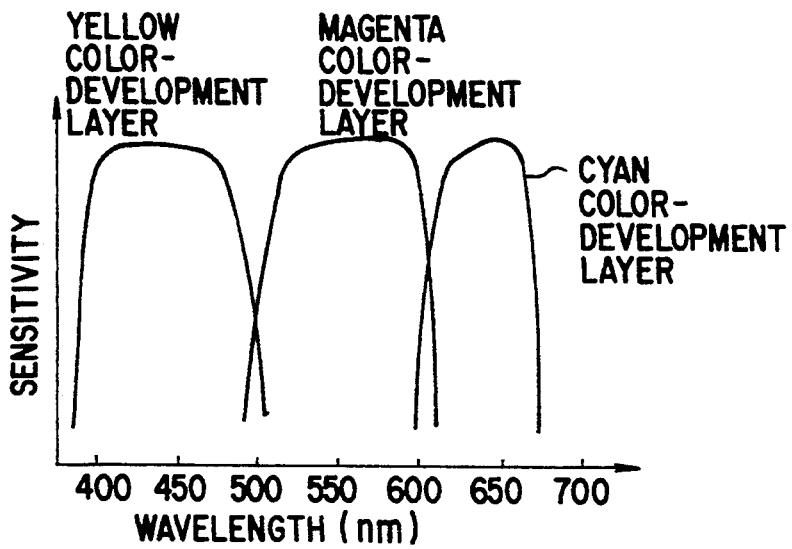
F I G. 14

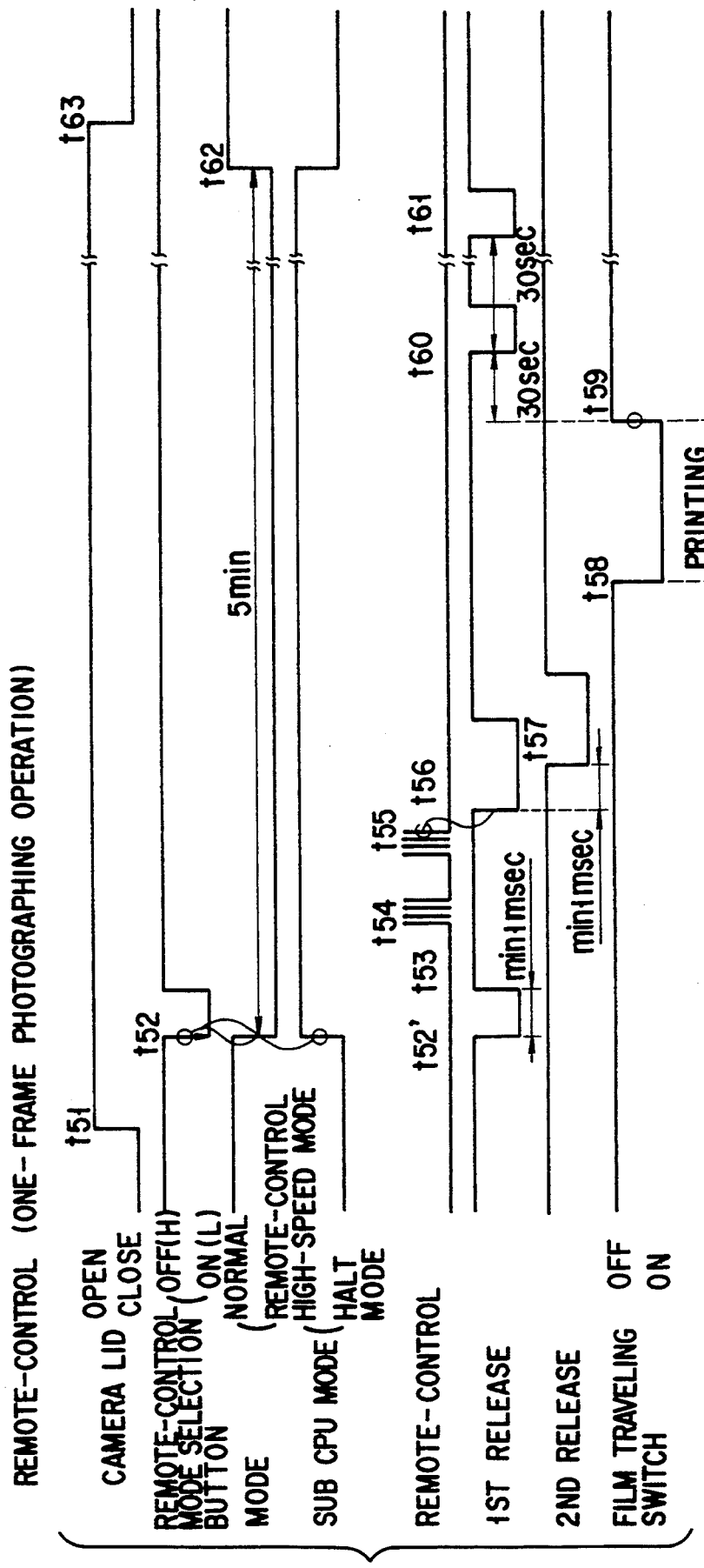
F I G. 22

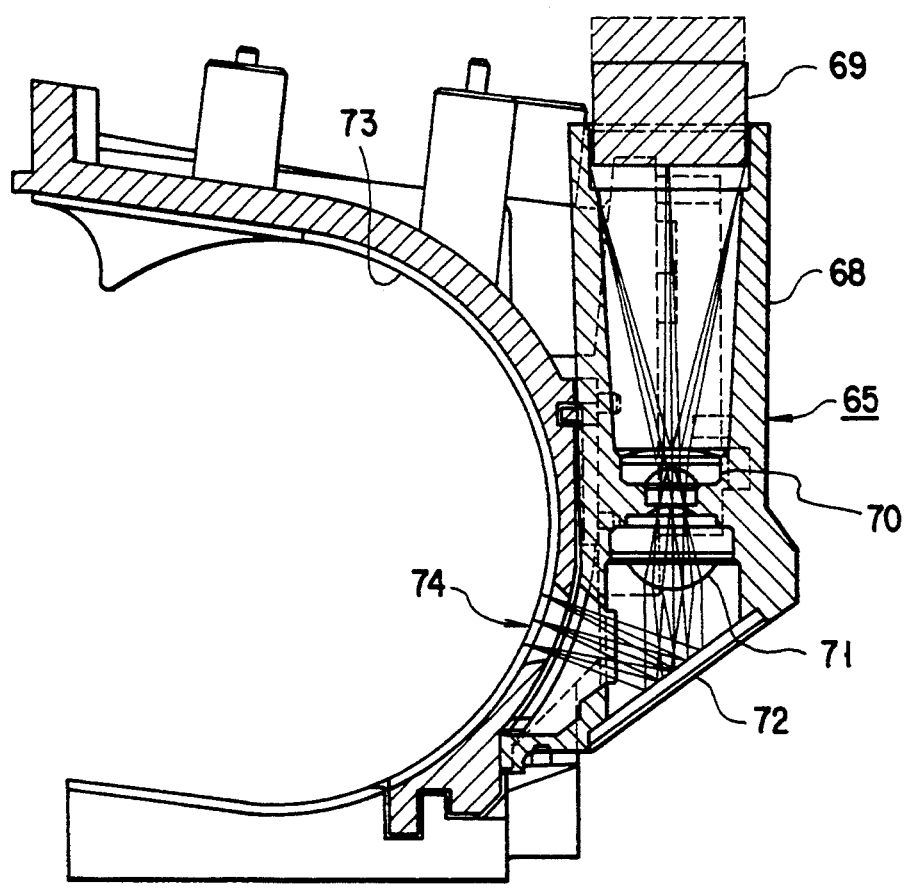
F I G. 26

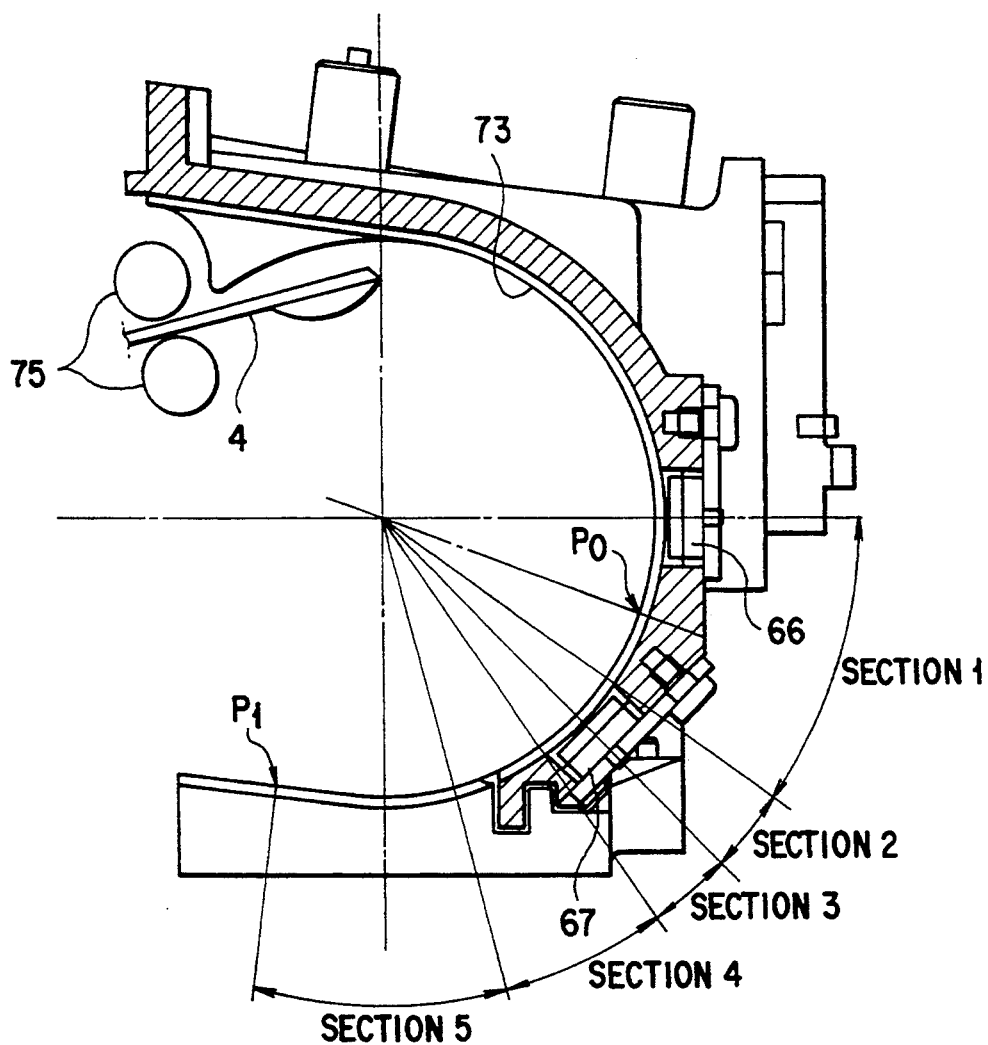
F I G. 27A

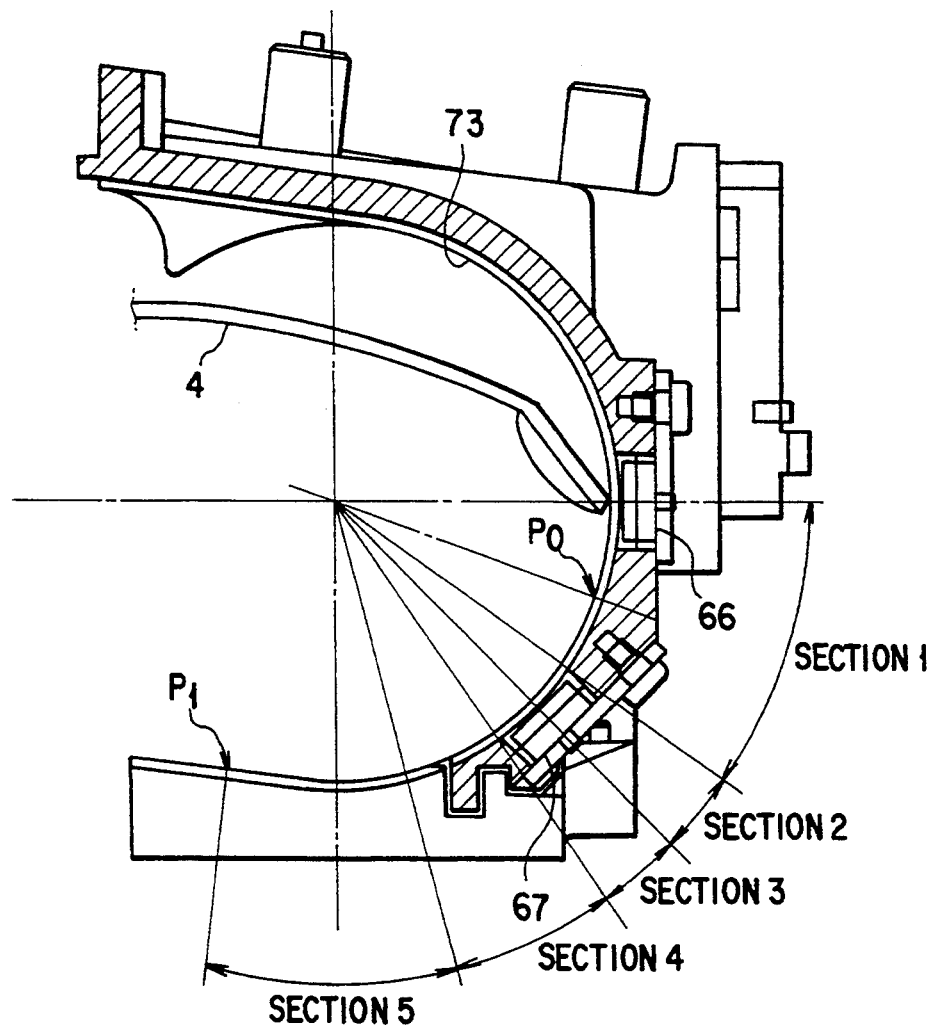
F I G. 27B

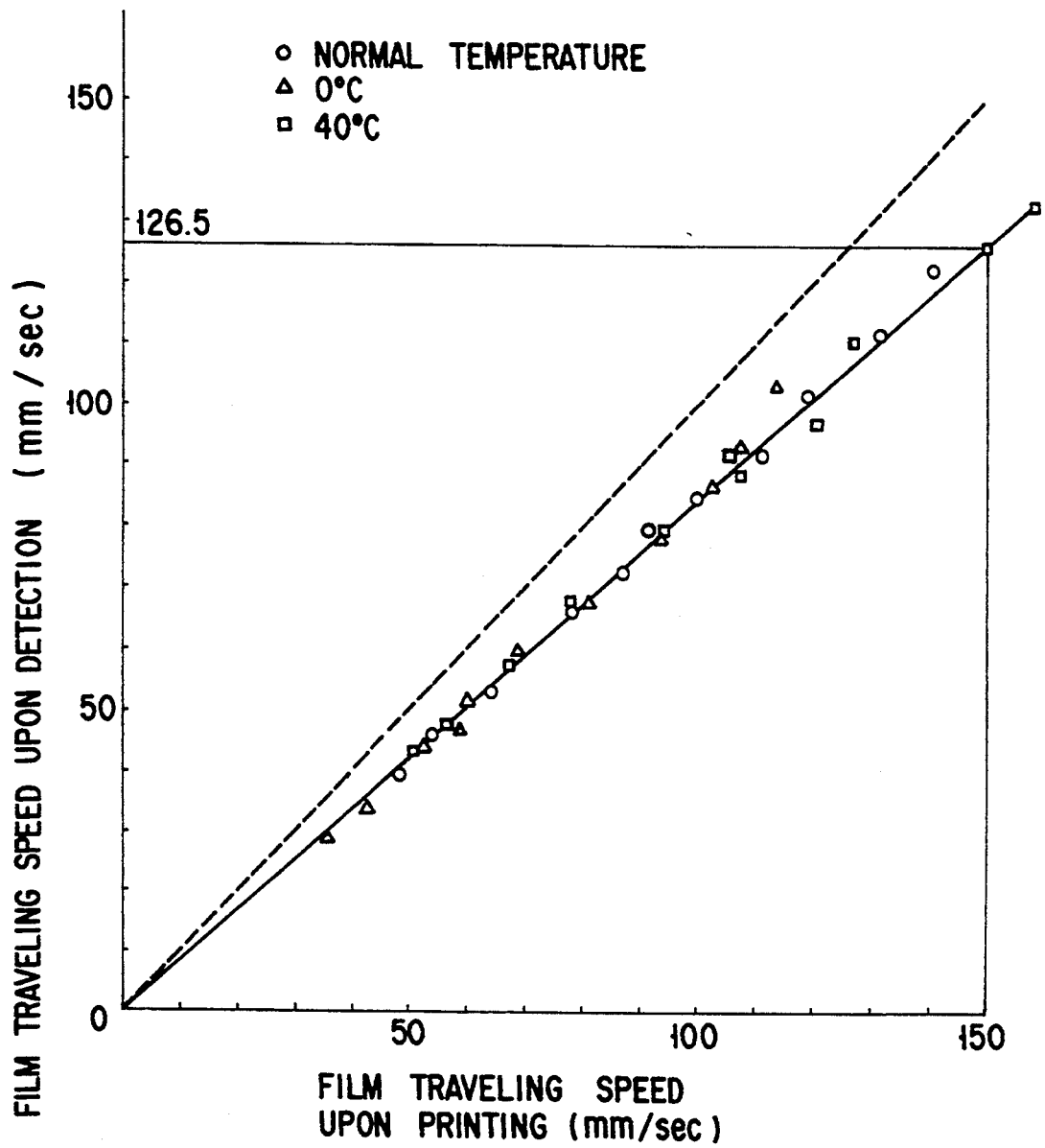
F I G. 29

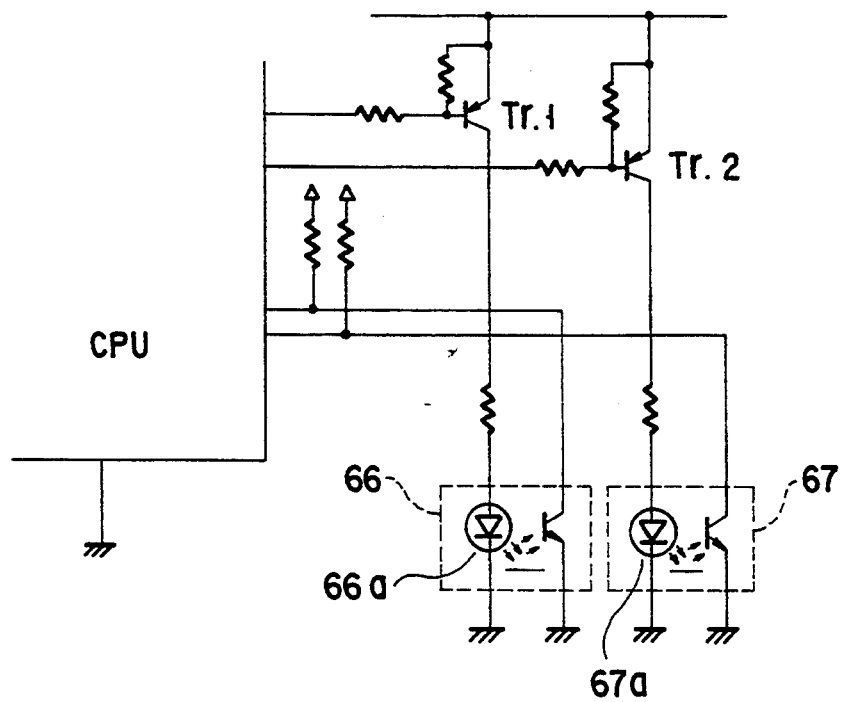
F I G. 31
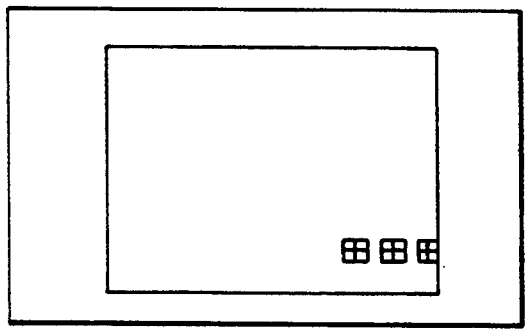
F I G. 32A
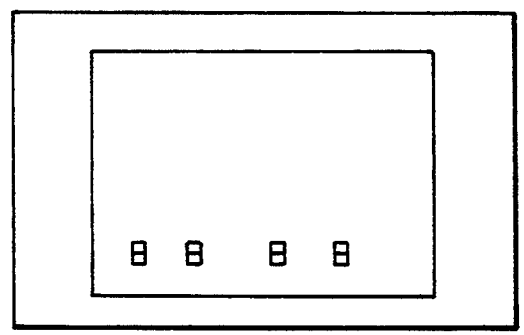
F I G. 32B

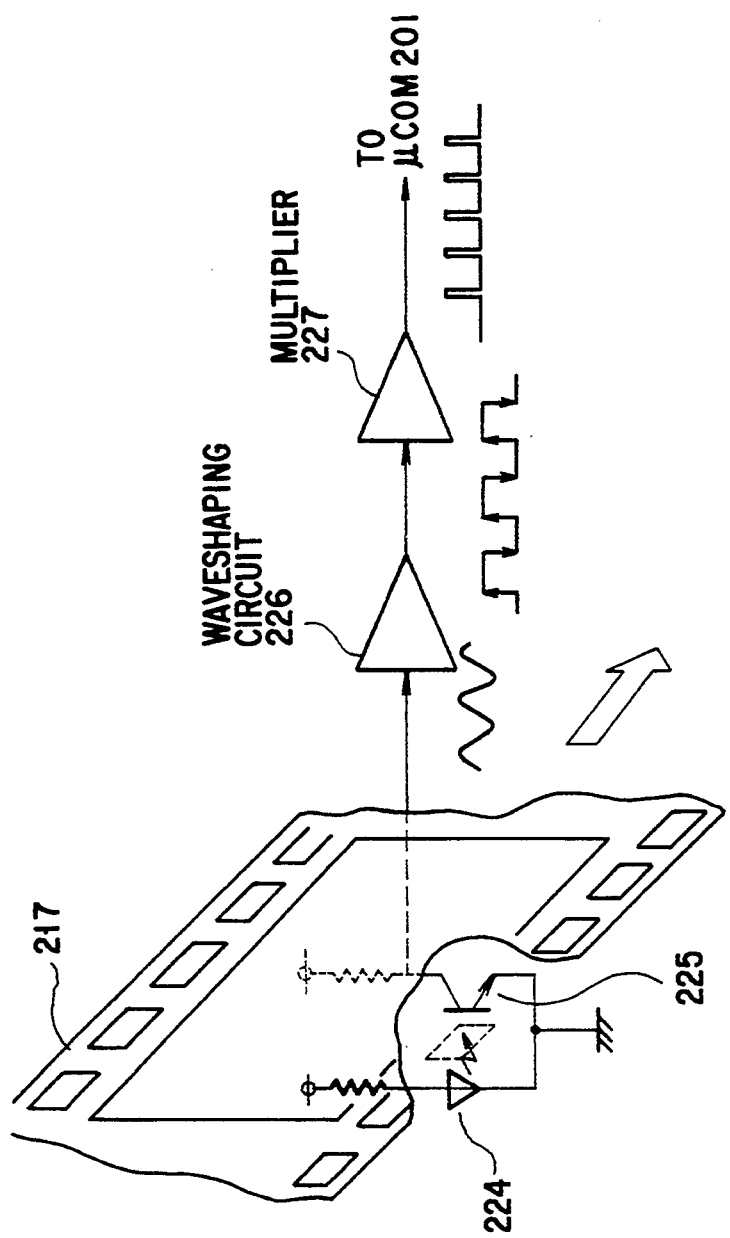
F I G. 37

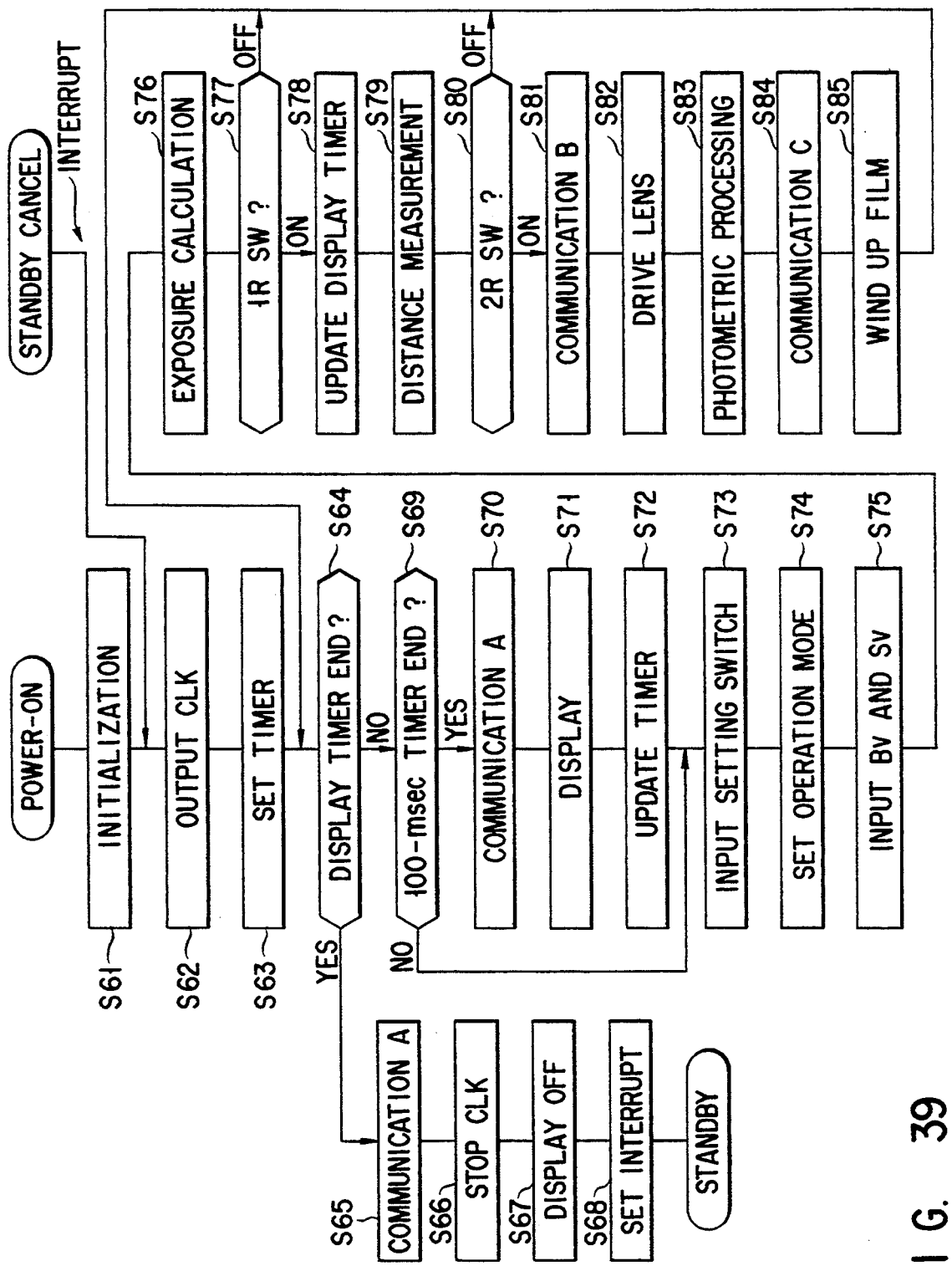
F I G. 39

'90 SEPTEMBER 15
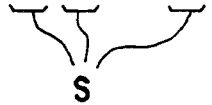
FIG. 41

DATA PRINTING APPARATUS

BACKGROUND OF THE INVENTION

1. Field of the Invention

The present invention relates to a data printing apparatus and, more particularly, to a data printing apparatus for causing a light-emitting element to emit light in synchronism with traveling of a film to print data such as a date on a traveling film surface.

2. Description of the Related Art

In a conventional camera, as an apparatus for causing a light-emitting element to emit light in synchronism with traveling of a film to print data such as a date on a traveling film surface, apparatuses described in, e.g., Published Examined Japanese Patent Application No. 57-55131 and Published Unexamined Japanese Patent Application No. 60-166938 are known.

The apparatus described in Published Examined Japanese Patent Application No. 57-55131 is provided with a 1-digit light-emitting LED for printing data. When a film is wound up, the LED emits light in correspondence with each digit at proper timings in the order of "month, day, hour, minute, and second", thereby printing data. This apparatus comprises a photocoupler for detecting the rotational amount of a rotational shaft of a sprocket meshing with perforations of a film. Thus, when the film travels by a predetermined length, a light emission signal is output. For this reason, the interval between adjacent characters can be prevented from varying.

In the apparatus described in Published Unexamined Japanese Patent Application No. 60-166938, seven LEDs are juxtaposed in an array in a direction perpendicular to the traveling direction of a film, and these LEDs are turned on five times during film traveling so as to form a character pattern consisting of 5×7 dots, thereby printing data. In this apparatus, whether or not the film moving speed is stabilized is judged based on the value of a current flowing through a film feed motor, and an ON/OFF interval is determined on the basis of the stabilized film moving speed. For these reasons, a character having a constant dot interval can be printed.

When the apparatus described in published Examined Japanese Patent Application No. 57-55131 is applied to a camera with a self development function, a sheet film used in the camera with the self development function has no perforations. Therefore, in this case, as described above, a mechanism for detecting the rotational amount of a rotational shaft of a sprocket meshing with the perforations cannot be used.

On the other hand, in a camera using a normal film with perforations, in order to feed a film by one frame, control for, when eight perforations are detected, stopping a film feed motor is normally performed. However, when the above-mentioned printing apparatus is further applied to this camera, an apparatus for detecting the traveling length of a film with high resolution is required in addition to the perforation mechanism. A camera having the above-mentioned printing apparatus must simultaneously and precisely perform feedback control for feeding a film by one frame, and feedback control for performing a data printing operation. For this reason, the arrangement of a control circuit is complicated.

In the apparatus described in Published Unexamined Japanese Patent Application No. 60-166938, the moving speed of a film is detected based on the value of a current flowing through the motor. As a practical problem, the relationship between the rotational speed of the motor and the motor current value varies depending on individual motors. For this reason, it is difficult to detect the film moving speed from the motor current value. If this apparatus is used, the size and interval of characters to be printed on a film vary in individual cameras.

SUMMARY OF THE INVENTION

It is an object of the present invention to provide a data printing apparatus, which can print characters having a constant size and interval with a simple arrangement.

According to an aspect of the present invention, there is provided a data printing apparatus for a camera using a sheet film having no perforations, comprising: feed means for feeding the sheet film from an exposure position after an exposure operation is ended; printing means having a light-emitting element for emitting light in a pattern of a digital numeral representing a date, and an optical system for focusing the date to be printed formed by the light-emitting element on the sheet film, the printing means printing the date while the sheet film is caused to travel by the feed means; film reflectance detection means, arranged in a traveling chamber of the sheet film, for detecting an emulsion portion on which an object image from a photographing lens is exposed, and the remaining frame portion on the basis of a difference in reflectance; timer means for measuring a moving time from when the frame portion is detected by the film reflectance detection means until the emulsion portion is detected thereby; and emission control means for controlling an emission timing of the light-emitting element on the basis of the moving time.

According to another aspect of the present invention, there is provided a data printing apparatus for a camera using a sheet film having no perforations, comprising: feed means for feeding the sheet film from an exposure position after an exposure operation is ended; printing means having a light-emitting element for emitting light in a pattern of a digital numeral representing a date, and an optical system for focusing the date to be printed formed by the light-emitting element on the sheet film, the printing means printing the date while the sheet film is caused to travel by the feed means; first and second film leading end portion detection means, arranged at different position to be separated by a predetermined distance from each other along a traveling path of the sheet film, for detecting a leading end portion of the sheet film; timer means for measuring a moving time required for moving the sheet film across the predetermined distance by measuring a time interval from when the leading end portion of the sheet film is detected by the first film leading end portion detection means until the leading end portion is detected by the second film leading end portion detection means upon traveling of the sheet film; and emission control means for controlling an emission timing of the light-emitting element on the basis of the moving time.

According to still another aspect of the present invention, there is provided a data printing apparatus for a camera using a sheet film having no perforations, comprising: feed means for feeding the sheet film from an exposure position after an exposure operation is ended; light-emitting elements for printing data on the sheet film, the number of the light-emitting elements being smaller than the number of characters required for printing all the data to be printed on the sheet film, and the light-emitting elements being caused to emit light a plurality of number of times during traveling of the sheet film to print all the data; an optical system for printing the printing data formed by the light-emitting elements in a traveling path of the sheet film; traveling speed detection means for detecting a traveling speed of the sheet film using an output from a photosensor; and printing control means for controlling emission timings of the light-emitting elements, which are caused to emit light the plurality of number of times, on the basis of the traveling speed detected by the traveling speed detection means.

According to further another aspect of the present invention, there is provided a data printing apparatus for a camera, comprising: exposure means for exposing an object image focused by a photographing lens on a film; moving means for moving the film from an exposure position after an exposure operation of the exposure means is ended; printing means having a light-emitting element for printing data on the film; moving speed detection means for detecting a moving speed of the film moved by the moving means; and printing control means for controlling an emission timing of the light-emitting element, which emits light a plurality of number of times during traveling of the film, on the basis of the moving speed detected by the moving speed detection means.

According to another aspect of the present invention, there is provided a data printing apparatus for printing data on a sheet film used in a camera having a self development function, comprising: means for feeding an exposed sheet film from a film pack; traveling speed detection means for detecting a traveling speed of the sheet film; a light-emitting unit for causing a combination of a plurality of light-emitting segments to emit light so as to optically print at least one character or symbol on a surface of the sheet film; and emission means for causing the light-emitting unit to repetitively emit light during traveling of the sheet film, the emission means including means for controlling timings of the repetitive emission operations on the basis of the detected traveling speed.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out in the appended claims.

BRIEF DESCRIPTION OF THE DRAWINGS

The accompanying drawings, which are incorporated in and constitute a part of the specification, illustrate presently preferred embodiments of the invention, and together with the general description given above and the detailed description of the preferred embodiments given below, serve to explain the principles of the invention.

FIG. 1 is a schematic front view showing a camera which adopts a data printing apparatus according to the first embodiment of the present invention;

FIGS. 2A and 2B are respectively a schematic side view showing the camera adopting the data printing apparatus of the present invention, and a side view showing a state wherein the camera is folded;

FIG. 3 is a perspective view showing the outer appearance of a sheet film pack used in the camera shown in FIG. 1;

FIG. 4 is a schematic perspective view of a sheet film used in the camera shown in FIG. 1;

FIG. 5 is a perspective view showing the arrangement of a data printing & remote control reception apparatus stored in a grip of the camera;

FIGS. 12A and 12B are timing charts when two-digit LEDs are simultaneously caused to emit light to print a date;

FIG. 13 is a graph showing spectral characteristics of an infrared light-emitting LED 52 incorporated in a photoreflector 18 for detecting the leading end position or traveling speed of a film;

FIG. 14 is a graph showing a spectral sensitivity of a film;

FIGS. 16A and 16B are views showing display states of the external display LCD, and display states of a film printed with a date in correspondence with the LCD, in which FIG. 16A shows the display state of a year-month-day mode, and FIG. 16B shows the display state of a day-hour-minute mode;

FIG. 22 is a timing chart showing a remote control operation;

FIG. 26 is a sectional view taken along a line II—II of the camera shown in FIG. 25;

FIGS. 27A through 27F are sectional views taken along a line I—I of the camera shown in FIG. 25, and showing a traveling state of a film, which travels along the spool wall;

FIG. 29 is a graph showing the relationship between the film traveling speed in a printing operation, and the film traveling speed in a detection operation;

FIG. 31 is a circuit diagram showing a circuit for switching emission timings of photoreflectors;

FIGS. 32A and 32B are views showing states of printed dates when a timer value calculated based on a printing wait time or an emission interval time is abnormal;

FIG. 37 is a view showing the arrangement of a film movement detection unit shown in FIG. 36;

FIG. 39 is a flow chart for explaining the operation of a main microcomputer shown in FIG. 36;

FIG. 41 is a view showing data other than numerals defined by turning on 7-segment LEDs.

DETAILED DESCRIPTION OF THE PREFERRED EMBODIMENTS

Figure 6:
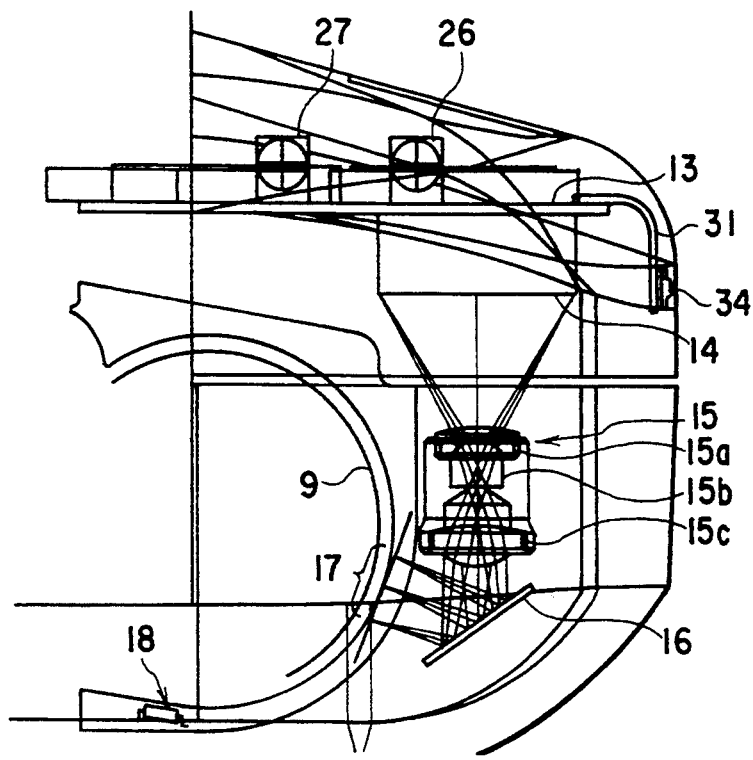
FIG. 6 is an enlarged front view showing only a grip portion of the camera shown in FIG. 5.

The preferred embodiments of the present invention will be described hereinafter with reference to the accompanying drawings.

FIG. 1 and FIGS. 2A and 2B schematically show a camera adopting a data printing apparatus according to the present invention, and are respectively a front view, a side view, and another side view showing a folded state of a camera.

A photographing lens 1 is arranged on the front surface of the camera. The optical path of incident light from the photographing lens 1 is bent by a mirror 2, and is guided onto a film in a film pack (using instant sheet films) 3. More specifically, an object image is formed on the uppermost film (sheet film) 4 of the film pack 3. Fulcrums 5, 6, and 7 allow pivotal movement about them. When the camera is stored, a lens portion and a mirror portion can be folded about these fulcrums 5, 6, and 7. Note that the power switch of the camera is turned on in a state shown in FIG. 2A, and is turned off in a folded state shown in FIG. 2B.

Reference numeral 8 denotes feed rollers for feeding a photographed sheet film 4; and 9, a spool wall as a guide for the fed sheet film 4. The film 4 travels while being curved along the spool wall 9, and reaches developing rollers 10. The sheet film 4 has a bag filled with a developer at its leading end. The bag is squeezed by the developing rollers 10 to spread the developer over the entire film surface, thus starting development. Note that reference numeral 11 denotes a storage chamber for storing photographed films 4.

A date is printed when the film 4 is traveling on the spool wall 9. A date printing mode includes five modes, i.e., "year.month.day", "day.hour.minute", "no printing", "month.day.year", and "day.month.year" modes. Calendar data has an automatic month-end correction function including leap years. A date printing apparatus is arranged in a grip 12 of the camera. Reference numeral 13 denotes a printed hard circuit board (M board) on which a printing circuit, and a remote control reception circuit (to be described later) are mounted; 14, printing LEDs comprising two-digit numerical display LEDs; 15, a printing lens and a lens frame; 16, a printing mirror; and 17, an opening serving as a printing window formed in the spool wall.

Reference numeral 18 denotes a photoreflector (PR) for detecting the leading end and the traveling speed of a film. When the leading end of the film 4 reaches a position opposing the PR, a date printing operation is started. The date printing operation is performed three times in correspondence with year, month, and day. Note that in the date printing operation, only one 1-digit printing LED 14 may be used, and exposure may be performed six times. Two or more PRs 18 may be used for the purpose of detecting the film traveling speed.

FIG. 3 shows the outer appearance of the pack 3 of sheet films 4 used in this camera. The sheet film pack 3 incorporates a battery (not shown) serving as a power supply of the camera. Reference numeral 19 denotes a window for exposing an object image. The uppermost one of sheet films 4 stacked in the sheet film pack 3 is exposed through the window 19. Note that reference numeral 20 denotes a slit-like delivery hole for delivering an exposed sheet film 4.

FIG. 4 schematically shows the sheet film 4 used in this camera. In FIG. 4, reference numeral 21 denotes an image forming surface on which an object image is exposed, and which has a different infrared reflectance from that of an edge portion 22. This is to detect a boundary between the image forming surface 21 and the edge portion 22 by utilizing a difference in reflectance, and the detected boundary is used in detection of the film traveling speed. Furthermore, reference numeral 23 denotes the above-mentioned bag filled with the developer.

Note that a remote controller using infrared light is prepared for this camera. The specification of the remote controller will be described later.

FIG. 5 shows the arrangement of a date printing & remote control reception apparatus stored in the grip of the camera. Reference numeral 4 denotes a traveling sheet film. The date printing LEDs 14, a calendar data backup battery 24, a calendar data external display LCD (normal display) 25, a remote control infrared light-receiving element (PIN photodiode) 26, a remote control reception confirmation LED 27, a sub CPU 29 (a main CPU (not shown) is also arranged in addition to the sub CPU), a remote control reception IC 30, and the like are mounted on the M board 13.

A flexible printed board 31 is connected to the M board 13. Switch patterns of calendar data correction switches 32 and a remote control mode switch 33 are formed on the board 31. Furthermore, a printing optical system consisting of the lens frame 15 including the printing lens and the mirror 16 is arranged below the printing LEDs 14.

Figure 7:
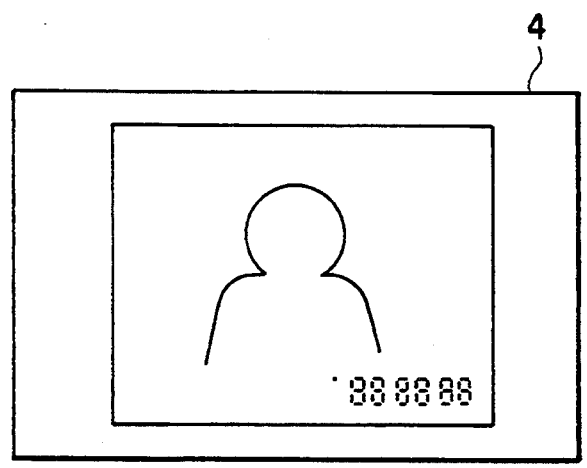
FIG. 7 is a view showing a film printed with a data.

FIG. 6 is an enlarged front view showing only the grip portion of the camera. As described above, the remote control infrared light-receiving element 26 and the remote control reception confirmation LED 27 are mounted on the upper surface of the M board 13, and the printing LEDs 14 are mounted on the lower surface of the board 13. Reference numeral 34 denotes mode buttons as the calendar data correction and remote control mode selection switches. The mode buttons 34 are connected to the M board 13 through the flexible printed board 31. Light emitted from the printing LEDs 14 passes through the lens in the lens frame 15, and is reflected by the mirror 16. The reflected light is then printed on a film 4 traveling along the front surface portion of the opening 17 through this opening 17 formed in the spool wall 9. In this case, the printing position is the lower right corner portion, i.e., the lower right corner portion of a print lateral position frame, when the lateral direction is defined as the longitudinal direction the film 4, as shown in FIG. 7.

The printing optical system used in this embodiment is constituted by a negative-power single lens 15a of a synthetic resin, a stationary stop 15b, a positive-power single lens 15c of a synthetic resin, and the mirror 16 from the side of the printing LEDs 14.

As an F-number of a lens, a required effective F-number can be calculated by:

$$F_{effective} = 0.5 \times \sqrt{(\pi Lt/H)\tau}$$

where
 $F_{effective}$: lens effective F-number
 t: exposure time
 L: LED luminance
 H: film exposure amount
 $\tau$: transmittance In this embodiment, in order to clearly focus a date image to print a date during film traveling, the exposure time must be set to be 500 μsec or less. For this reason, if t=500 μsec, L=2,000 cd/m², H=0.018 lx.sec (ISO600), and $\tau$=0.8, the effective F-number becomes about 6. In this case, the field angle is 42°.

Figure 8:
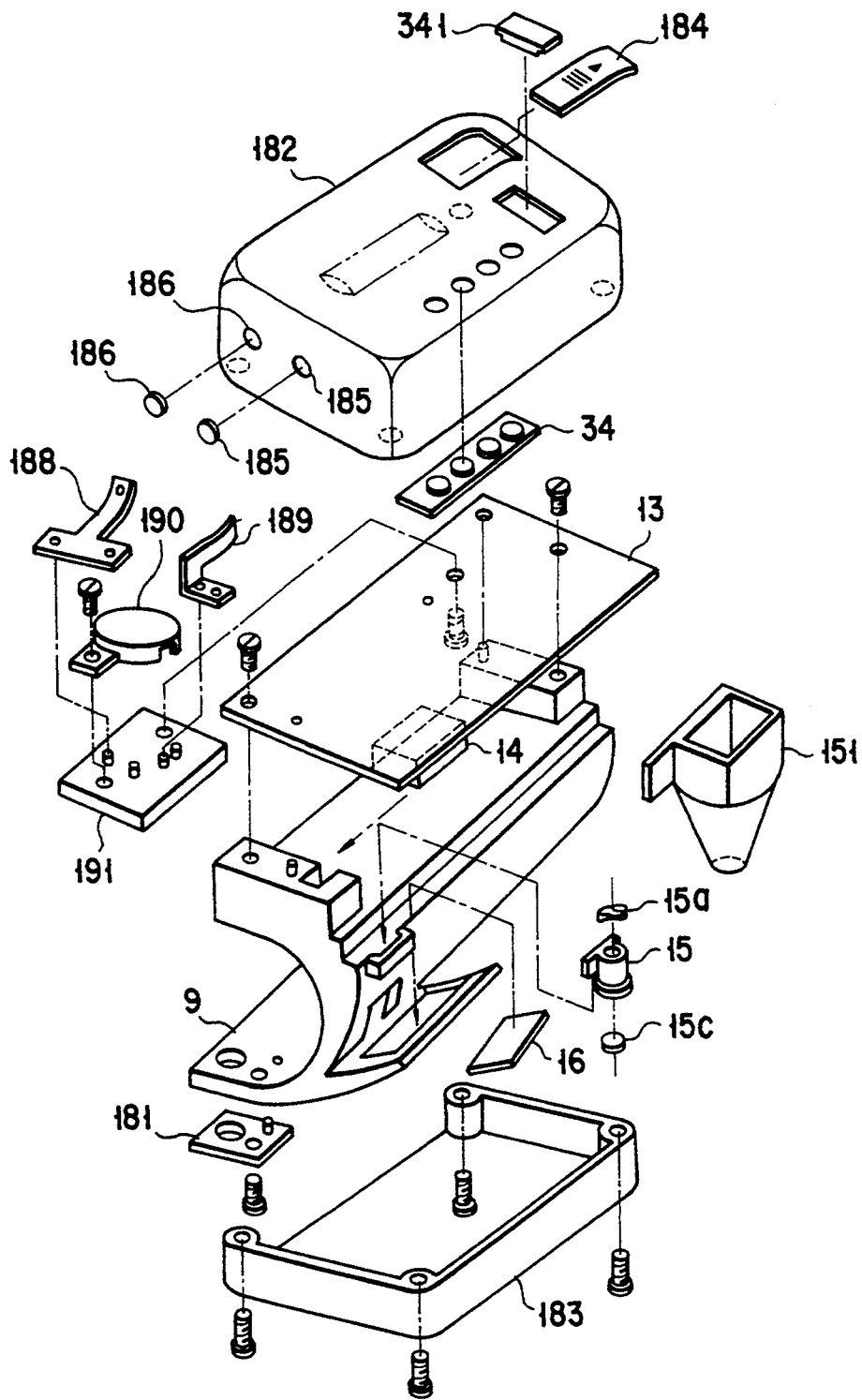
FIG. 8 is a schematic exploded perspective view showing a mechanism of a data printing apparatus according to the present invention.

FIG. 8 is a schematic exploded perspective view showing the mechanism of the data printing apparatus according to the present invention. In FIG. 8, the data printing apparatus is constituted around the spool wall 9 as the travel guide of the film 4. On the spool wall 9, the lens frame 15 constituting the date printing optical system, an LED light-shielding plate 151 for preventing light emitted from the LEDs from leaking outside an optical path, the above-mentioned mirror 16 for reflecting light emitted from the LEDs in the direction of a film after the light passes through the optical system, a reflector base 181 for fixing the photoreflector for detecting the speed and position of a film, and the M board 13, which mounts electrical components such as the LEDs, are mounted at the illustrated positions.

The data printing apparatus with the above arrangement is covered by upper and lower covers 182 and 183. Note that the calendar data backup battery 24 (see FIG. 5) is mounted on the M board 13 to be externally detachable therefrom. For this reason, a user can easily exchange the battery 24 by opening a battery lid 184 provided to the upper cover 182.

Furthermore, the mode buttons 34 for selecting a remote control mode and a printing mode, and for changing printing data, an LCD display confirmation window 341, a remote control light-receiving window 185, and a self light-emitting window 186 are provided to the upper cover 182. The mode buttons 34 may be arranged on, e.g., the side surface of the upper cover 182 so as not to project from the surface of the upper cover 182, so that the buttons are not erroneously depressed by a user during a photographing operation.

In FIG. 8, reference numerals 185 and 186 denote the windows; 188 and 189, battery segments; 190, a battery press; and 191, a caulking base.

Figure 9A:
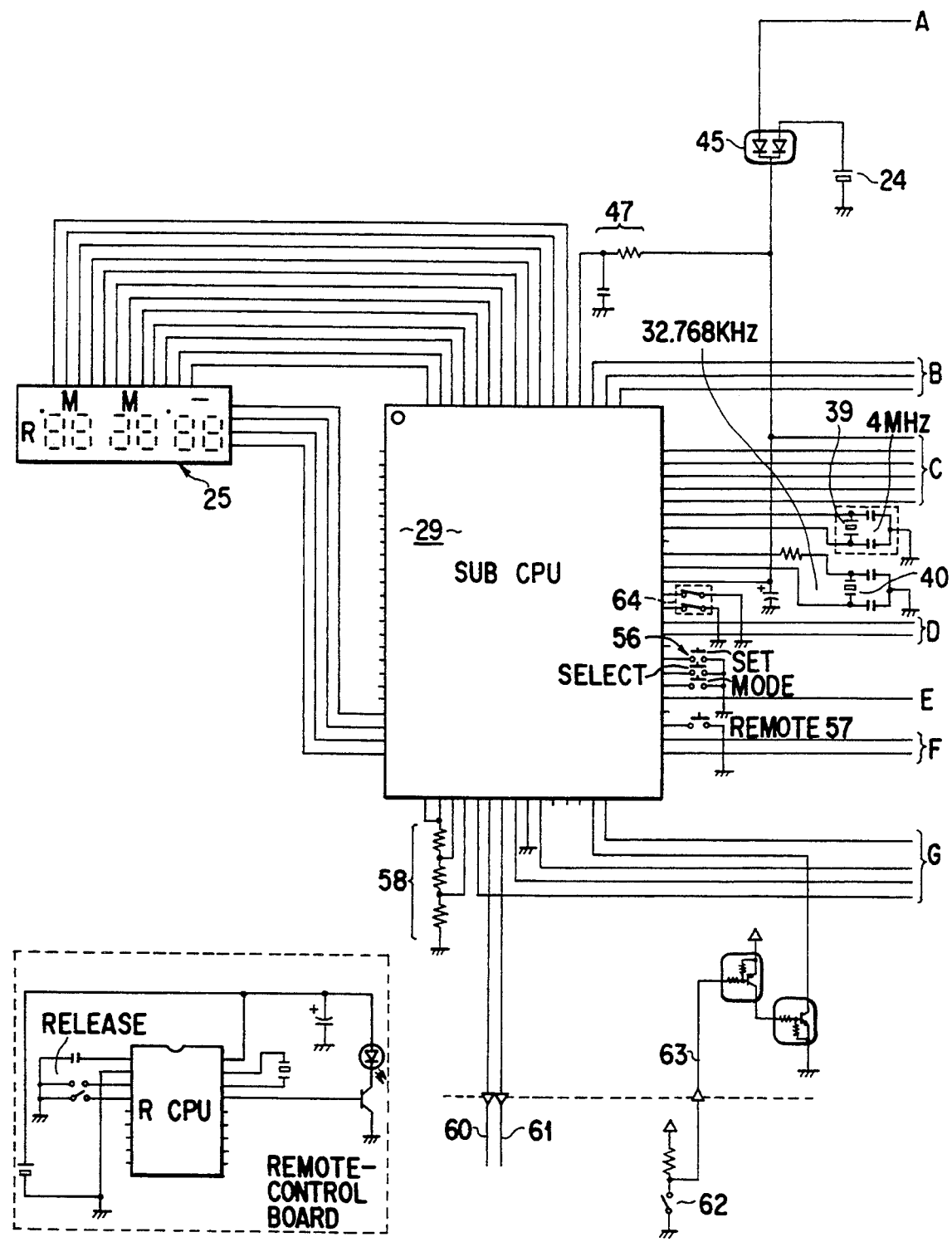
FIGS. 9A and 9B are diagrams showing a circuit of the data printing apparatus, and a remote control reception circuit.
Figure 9B:
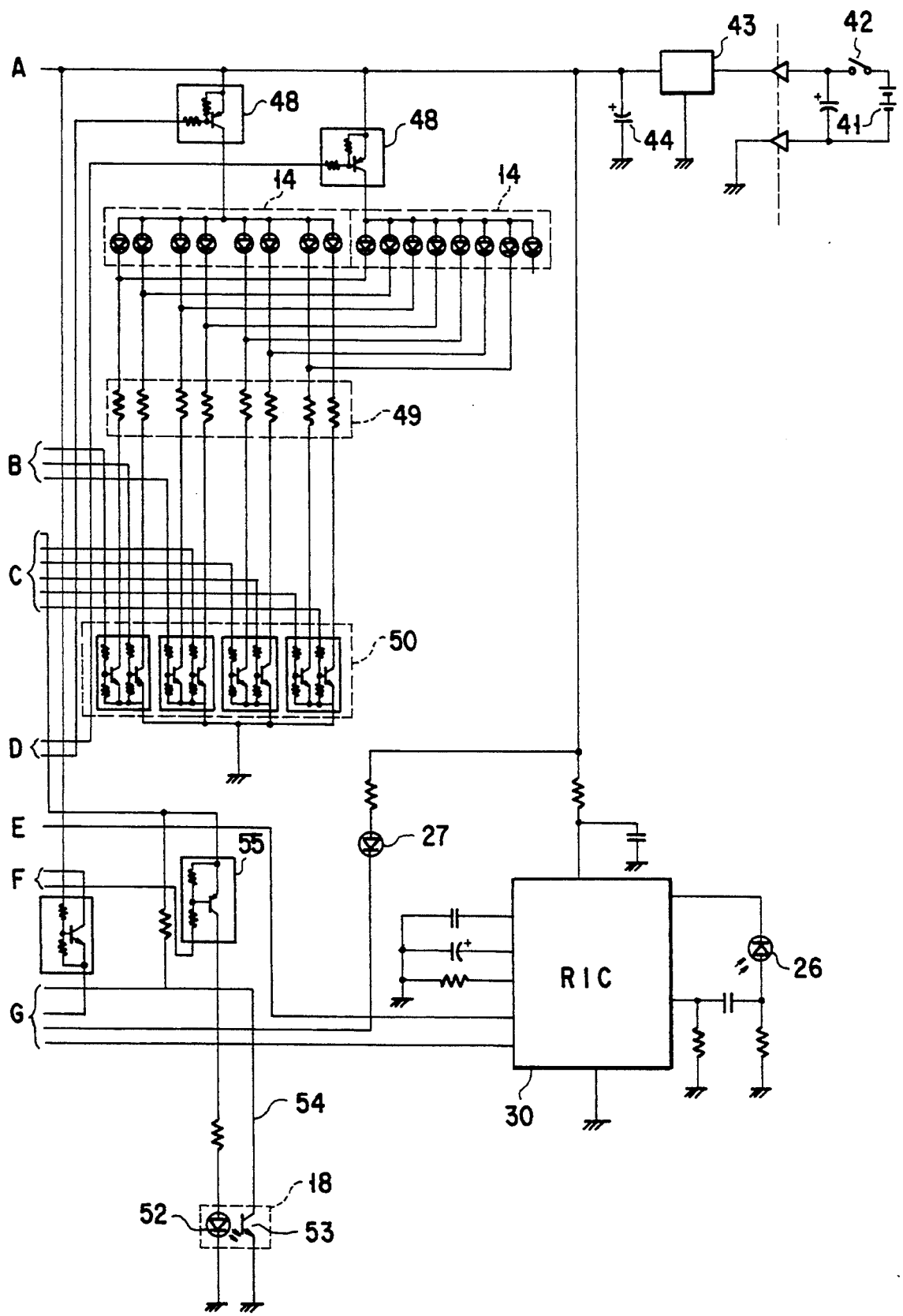

FIGS. 9A and 9B show the circuit of the data printing apparatus, and the remote control reception circuit. In FIGS. 9A and 9B, reference numeral 29 denotes the sub CPU (the camera separately includes the main CPU) for performing data printing and remote control signal processing; and 30, the remote control reception IC. The main clock terminal of the sub CPU 29 is connected to a ceramic oscillator 39 (4 MHz), and its sub clock terminal is connected to a quartz oscillator 40 (32.768 kHz). These clocks are selectively used according to the operation speed, current consumption, and required clock precision of the sub CPU 29.

The power supply system of this circuit will be described below. Reference numeral 41 denotes a battery (6 V) built in the film pack 3; and 42, a power switch, which is turned on/off when the camera is opened/closed. Reference numeral 43 denotes a 3-terminal regulator for stabilizing the power supply voltage (3.5 v) of this circuit. The regulator is connected to prevent a variation in voltage since the battery 41 is connected to the film feed motor, and the like.

Reference numeral 44 denotes an aluminum electrolytic capacitor (1,000 μF), which is connected to the output terminal of the 3-terminal regulator 43. The capacitor is connected to shorten the emission time of the printing LEDs 14 since the printing operation of this camera is performed during film traveling. In other words, since the emission time is short, the luminance of the LED must be increased to obtain a sufficient exposure amount, and for this purpose, a large current must be flowed through the LED. More specifically, since a large current must be instantaneously flowed beyond the current supply power of the 3-terminal regulator 43, the capacitor is connected as a current backup means.

Reference numeral 45 denotes a Schottky barrier diode. When the film pack 3 is removed from the camera, or when the camera is folded in a storage state (see FIG. 2B), and the power switch 42 is turned off, the diode 45 switches the power supply, so that the power supply voltage is supplied from the backup battery 24 to the sub CPU 29 to hold calendar data. A CR filter 47 is connected to the reset terminal of the sub CPU 29 to reliably execute a power-ON reset operation when the power switch is turned on.

Figure 10:
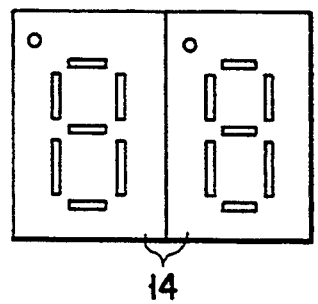
FIG. 10 is a view showing printing LEDs.

One digit of the above-mentioned date printing LEDs 14 consists of eight segments obtained by adding a dot to 7-segment display elements. In this embodiment, the LEDs for two digits are prepared, as shown in FIG. 10. Reference numeral 48 denotes PNP transistors for selecting upper or lower digits of the printing LEDs 14, and causing the selected LED to emit light. The PNP transistors 48 are controlled by the sub CPU 29. When the date printing LEDs 14 for the two digits are simultaneously caused to emit light, problems of a rush current, an increase in the number of driving transistors, and an increase in the number of current limiting resistors are posed. Thus, the LEDs 14 are caused to emit light in units of digits at different timings.

Reference numeral 49 denotes resistors for determining a current flowing through the date printing LEDs 14. Since the LEDs for two digits are selectively caused to emit light in two operations, eight resistors need only be connected although the number of segments of the LEDs 14 is 15 (the dot of the lower digit is not used). Similarly, eight NPN transistors 50 for driving the segments need only be connected. Note that the NPN transistors 50 are also controlled by the sub CPU 29.

Figure 11:
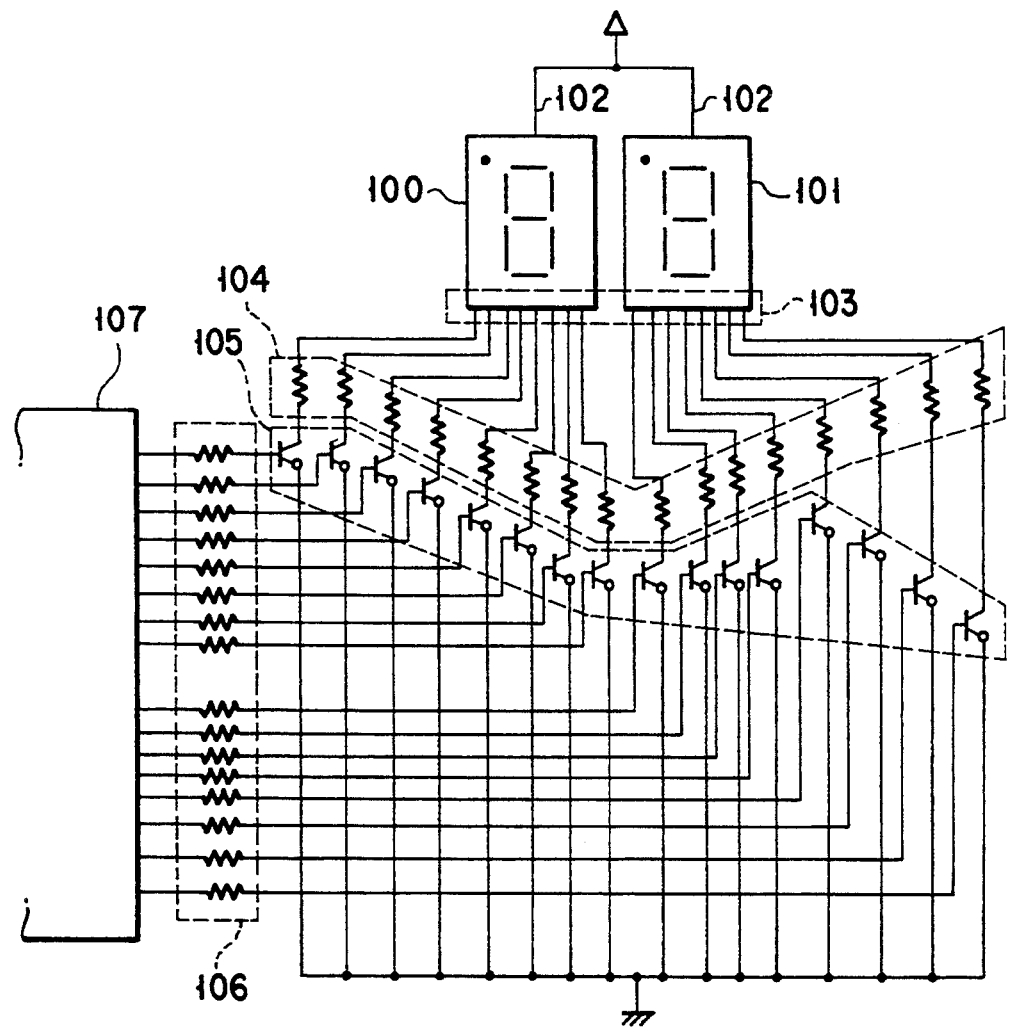
FIG. 11 is a circuit diagram of a circuit used when upper- and lower-digit LEDs are simultaneously caused to emit light in a date printing mode.

FIG. 11 is a circuit diagram when the upper and lower digits are simultaneously caused to emit light in a date printing operation. Reference numeral 100 denotes an upper-digit LED; and 101, a lower-digit LED. Both the LEDs are anode common type numerical display LEDs. Anode terminals 102 of the two LEDs are connected to the positive terminal of the power supply. Cathode terminals 103 of the LEDs are connected to the collectors of driving transistors (NPN transistors) 105 through current limiting resistors 104. The bases of the driving transistors 105 are connected to the output ports of a CPU 107 through base current limiting resistors 106. The emitters of the driving transistors 105 are connected to the negative terminal of the power supply. When the output port of the CPU corresponding to a given segment of the printing LED 14 is set at high level (H), the given segment emits light; when the output port is set at low level (L), the segment is turned off. With this arrangement, all the segments of the two-digit LEDs can be simultaneously caused to emit light.

FIGS. 12A and 12B are timing charts when the two-digits LEDS are simultaneously caused to emit light by the circuit shown in FIG. 11 to print a date. FIGS. 12A and 12B exemplify a case wherein "year, month, and day" are printed in this order. The upper-and lower-digit LEDs are simultaneously turned on and off in a printing operation of each of "year", "month", and "day".

When this arrangement is employed, a rush current upon emission of the LEDs is undesirably increased, as described above.

Referring back to FIGS. 9A and 9B, reference numeral 18 denotes the photoreflector (PR) for detecting the leading end of the film 4, as described above. In this embodiment, one PR is used. In the PR18, an internal infrared light-emitting LED 52 emits infrared light, and light reflected by an object is detected by an internal phototransistor (PTr) 53. If there is an object having a high reflectance of infrared light, an output 54 from the PTr 53 goes to L; when there is an object having a low reflectance, or when there is no object that reflects the infrared light, the output 54 goes to H. Reference numeral 55 denotes a transistor for turning on/off the infrared light-emitting LED 52 in the PR 18. The transistor 55 is controlled by the sub CPU 29.

FIG. 13 shows the spectrum of the infrared light-emitting LED 52 incorporated in the PR 18 for detecting the leading end position or the traveling speed of a film. The wavelength of light emitted from the infrared light-emitting diode 52 falls within a range of 900 nm and 1,040 nm.

On the other hand, FIG. 14 shows the spectral sensitivity of the film 4 used in this embodiment. As can be seen from FIG. 14, this film is not exposed by light having a wavelength of 700 nm or longer. Therefore, the film 4 is not exposed by the PR 18 having the characteristics shown in FIG. 13.

Referring to FIGS. 9A and 9B again, reference numeral 56 denotes a calendar data correction mode selection switch (MODE SW), a correction digit selection switch (SELECT SW), and a correction switch (SET SW), which are connected to the input ports (as key switch interrupt ports) of the sub CPU 29. Reference numeral 57 denotes a remote control mode selection switch, which is connected to the input port (as a key switch interrupt port, similarly) of the sub CPU 29. Furthermore, reference numeral 58 denotes division resistors for generating a voltage for driving the external display LCD 25. These resistors are set to have a large resistance (1 MΩ) to suppress current consumption.

A method of correcting calendar data will be explained below. Calendar data to be printed is always displayed on the external display LCD 25, and can be checked by observing the LCD 25. The content of the data includes a calendar (year, month, day) of the current day, or the current day and time (day, hour, minute), and as described above, a month-end date can be automatically adjusted including a leap year.

Figure 15:
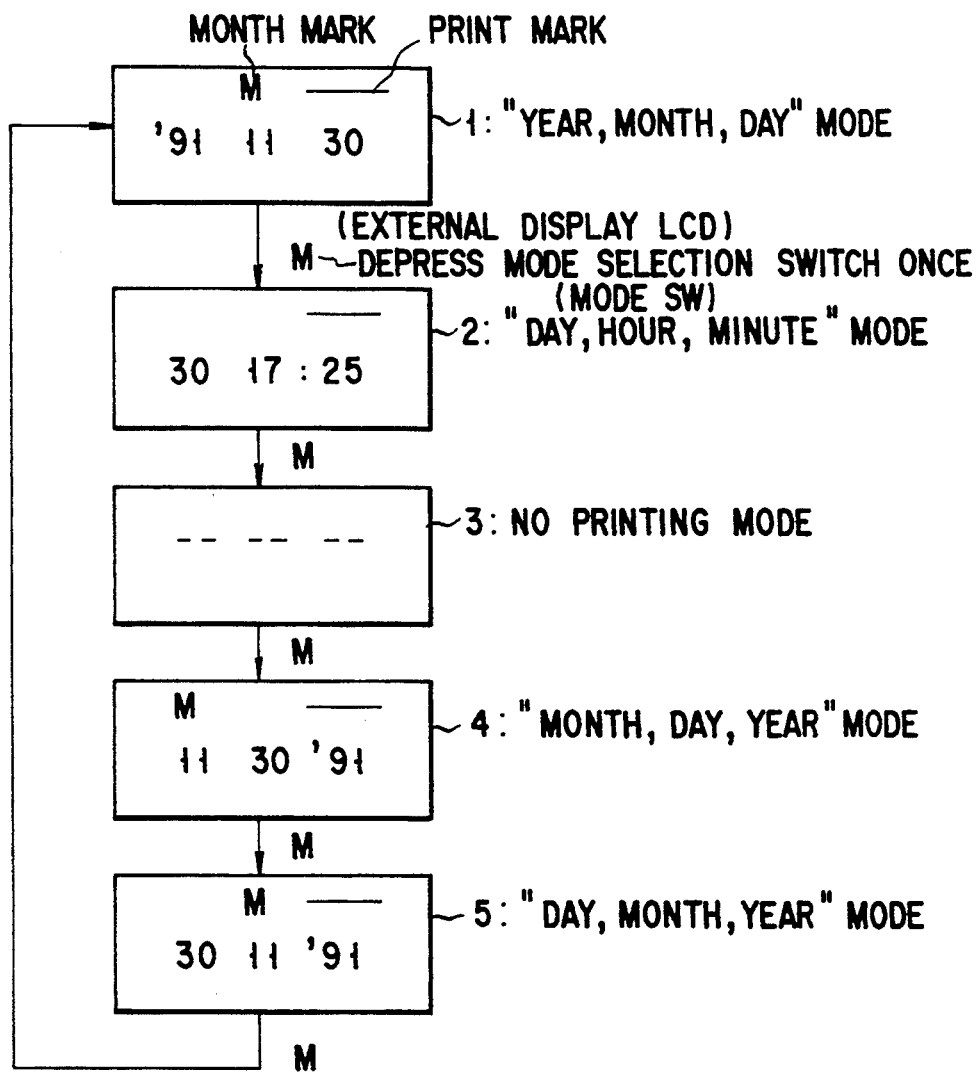
FIG. 15 is a chart showing display states of an external display LCD.

Data correction is performed by the calendar data correction switches 56 as the above-mentioned three push buttons. For example, every time the mode selection switch is depressed once, the printing mode is switched in the order of "year, month, day"→"day, hour, minute"→"no printing"→"month, day, year"→"day, month, year"→"year, month, day". The order of year, month, and day is changed due to different customs depending on countries (Japan, European countries, U.S.A, and the like). At this time, the display state of the external display LCD 25 is switched, as shown in FIG. 15.

Figure 16A:
Figure 16B:
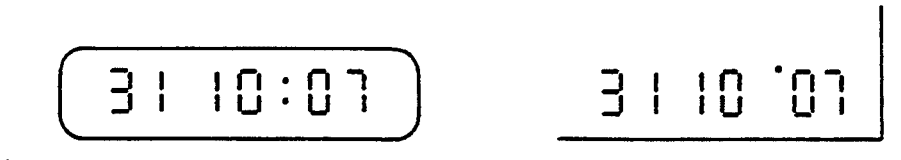

FIGS. 16A and 16B show a correspondence between an external display of a date, and a pattern printed on the film 4. In this case, FIG. 16A shows the "year, month, day" mode, and FIG. 16B shows the "day, hour, minute" mode.

Since this date printing apparatus uses the versatile numerical display 7-segment LEDs, an apostrophe (') on the upper left portion of "year", and a colon (:) between "hour" and "minute" cannot be printed. In place of these symbols, a period (.) is printed in an upside-down state. A versatile numerical display LED generally has a dot on the lower right portion of a numeral (see the date printing LEDs 14 shown in FIG. 10). Thus, this LED is used in an upside-down state (.), so that the dot can be printed on the upper left portion of a numeral.

In the external display LCD 25, an "M" mark indicating the display position of "month" is displayed above a "month" display. A PRINT mark ( bar, "-" ) on the upper right portion of the LCD panel is displayed when a mode for performing the printing operation ("year, month, day" mode, "day, hour, minute" mode, "month, day, year" mode, and "day, month, year" mode) is selected; it is not displayed when a mode for performing no printing operation ("no printing" mode) is selected. After the printing operation is completed, the LCD 25 flashes for 3 sec at 2 Hz and a duty of 50%, thus displaying that the printing operation is completed. In a correction mode (a mode for correcting date; to be described later), no display is made on the LCD 25. In the "no printing" mode, six bars ("-- -- --") are displayed on a portion for displaying day, year, month, and day, or hour and minute of the LCD. This display is not printed on the film.

The function of the correction digit selection switch (SELECT SW) will be described below. In the mode for displaying "year", "month", and "day" ("year, month day" mode, "month, day, year" mode, and "day, month, year" mode), every time the correction digit selection switch is depressed once from a normal state (printing mode), the correction digit is switched in the order of "normal state"→"year"→"month"→"day"→"normal state". The selected correction digit on the LCD flashes. A state wherein one of "year", "month", and "day" is selected as the correction digit will be referred to as a correction mode, and in the correction mode, the PRINT mark is not displayed.

When the correction digit selection switch is depressed in the "day, hour, minute" mode, the correction digit is switched in the order of "normal state"→"hour"→"minute"→"second"→"normal state". The correction of "day" is performed in the mode wherein "year", "month" and "day" are displayed. Like in the mode for displaying "year", "month", and "day", the correction digit on the LCD flashes. In the correction mode wherein any correction digit flashes, the PRINT mark is not displayed. When "second" is selected as the correction digit, a colon ":" displayed between "hour" and "minute" flashes.

In the "no printing" mode, the correction digit selection switch is not accepted even if it is depressed.

The function of the correction switch (SET SW) will be described below. Every time the correction switch is depressed once in the correction mode, the selected correction digit is counted up by one. However, in the correction mode of "second", when the correction switch is depressed, and is then released, i.e., when the switch is turned on, and is then turned off, "second" is reset to 0 sec. In the normal mode, the correction switch is not accepted even if it is depressed.

The arrangement of the remote control reception circuit will be described below with reference to FIGS. 9A and 9B again. In FIGS. 9A and 9B, reference numeral 26 denotes the PIN photodiode for receiving remote control light, as described above. A signal (modulated signal) received by the PIN photodiode 26 is input to the remote control reception IC 30. The input signal is demodulated and waveshaped by the IC 30, and the processed signal is then sent to the sub CPU 29. The sub CPU 29 discriminates whether the input is noise or a signal, and also discriminates from the signal whether the delay time is 1 sec or 3 sec. The sub CPU 29 outputs first and second release signals from signal lines 60 and 61 after an elapse of the 1- or 3-sec delay time. The remote control reception confirmation LED 27 is used by a user to confirm that the remote control signal is received by the camera. When the remote control signal is received, the LED 27 flashes until a release switch is turned on.

Furthermore, reference numeral 62 denotes a film traveling switch, which is turned on when a photographing operation is ended, and a film traveling operation is started, and is turned off when the film traveling operation is completed. The state of the film traveling switch 62 is input to the sub CPU 29 through a signal line 63. Reference numeral 64 denotes a switch connected to the input port of the sub CPU 29 so as to adjust the emission time in consideration of a variation in luminance of the printing LEDs 14.

The date printing and remote control operations of the camera of this embodiment will be described below with reference to timing charts. Note that the description of the date printing operation corresponds to that of the content of step S16 in the flow charts shown in FIGS. 24A, 24B and 24C (to be described later). In this case, the "day, month, year" mode will be exemplified.

Figure 17:
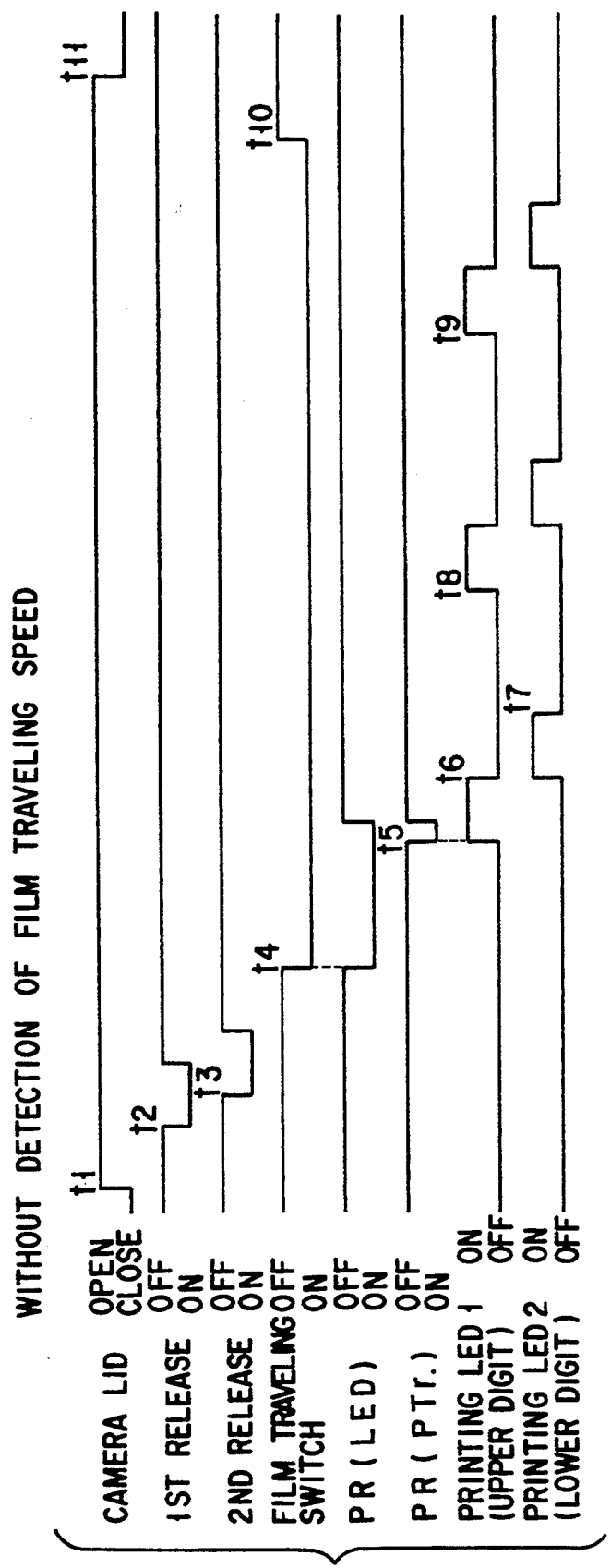
FIG. 17 is a timing chart showing a date printing operation executed when the film traveling speed is not detected.

FIG. 17 is a timing chart showing a date printing operation when the film traveling speed is not detected. This operation will be explained below in units of timings.

When the camera lid is opened at a time $t_1$, the power switch is turned on. When a photographer depresses a release button at a time $t_2$, a first release switch is turned on, and a second release switch is turned on at a time $t_3$, thus performing a photographing operation.

When the photographing operation of an object is ended at a time $t_4$, the film 4 begins to be fed, and the film traveling switch 62 is turned on. The ON state of the switch 62 is detected by the sub CPU 29 (detection of the start of film traveling), and the infrared light-emitting LED 52 in the PR 18 for detecting the leading end of the film is turned on. When the film 4 is fed, the leading end of the film reaches the position of the PR 18, and the PTr 53 is turned on (time $t_5$). The ON state of the PTr 53 is detected by the sub CPU 29, and the date printing operation is started. At the same time, the LED 52 is turned off since it becomes unnecessary.

Three date printing operations are performed in correspondence with "year", "month", and "day". Each printing operation is performed by shifting emission timings of the upper and lower digits. In this manner, a rush current caused by emission of the date printing LEDs 14 can be suppressed, and the numbers of driving transistors and current limiting resistors can be decreased.

The above operation will be described along the timing chart. At the time $t_5$, the upper digit of "year" is turned on, and is turned off at a time $t_6$. Simultaneously with the OFF operation of the upper digit, the lower digit is turned on, and is turned off at a time $t_7$.

In this manner, the printing operation of "year" is ended. After an elapse of a proper time period, the printing operation of "month" is started at a time $t_8$, and the printing operation of "day" is started at a time $t_9$. Note that the order of "year", "month", and "day" is changed depending on the printing mode, and in the "day, hour, minute" mode, the printing operations corresponding to "day", "hour" and "minute" are performed.

When all the printing operations are ended, and the film feed operation is ended at a time $t_{10}$, the film traveling switch 62 is turned off. When the camera lid is closed at a time $t_{11}$, the power switch is turned off. However, the sub CPU 29 is kept operated by the backup battery 24, and hence, the calendar function is kept enabled.

A case will be described below wherein the film traveling speed is detected to change the time interval between the printing operations of "year", "month", and "day", or "day", "hour" and "minute". In this manner, the interval between printed numerals ("year, month, day", or "day, hour, minute") can be constant regardless of the film traveling speed. For this reason, even when the traveling speed varies, the uniform appearance of printed data can be maintained.

Figures 18A, 18B, 18C:
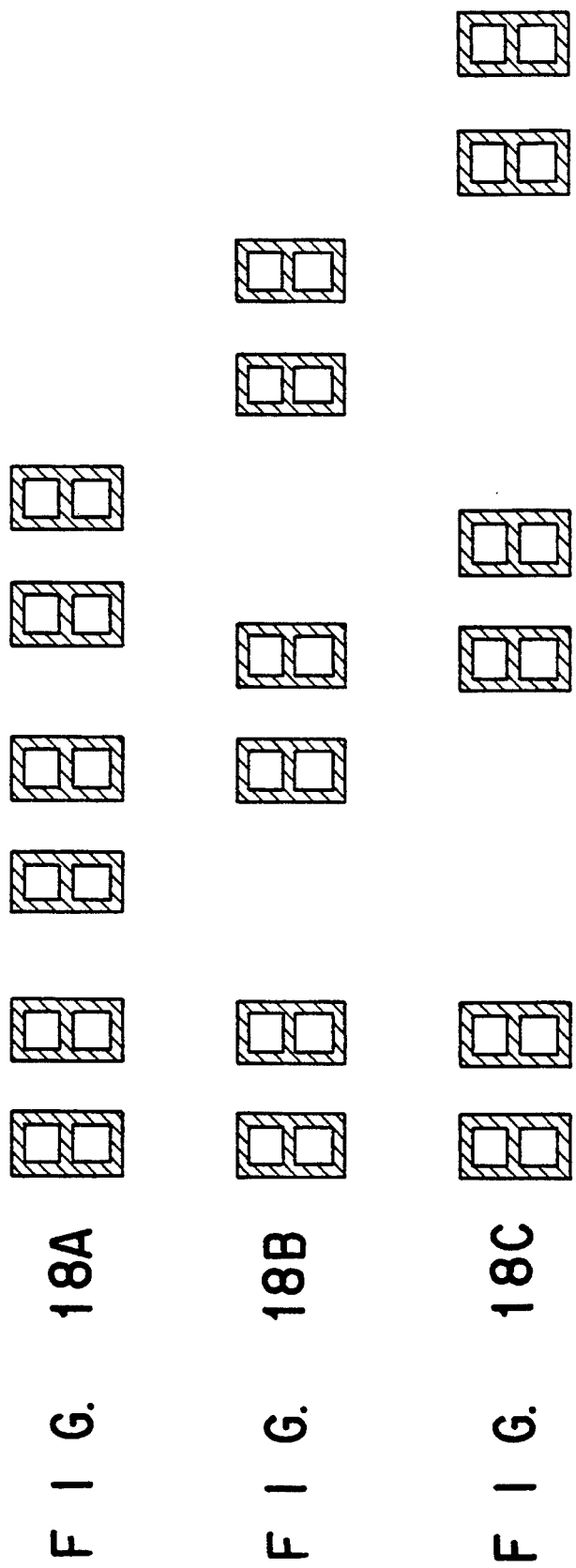
FIGS. 18A, 18B, and 18C are views showing a change in interval between printed date characters when the film traveling speed varies while the printing time interval is constant.

FIGS. 18A, 18B, and 18C show a change in interval between printed date characters when the time interval between the printing operations of "year", "month", and "day", or "day", "hour" and "minute" is constant, and the film traveling speed varies. When the date characters are printed using the two-digit LEDs, the interval between "year", "month", and "day", or "day", "hour" and "minute" varies, but the interval between two digits can be kept constant.

Figure 19:
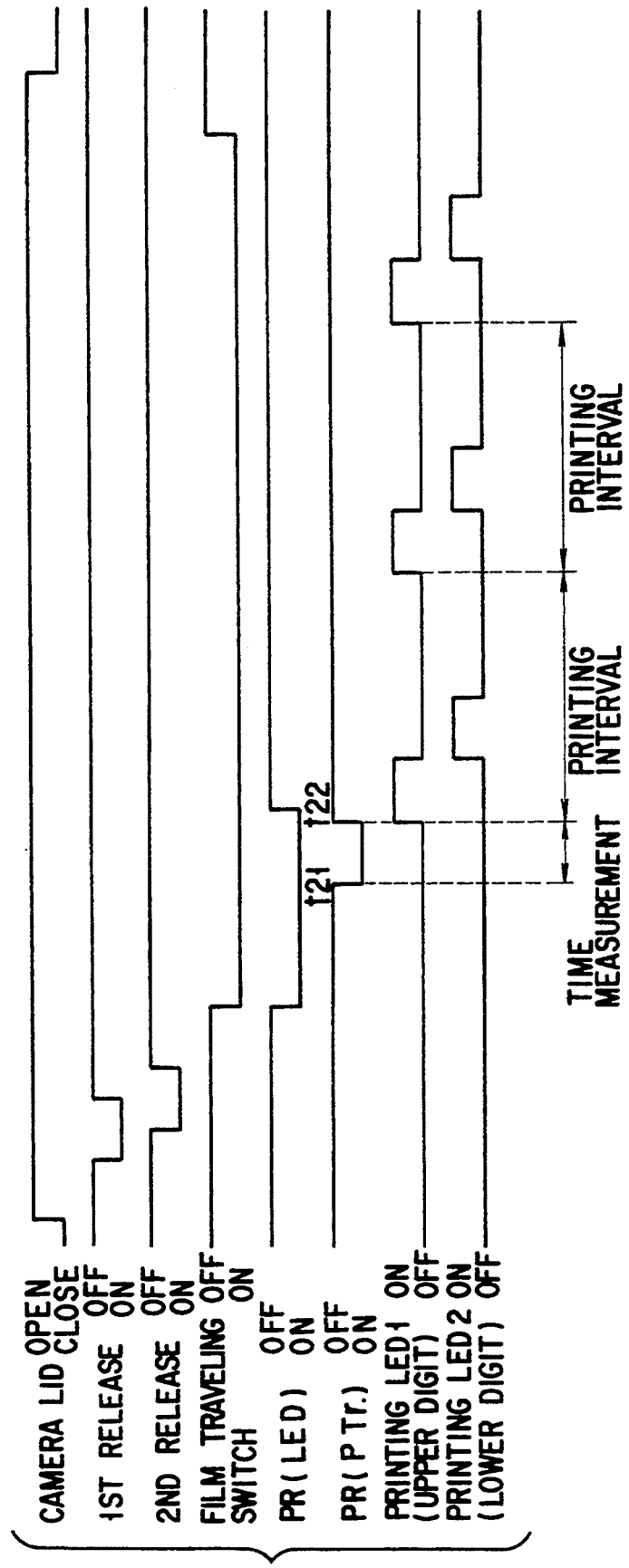
FIG. 19 is a timing chart when the film traveling speed is detected by measuring a passage time of the leading edge portion of a film.

FIG. 19 is a timing chart when the film traveling speed is detected by measuring a passage time of the leading edge portion 22 of the film.

The PTr 53 is turned on upon detection of the leading end of the film (time $t_{21}$). When the film 4 travels further, the PTr 53 is turned off at the boundary between the edge portion 22 and the image forming surface portion 21 since the reflectance of infrared light is decreased (time $t_{22}$). A time interval between a time $t_{21}$ and a time $t_{22}$ is measured, and is fed back to the emission interval of the printing LEDs 14.

Figure 20:
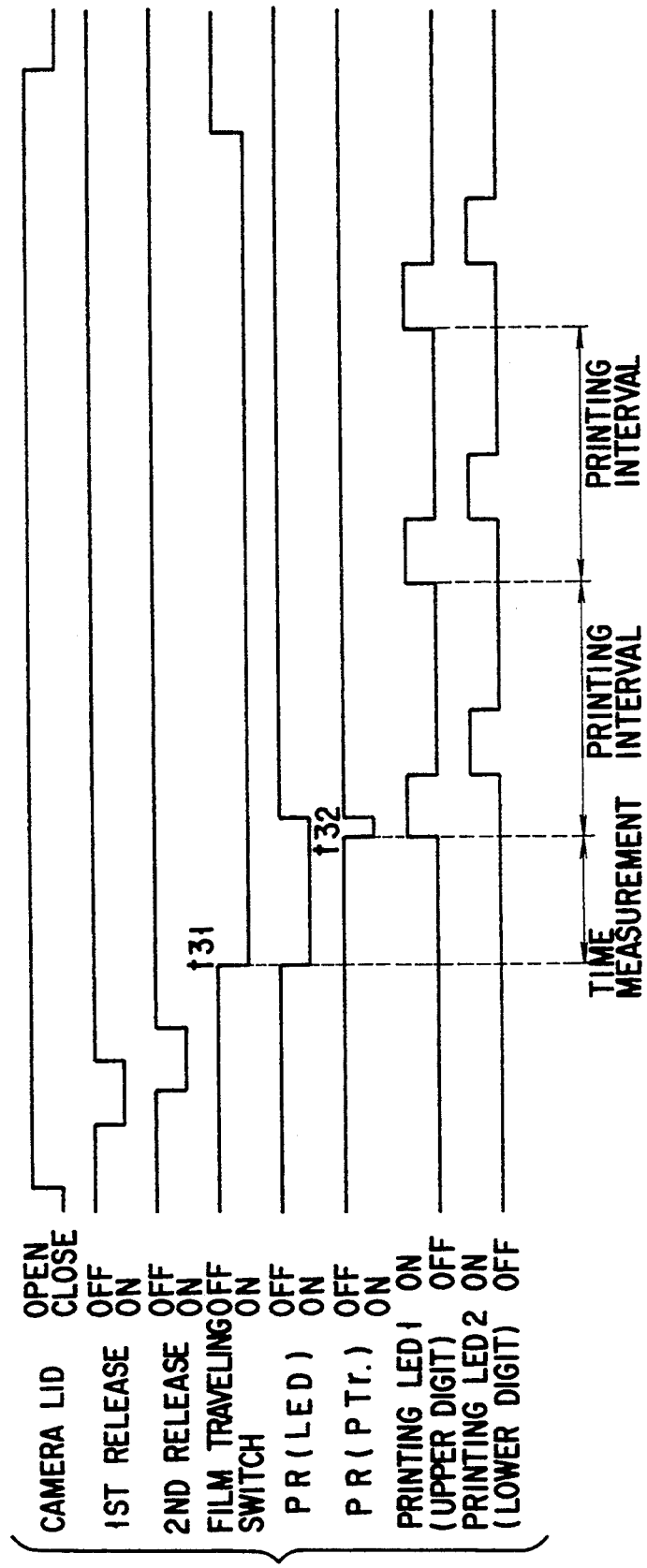
FIG. 20 is a timing chart when the traveling speed is detected by measuring a time interval between an ON operation of a film traveling switch and an OFF operation of a photoreflector.

FIG. 20 is a timing chart when the traveling speed is detected by measuring a time interval between the ON operation of the film traveling switch 62 (time $t_{31}$) and the ON operation of the PTr 53 (time $t_{32}$).

Figure 21:
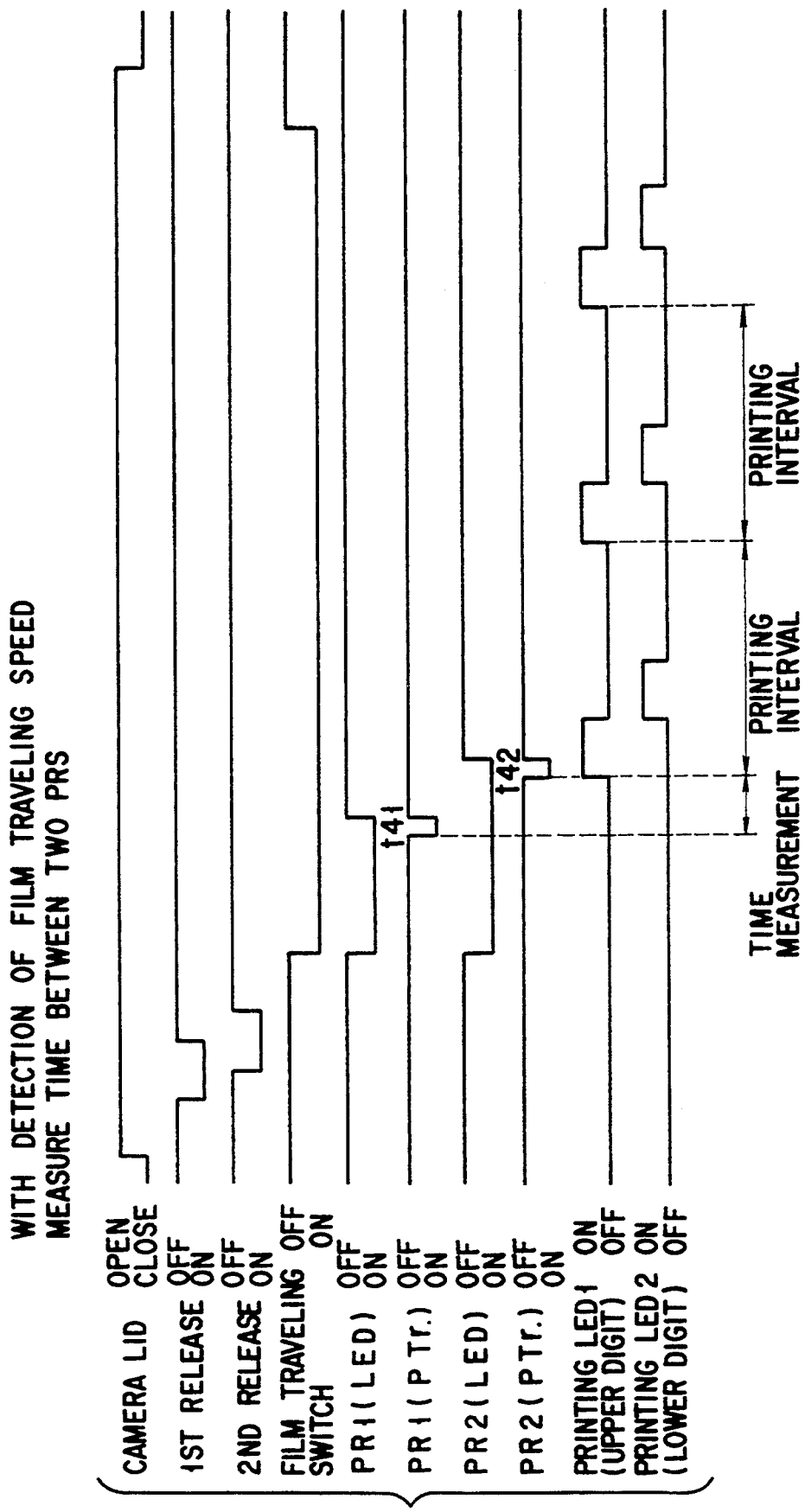
FIG. 21 is a timing chart when two photoreflectors are arranged at a predetermined interval along a traveling direction in a film traveling chamber to measure a difference between ON times of the two photoreflectors, thereby detecting the speed.

FIG. 21 is a timing chart when two PRs are arranged at a given interval along the traveling direction in a film traveling chamber, and the speed is detected by measuring a difference between ON times (from a time $t_{41}$ to a time $t_{42}$) of the two PRs.

The remote control operation will be described below with reference to the timing chart shown in FIG. 22.

At a time $t_{51}$, the camera lid is opened, and the power switch is turned on. When the remote control mode selection button is depressed at a time $t_{52}$, the mode is switched from the normal mode to the remote control mode in response to the trailing edge of the signal. At the same time, the sub CPU 29 is switched from a HALT mode to a high-speed mode. At this time, the main CPU may often be halted. This is because the main CPU is halted if it is left unoperated for 30 sec from the ON operation of the power switch. Therefore, a start signal is output to the main CPU (from a time $t_{52}'$ to a time $t_{53}$).

When the remote control signal is received from a time $t_{54}$ to a time $t_{55}$, the sub CPU 29 outputs first and second release signals at times $t_{56}$ and $t_{57}$, and a photographing operation is performed. After the photographing operation is ended, the film is fed, and the film traveling switch 62 is turned on (time $t_{58}$), thus performing the date printing operation. Upon completion of the film traveling operation, the film traveling switch 62 is turned off (time $t_{59}$).

Thereafter, if the camera is left unused while the release button of the camera main body or a remote controller is not depressed, the sub CPU 29 outputs the main CPU start signal every 30 sec (times $t_{60}$ and $t_{61}$). When five minutes elapse from when the remote control mode is started (time $t_{62}$), the camera is returned to the normal mode. When the camera lid is closed, the power switch is turned off (time $t_{63}$).

Figure 23:
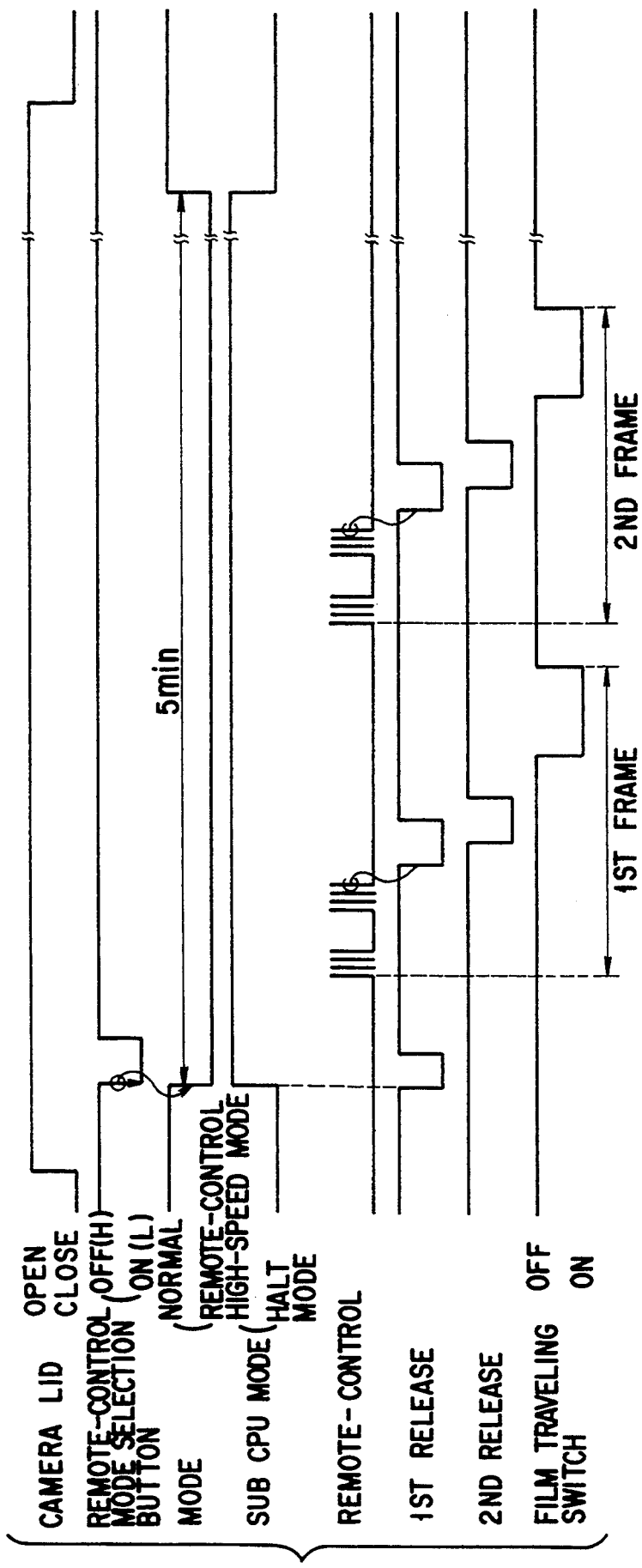
FIG. 23 is a timing chart when two frames are photographed in a remote control mode.

FIG. 23 is a timing chart when two frames are photographed in the remote control mode. A release operation can be performed a desired number of times for 5 minutes in the remote control mode.

Figure 24A:
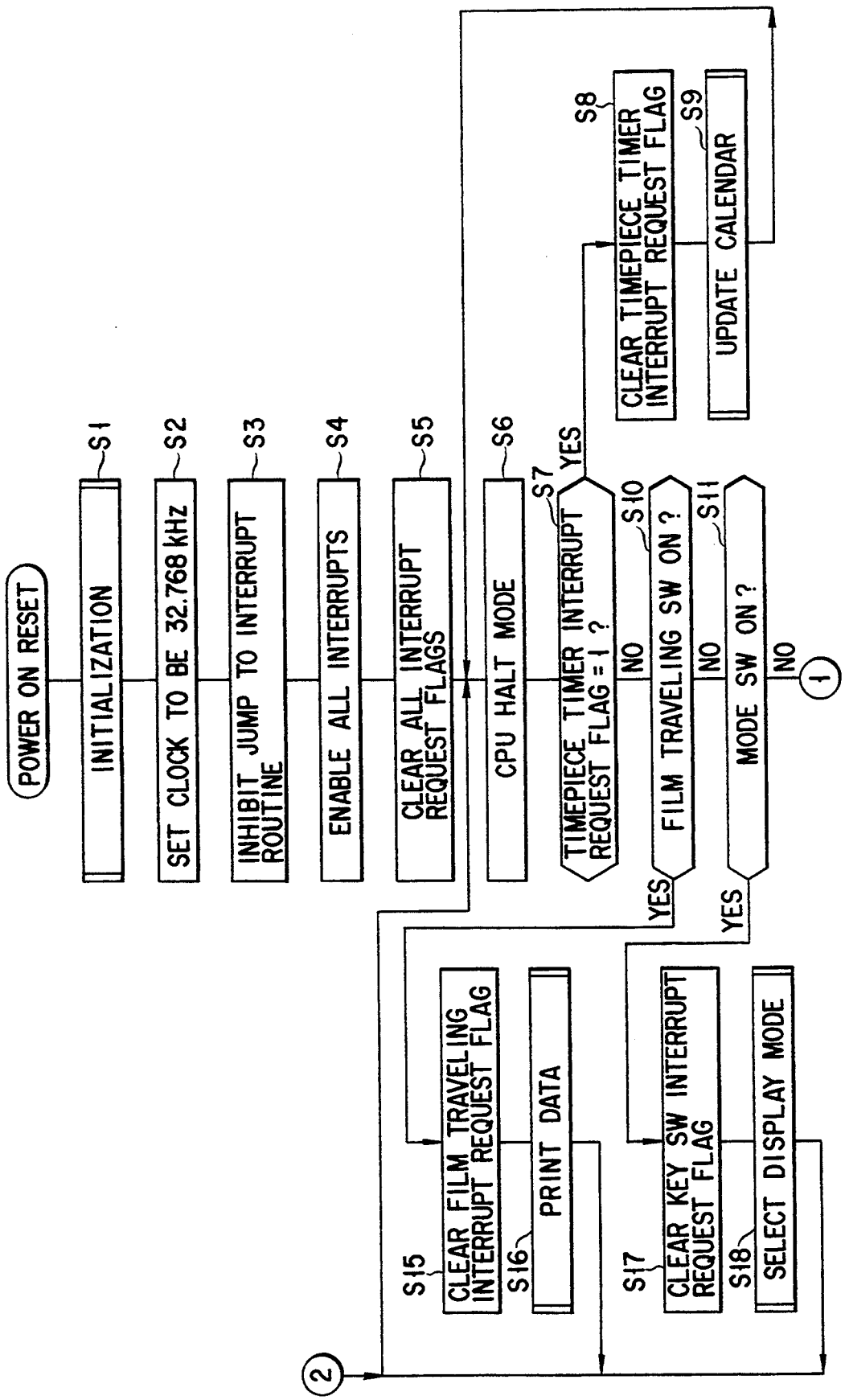
FIGS. 24A, 24B and 24C are flow charts for explaining an operation of a sub CPU for performing a date printing operation, and reception of a remote control signal.
Figure 24B:
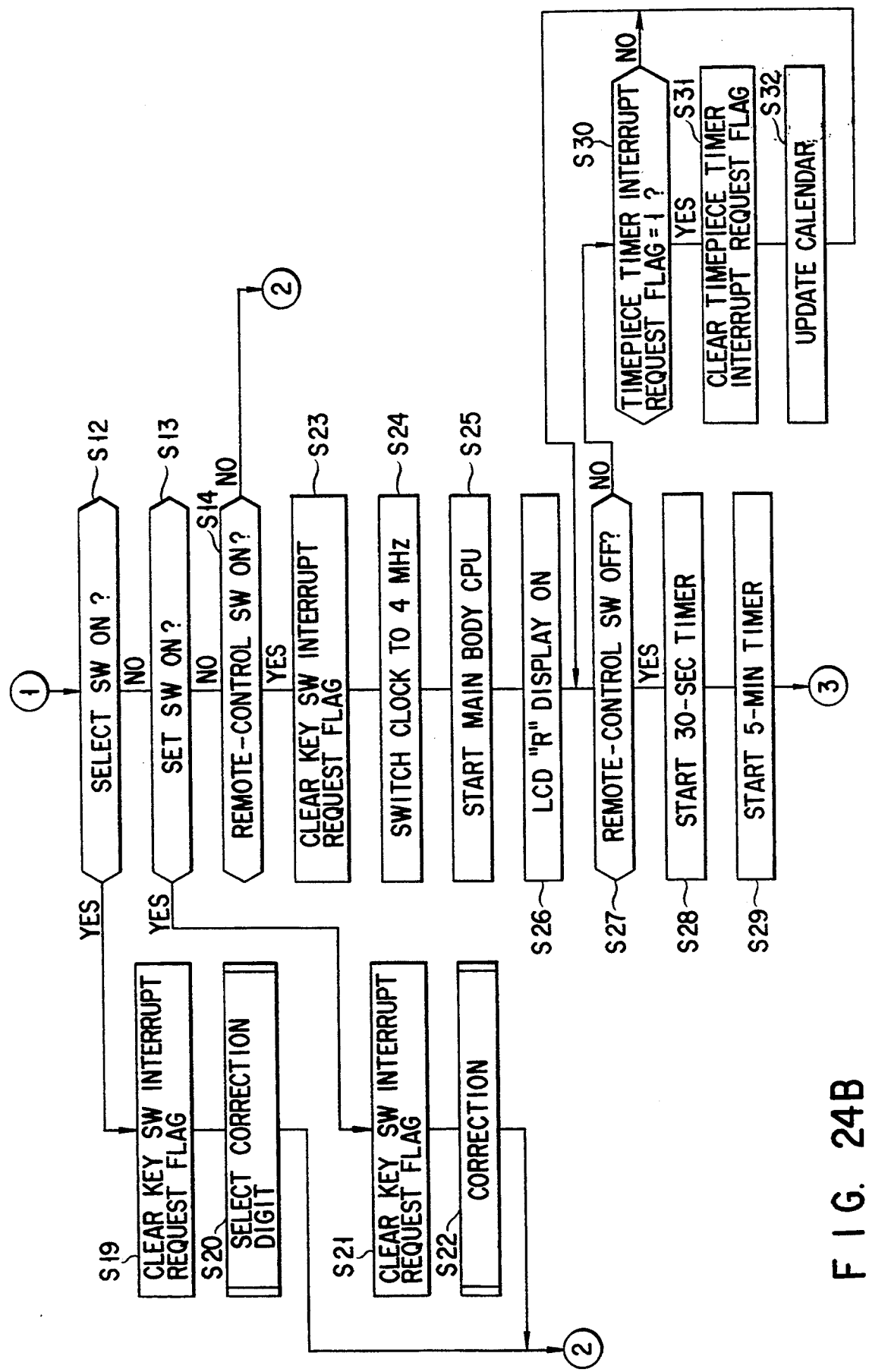
Figure 24C:
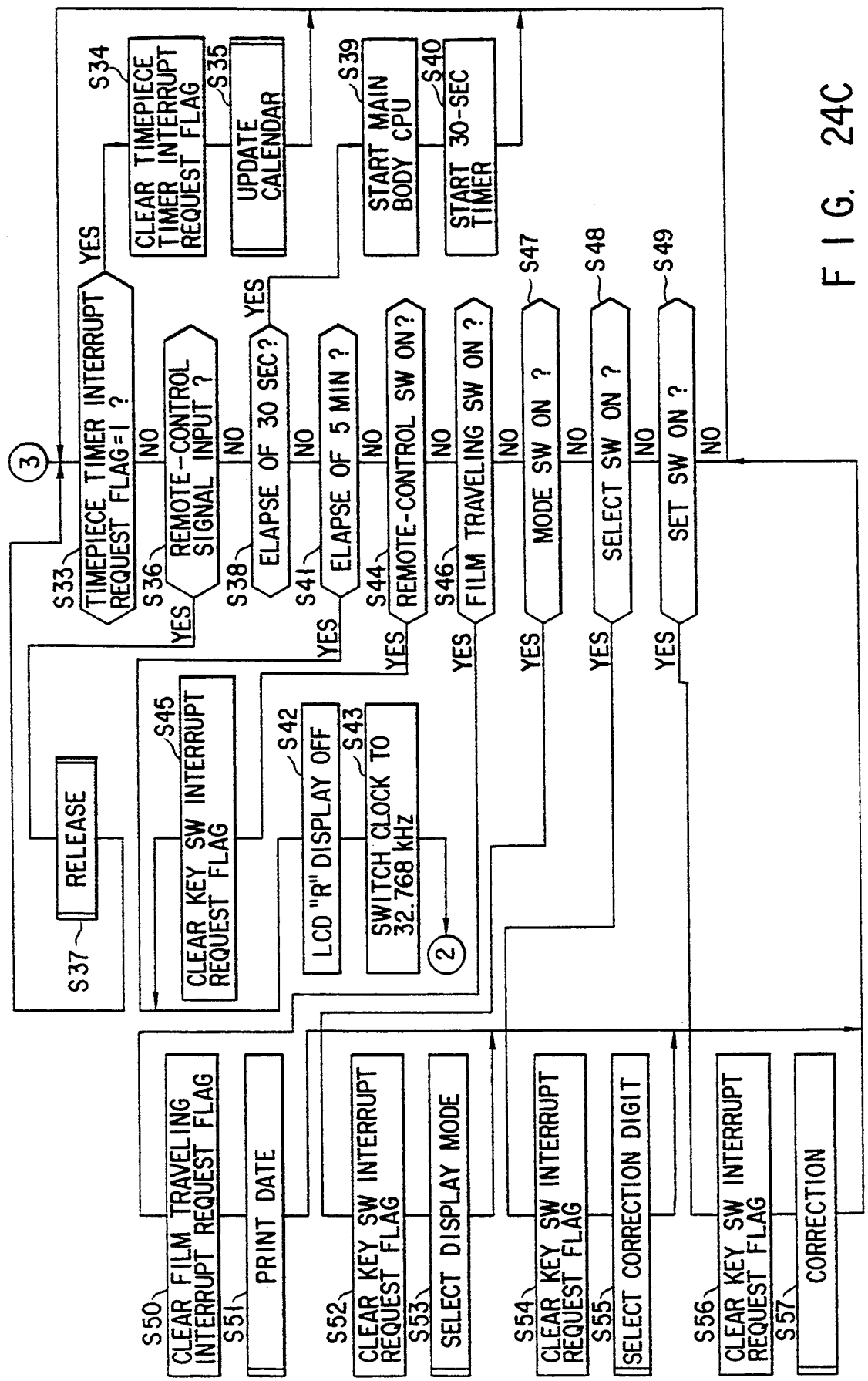

FIGS. 24A, 24B and 24C are flow charts for explaining an operation of a sub CPU for performing a date printing operation, and reception of a remote control signal. These operations will be described below step by step.

When the power supply voltage begins to be supplied, i.e., when the film pack 3 or the backup battery 24 is set in a state wherein no power supply voltage is supplied the sub CPU 29, i.e., in a state wherein neither the film pack (including a battery) 3 nor the calendar backup battery 24 are set in the camera, the power-ON reset operation is performed, and the CPU performs various initial setting operations (step S1). In step S2, a clock is set at 32.768 kHz (the clock can be switched between 32.768 kHz and 4 MHz).

In step S3, the CPU inhibits the flow to jump to an interrupt routine when an interrupt request is generated. In step S4, the CPU enables all the interrupts. Although the flow is inhibited from jumping to the interrupt routine upon generation of an interrupt request by step S3, an interrupt request flag can be set at that time.

In step S5, all the interrupt request flags are cleared. Thereafter, in step S6, a CPU HALT mode is started. As long as the CPU is set in this mode, current consumption can be suppressed. If any interrupt request is generated, the CPU exits from the HALT mode, and the flow advances to the next step.

In step S7, it is checked if a timepiece timer interrupt request flag is set. The timepiece timer is operated based on the quartz oscillator 40 (32,768 kHz), and generates an interrupt request every 0.5 sec. If it is determined that the interrupt request flag is set, the flow advances to step S8 to clear this flag. Thereafter, calendar data is updated in step S9, and the control returns to the HALT mode (step S6).

If it is determined in step S7 that the timepiece timer interrupt request flag is not set, i.e., if the CPU exits from the HALT mode in response to the ON operation of one of the film traveling switch 62, the calendar correction switches (MODE SW, SELECT SW, and SET SW), and the remote control mode selection switch (remote control SW) (the calendar correction switches and the remote control mode selection switch are connected to the key switch interrupt terminals of the sub CPU 29, and the film traveling switch is connected to the interrupt terminal thereof), the flow advances to steps S10 through S14, and branches at one of these steps.

More specifically, if the film traveling switch is ON, a film traveling interrupt request flag is cleared (step S15), and the flow advances to a date printing subroutine (step S16). If the mode selection switch is ON, a key switch interrupt request flag is cleared (step S17), and the flow advances to a date display mode selection subroutine (step S18). If the correction digit selection switch is ON, the key switch interrupt request flag is cleared (step S19), and the flow advances to a correction digit selection subroutine (step S20). If the correction switch is ON, the key switch interrupt request flag is cleared (step S21), and the flow advances to a correction subroutine (step S22). If the remote control mode selection switch is ON, the control enters the remote control mode. The operations of the date printing, display mode, correction digit selection, and correction subroutines in steps S16, S18, S20, and S22 have been described in the above descriptions of the timing charts, and a detailed description thereof will be omitted here.

If it is determined in step S14 that the remote control mode selection switch is turned on (depressed), the flow advances to step S23 to execute the following remote control operation. In step S23, the key switch interrupt request flag is cleared. In step S24, the clock is switched to the main clock, i.e., 4 MHz since a high-speed clock is required to read a remote control signal (high-speed mode).

Since the main CPU (not shown) cannot detect whether or not the remote control mode is started, it may be set in the HALT mode. In step S25, the start signal is sent to the main CPU (the main CPU controls all the operations other than the date printing and remote control reception operations). An "R" mark indicating the remote control mode is displayed on the calendar data external display LCD 25 (step S26).

Then, it is confirmed that the remote control mode selection switch is turned off (the push button is released) (step S27). Thereafter, a 30-sec timer for sending the start signal to the main CPU every 30 sec, and a 5-minute timer for resuming the normal mode after an elapse of 5 minutes from the beginning of the remote control mode are started (steps S28 and S29), and the control enters a loop for waiting for the input remote control signal. If it is determined in step S27 that the remote control mode selection switch is not turned off, the flow advances to step S30 to check if the timepiece timer interrupt request flag is set. If it is determined that the interrupt request flag is set, the flow advances to step S31 to clear this flag, and calendar data is updated in step S32. Thereafter, the flow returns to step S27.

On the other hand, in the loop for waiting for the input remote control signal, since a timepiece timer interrupt may occur every 0.5 sec while the control is waiting for the remote control signal, the interrupt request flag is checked (step S33). If it is determined that the request flag is set, the flag is cleared (step S34), and calendar data is updated (step S35).

If it is determined in step S33 that the request flag is not set, it is checked if the remote control signal is input (step S36). If YES in step S36, a release signal is output (step S37).

It is then checked if 30 sec have elapsed from the start of the 30-sec timer (step S38). If YES in step S38, the flow advances to step S39 to supply the start signal to the main CPU (described in the above-mentioned timing chart), and the 30-sec timer is restarted (step S40). The flow then returns to step S33. Thereafter, while the control stays in the loop for waiting for the input remote control signal, the above-mentioned operation is performed every 30 sec.

It is checked in step S41 if five minutes have elapsed from the start of the 5-minute timer. If YES in step S41, the "R" mark on the external display LCD 25 is turned off (step S42), the clock is switched to 32.768 kHz (step S43), and the control returns to the HALT mode in step S6 (the remote control mode is canceled).

If the remote control mode selection switch is turned on while the control stays in the loop for waiting for the input remote control signal, this ON operation is detected in step S44, and the control exits from the loop. The key switch interrupt request flag is cleared (step S45), and the flow advances to steps S42 and S43 to cancel the remote control mode.

In steps S46 through S49, if the film traveling switch 62 or a switch associated with date correction (MODE SW, SELECT SW, or SET SW) is turned on, the flow branches at the corresponding step like in steps S10 through S13 described above. In steps S50 through S57, the same operations as in steps S15 through S22 described above are performed.

The second embodiment of the present invention will be described below. In this embodiment, two PRs and a 1-digit printing LED are used.

Figure 25:
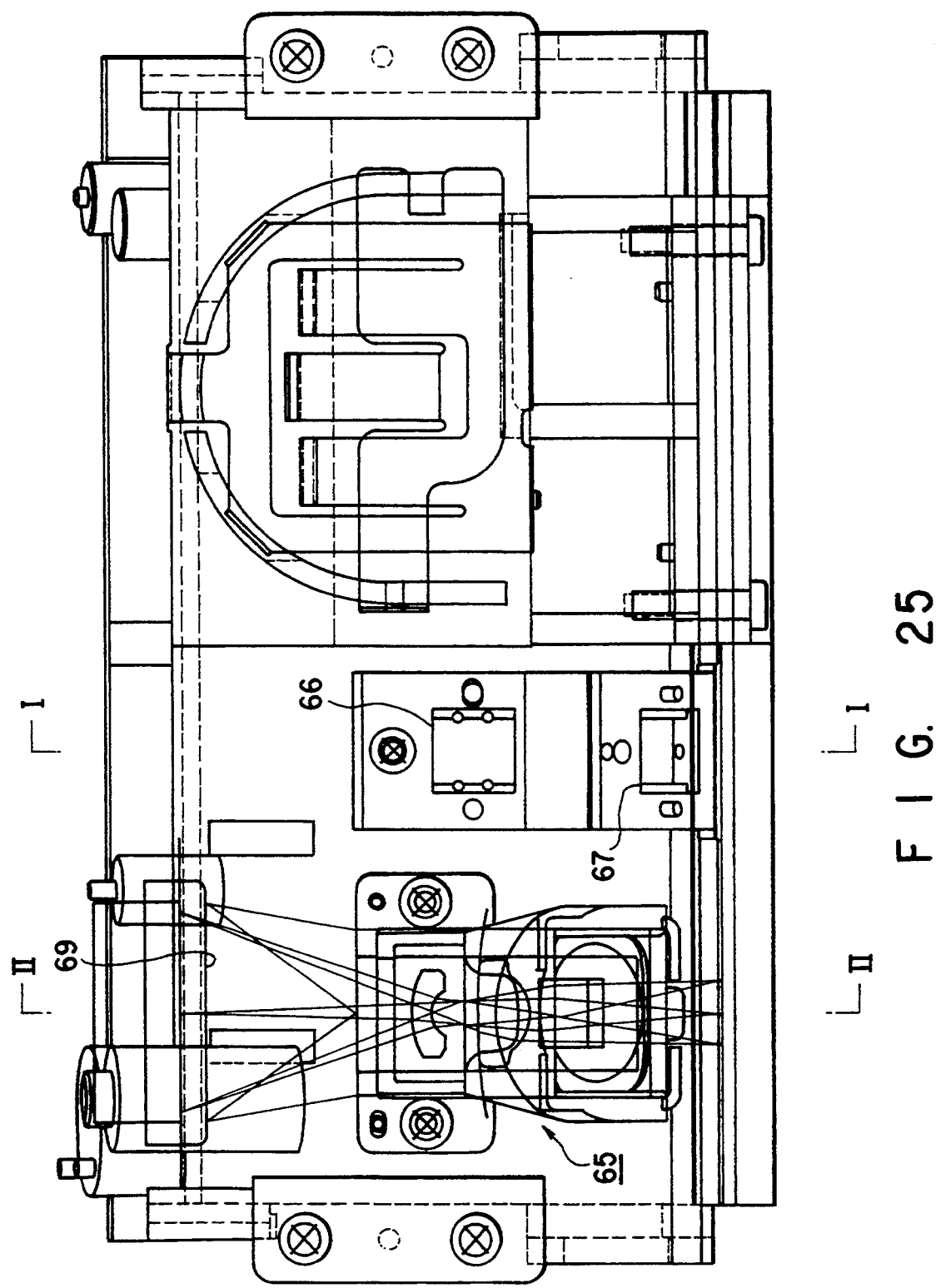
FIG. 25 is a rear view of a spool wall of a camera adopting a data printing apparatus according to the second embodiment of the present invention.

FIG. 25 is a rear view of a spool wall of a camera adopting a data printing apparatus according to the second embodiment of the present invention. In FIG. 25, a date printing optical system 65 is arranged at the left side, and PRs 66 and 67 (reflection type photosensors) are arranged at the central portion.

FIG. 26 is a sectional view taken along a line II—II of the camera shown in FIG. 25. The printing optical system 65 is mounted on a plane in FIG. 26. One printing 7-segment LED 69 is fitted in the upper portion of a lens frame 68 of the printing optical system 65. More specifically, when the LED 69 emits light, data for one digit can be printed. Light emitted from the LED 69 passes through lenses 70 and 71, and is reflected by a mirror 72. The reflected light is exposed on a film surface (not shown) through a printing window 74 formed in a spool wall 73. The printing window 74 is formed at a position inclined at 20° from the horizontal plane due to mechanical and design limitations. The position of the window 74 is determined such that when a printing operation is started at a position where the leading end of a film passes the PR 67 for a certain distance, a numeral is printed at a proper position on a film surface. The printing position is indicated by $P_0$ in FIGS. 27A through 27F.

FIGS. 27A through 27F are sectional views taken along a line I—I of the camera shown in FIG. 25, and show traveling states of a film 4, which travels along the spool wall 73. Note that FIGS. 27A through 27F are sectional views taken along a cut line different from that of FIG. 26 in the camera shown in FIG. 25.

As shown in FIG. 27A, the sheet film 4 is fed by film feed rollers 75, and travels along the inner wall of the spool wall 73. At this time, the film 4 is curved along the inner wall, its traveling direction is changed through 180°, and the film is delivered from the lower portion of the spool wall 73. The PRs 66 and 67 themselves emit infrared light, as will be described later. When an object reaches a position in front of the sensor, the corresponding PR detects light reflected by the object, and outputs an ON signal.

Figure 27C:
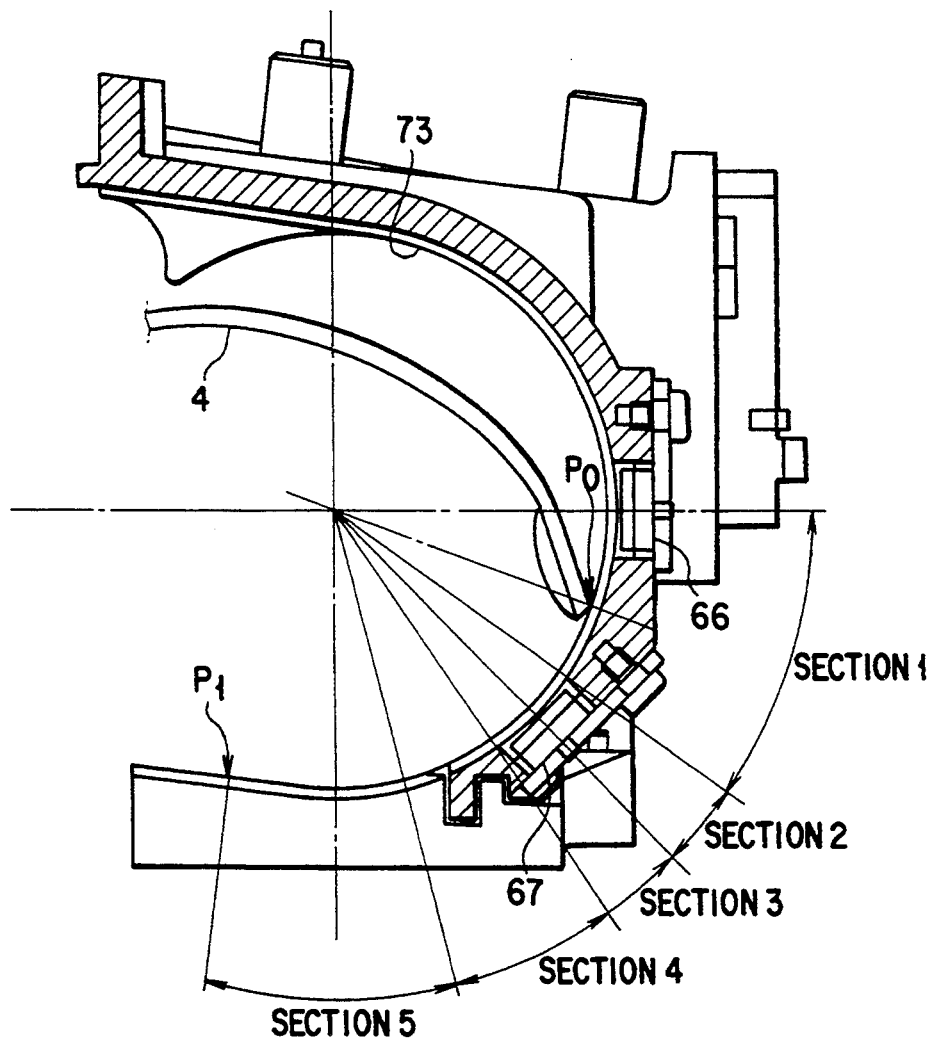
Figure 27D:
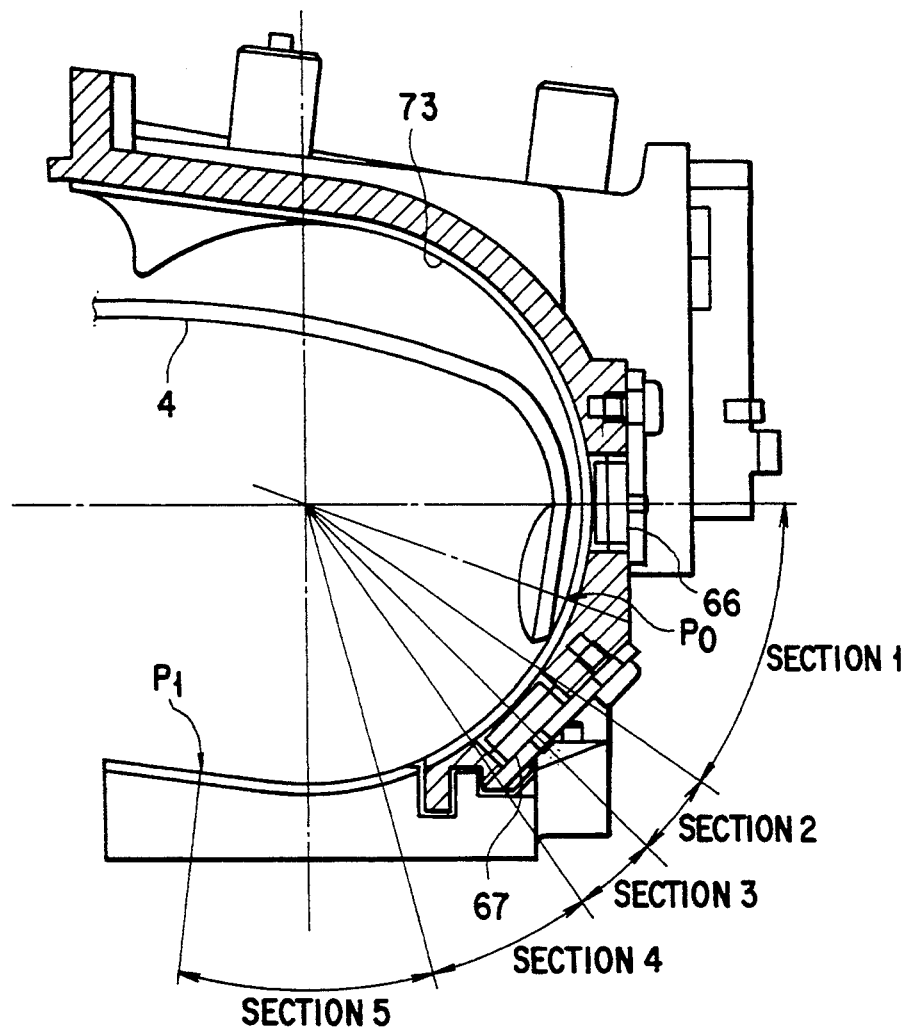

The PR 66 is mounted at the horizontal position (0°) of the spool wall 73, and the PR 67 is mounted at a position inclined at 45° from the horizontal plane. In this apparatus, a time interval between the ON operations of the PRs 66 and 67 is measured to detect the traveling speed of the film 4. Based on this speed, a printing wait time, and emission interval times 1 and 2 (to be described later) are determined. As a result, the positions and intervals of printed numerals can be constant regardless of the traveling speed.

when the film 4 is fed, the leading end of the film 4 reaches the position of the PR 66, as shown in FIG. 27B, and the output from the PR 66 is enabled. FIGS. 27C and 27D show states wherein the leading end of the film 4 is located at an intermediate position between the PRs 66 and 67. The film 4 is deformed across FIGS. 27C and 27D, and its leading end portion is moved slowly.

Figure 27E:
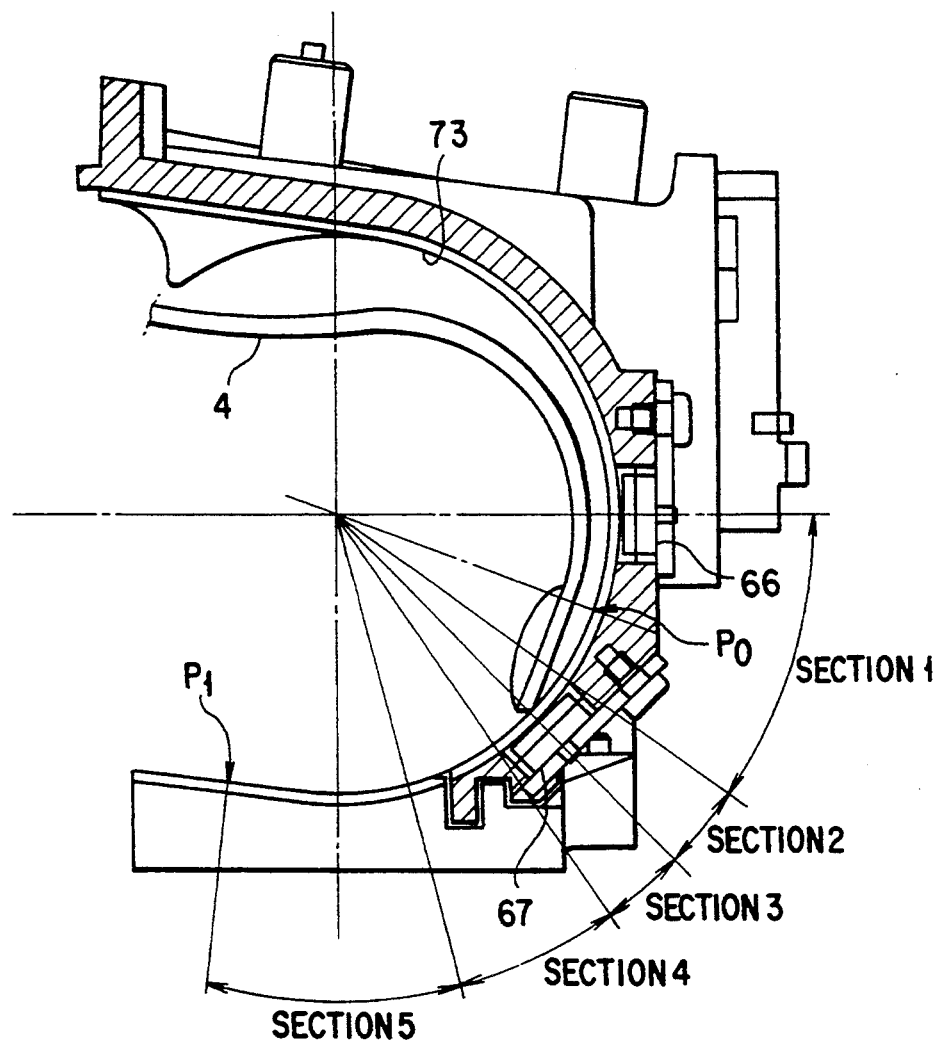
Figure 27F:
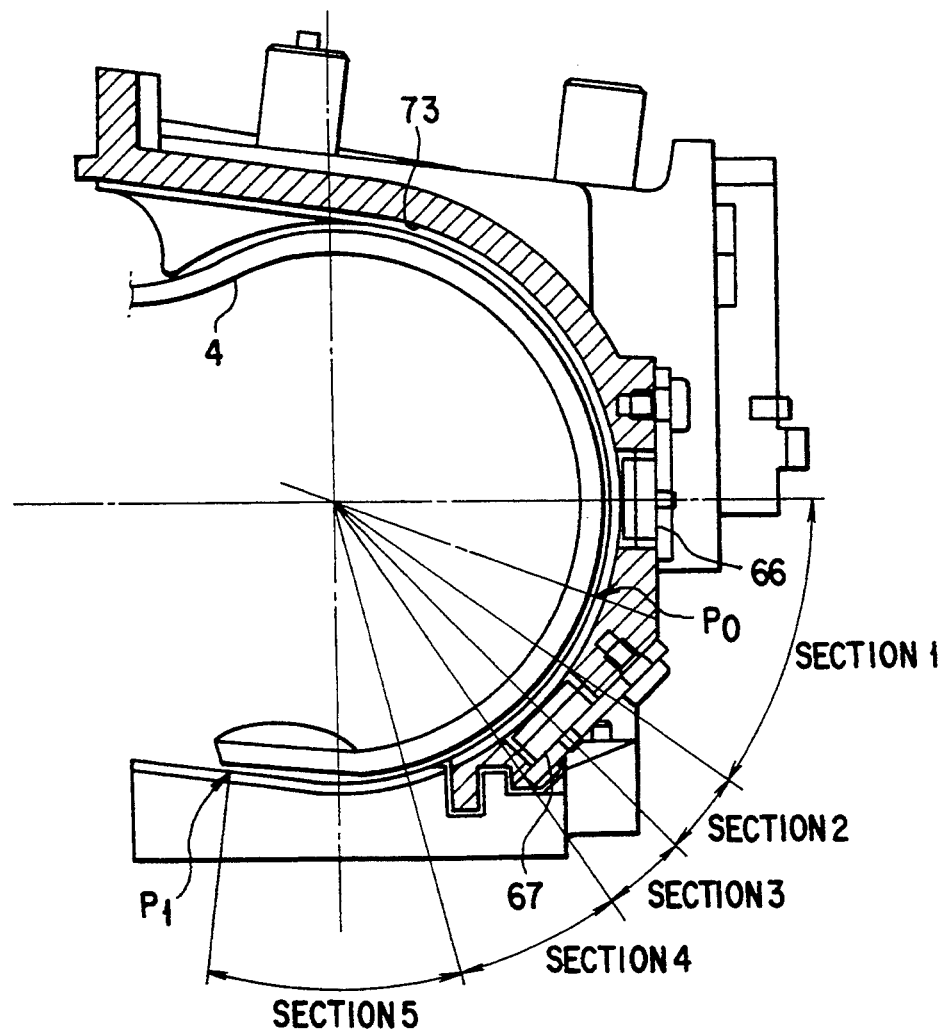

Then, the leading end of the film reaches the position of the PR 67, as shown in FIG. 27E. Thus, the PR 67 is turned on, and its output is obtained. However, due to the positional limitation of the printing optical system 65, the printing operation cannot be started from this instance, and a certain wait time (to be referred to as a printing wait time hereinafter) is required until the printing operation is started.

After an elapse of the printing wait time, when the leading end of the film 4 reaches a position $P_1$ suitable for starting the printing operation, the printing operation is started. The printing start position $P_1$ is a position where characters can be properly printed when the printing operation is started when the leading end of the film 4 reaches this position. At this time, the film 4 is brought into tight contact with the spool wall 73, and the printed numerals will not be blurred. This is because the focal point of the printing optical system 65 is formed on a plane contacting the spool wall 73.

Figure 28:
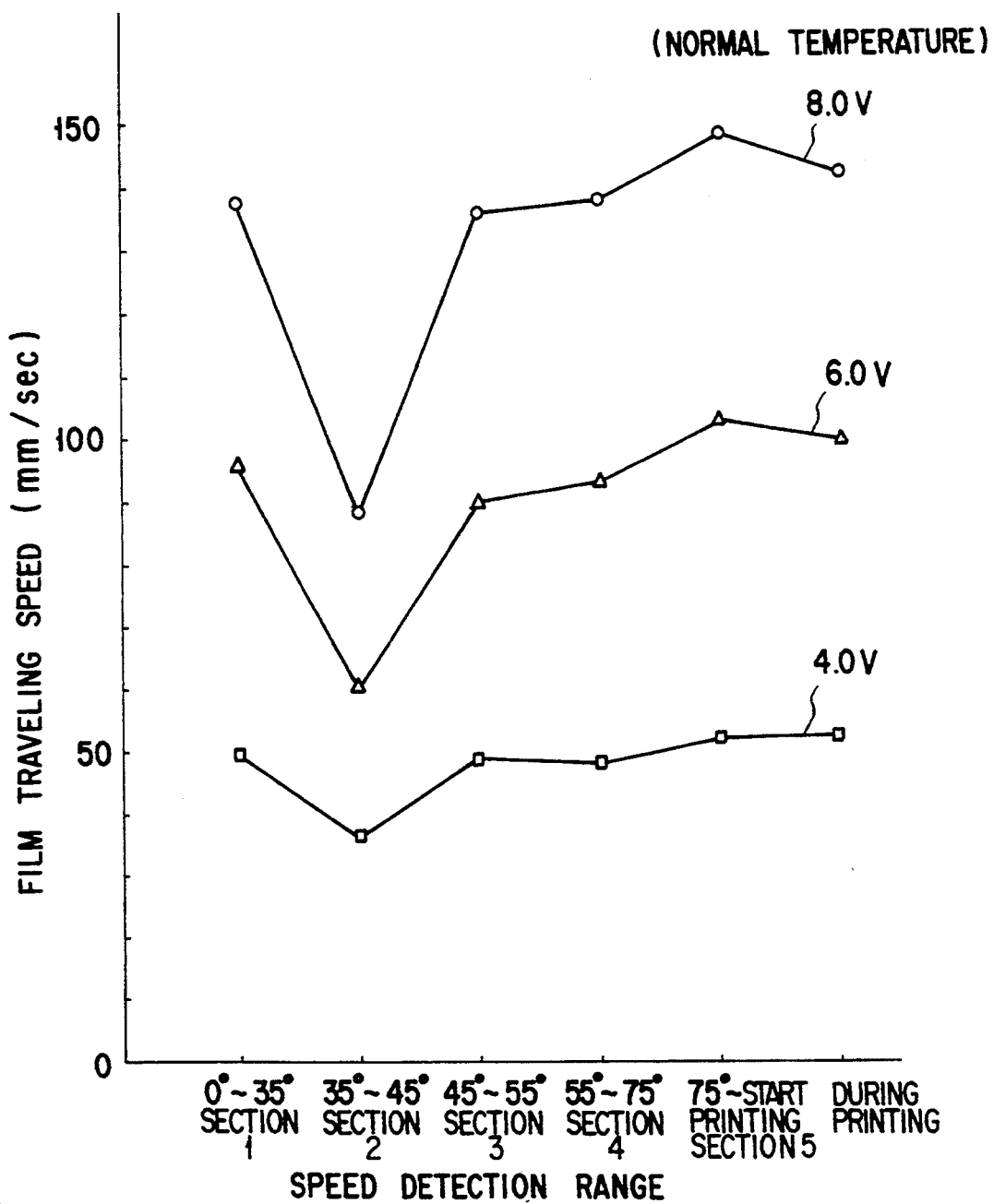
FIG. 28 is a graph showing the relationship of film traveling speeds corresponding to sections 1 through 5 shown in FIGS. 27A through 27F.

As described above, since the film 4 is deformed while it is traveling along the spool wall 73, the traveling speed of the leading end of the film 4 is not always constant. FIG. 28 shows film traveling speeds in sections 1 through 5 shown in FIGS. 27A through 27F. The timings shown in FIGS. 27C and 27D correspond to the section 2. As can be seen from FIG. 28, the speed at that time is considerably decreased.

FIG. 29 shows the relationship between the speed (detected speed) calculated based on the moving time between the PRs 66 and 67, and the speed during the printing operation. As can be understood from FIG. 29, even if the speed changes due to various factors such as the temperature, the power supply voltage, and the like, the ratio of the detected speed to the speed during the printing operation is constant. Therefore, when the detected speed is multiplied with a coefficient k, the speed during the printing operation can be predicted. For example, if the film traveling speed during the printing operation is 150 mm/sec., since the film traveling speed upon detection is 126.5 mm/sec., the coefficient k is given by:

$$\text{Coefficient } k = \frac{\text{Speed upon printing}}{\text{Speed upon detection}}$$
$$= \frac{150}{126.5}$$
$$= 1.19$$

The operation of the second embodiment will be described below. In this case, the operation of the second embodiment is substantially the same as that in the first embodiment, except for step S16 in the flow charts shown in FIGS. 24A, 24B, and 24C, and a detailed description thereof will be omitted.

Figure 30:
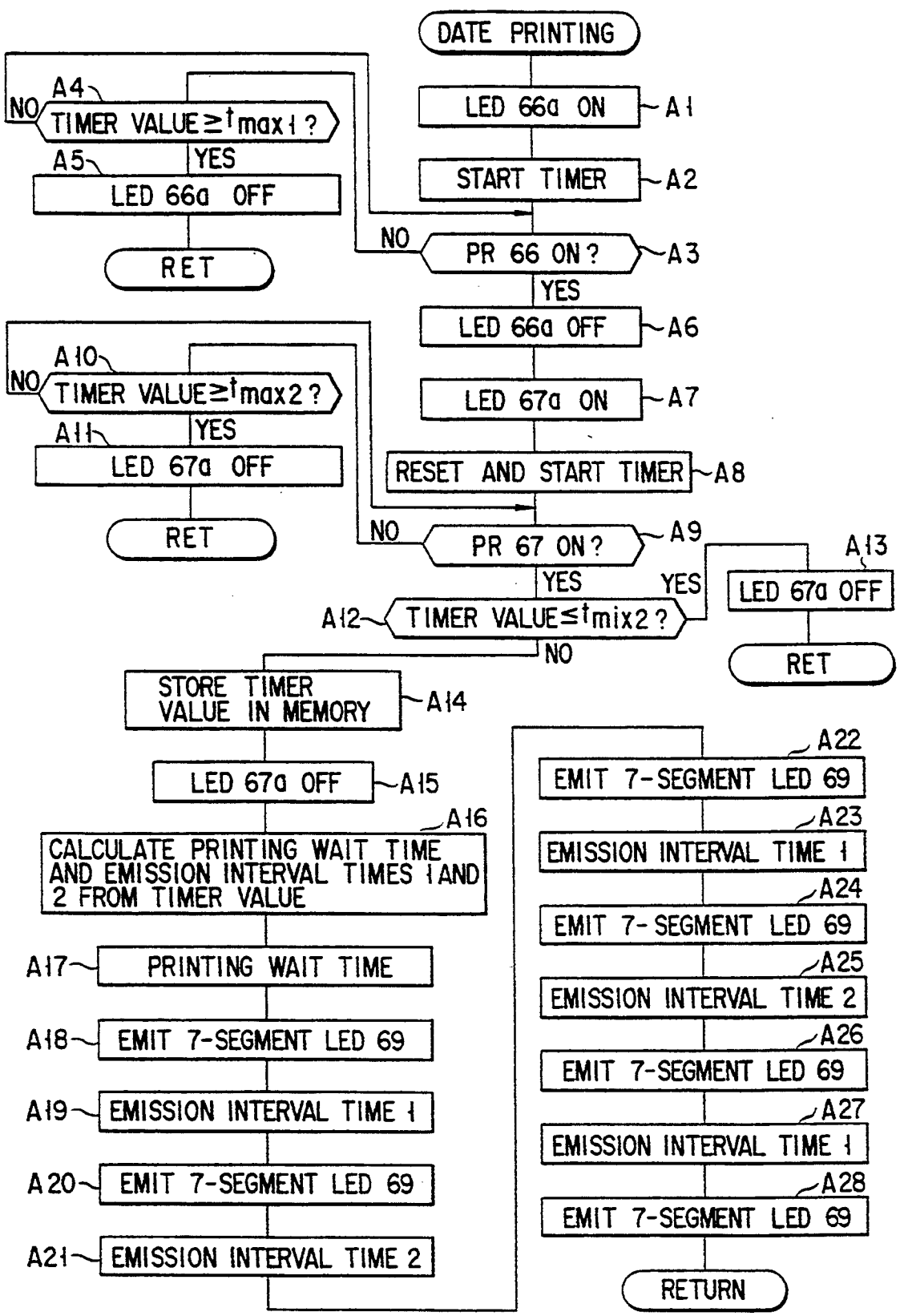
FIG. 30 is a flow chart showing a subroutine for explaining a date printing operation according to the second embodiment.

FIG. 30 shows a date printing subroutine. FIG. 31 is a circuit diagram of a circuit for switching the emission timings of LEDs as infrared light-emitting units of the PRs 66 and 67. In FIG. 31, reference symbols Tr1 and Tr2 denote switching transistors for switching the emission timings of LEDs 66a and 67a in the infrared light-emitting units of the PRs 66 and 67, respectively.

In the subroutine shown in FIG. 31, the CPU is started in response to the ON operation of the film traveling switch, and the date printing subroutine is started. In step A1, the LED 66a as the infrared light-emitting unit of the PR 66 is turned on. In step A2, a timer is started. With this timer, if the PR 66 is not turned on after an elapse of a given time period ($t_{max1}$), the printing operation is stopped. This is to stop the printing operation when a film feed operation fails for some reason.

In step A3, the control waits for the ON operation of the PR 66. During this wait time, the timer value is measured in step A4. When the PR 66 is not turned on after the elapse of the time period $t_{max1}$, as described above, i.e., when the timer value exceeds $t_{max1}$, the flow advances to step A5, and the LED 66a of the PR 66 is turned off to stop the printing operation.

If it is determined in step A3 that the PR 66 is turned on, since emission of the LED 66a of the PR 66 is unnecessary, the flow advances to step A6 to turn off the LED 66a. In step A7, the LED 66a of the PR 67 is turned on. In step A8, the timer is reset and started so as to measure a time interval between the ON operations of the PRs 66 and 67.

In step A9, a check is made to see whether PR67 is ON. If PR67 is not ON, the control wait for PR67 to be turned on, with step A9 executed. During this wait time, the timer value is measured in step A10. When the PR 67 is not turned on after an elapse of a given time period ($t_{max2}$), i.e., when the timer value exceeds $t_{max2}$, the flow advances to step A11 to turn off the LED 66a of the PR 67, thereby stopping the printing operation.

In this manner, after the PR 67 is turned on, the flow advances to step A12 to check if the timer value equal to or smaller than $t_{min2}$. If YES in step A12, a feed error is determined, and the flow advances to step A13. In step A13, the LED 66a of the PR 67 is turned off to stop the printing operation.

With the above-mentioned operation, when the film traveling speed is abnormally high or low, the date printing operation is stopped. In this subroutine, the above-mentioned printing wait time and emission interval times 1 and 2 (to be described later) are calculated by a table look-up method. The above-mentioned abnormality detection routine can prevent that data of the timer value falls outside the table, and characters are printed at abnormal positions or intervals. FIGS. 32A and 32B show abnormal printing results which may occur without the abnormality detection routine.

FIG. 32A shows a printing result when the film traveling speed is abnormally low. In this case, the printing start timing is set too early, and printed numerals extend from the right end of the image forming surface or overlap each other. FIG. 32B shows a printing result when the traveling speed is too high. In this case, the printing start timing is set too late, and the printing start position is shifted to the left side, or the interval between printed numerals becomes abnormally wide, or all the numerals cannot be printed on the image forming surface and extend from the left end.

After the control exits from step A12, and clears the abnormality detection routine, the timer value is stored in a memory in step A14. In step A15, the LED 66a of the PR 67 is turned off. In step A16, a table look-up operation is performed on the basis of the timer value stored in step A14, thereby calculating the above-mentioned printing wait time and emission interval times 1 and 2 (to be described later). For this purpose, three kinds of tables are prepared.

In step A17, the control waits for the printing wait time determined by the above-mentioned calculation. Thus, the printing start position is determined. In step A18, the first exposure operation is performed upon emission of the 7-segment LED 69. In, e.g., a "year, month, day" mode, the lower digit of "day" is exposed. In step A19, the control waits for the emission interval time 1 calculated in step A16. The emission interval time 1 determines an interval between the upper and lower digits.

Thereafter, in step A20, the second exposure operation is performed. In this case, in the "year, month, day" mode, the upper digit of "day" is exposed. In step A21, the control waits for the emission interval time 2 calculated in step A16. This interval time determines an interval between the upper digit of "day" and the lower digit of "month" in, e.g., the "year, month, day" mode.

Figure 33:
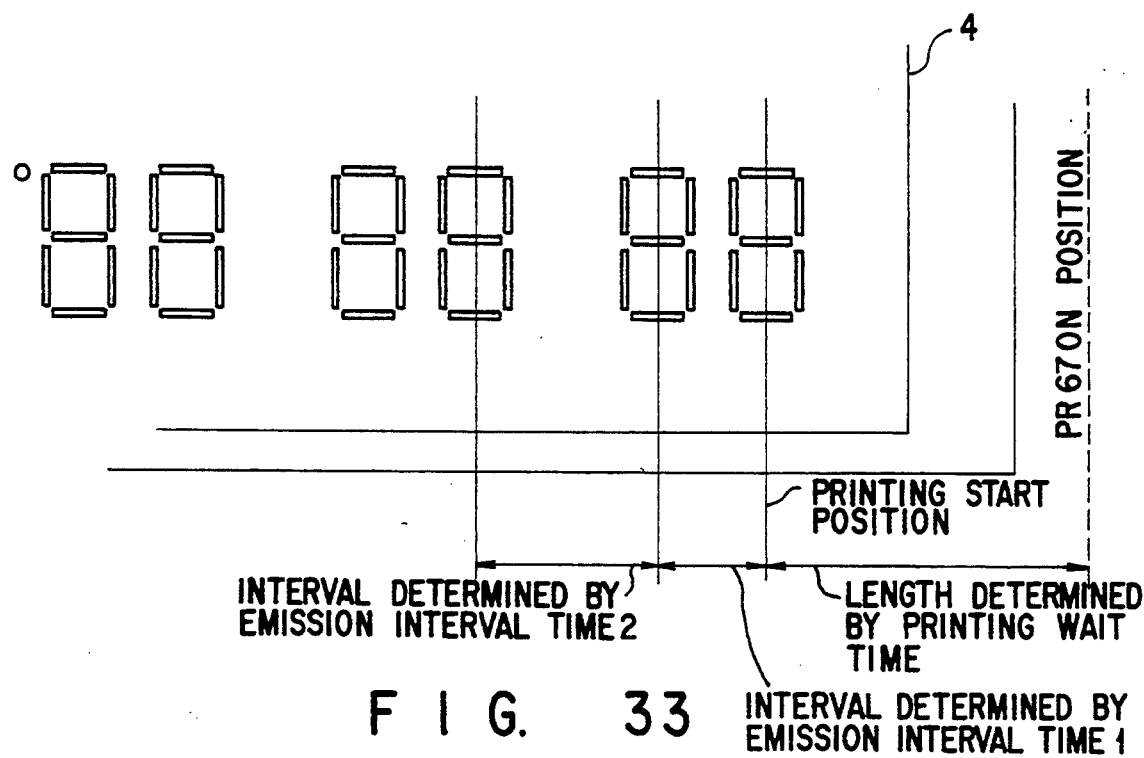
FIG. 33 is a view showing an interval between the positions of date characters printed at positions determined by the emission interval.

FIG. 33 shows the positions and intervals of date characters determined by the above-mentioned operations.

Figure 34:
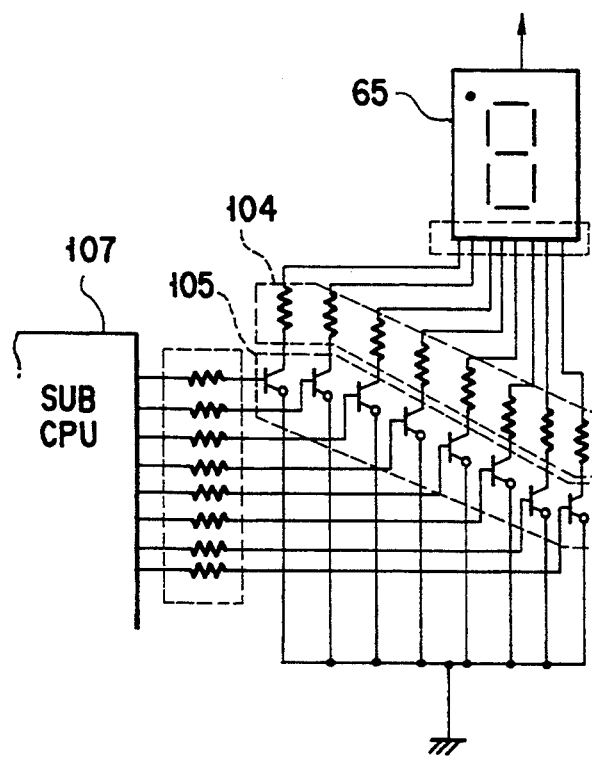
FIG. 34 is a circuit diagram when a 1-digit printing LED is used in a date printing operation.

FIG. 34 shows a circuit arrangement of the 7-segment LED 69 for printing one digit. With this circuit arrangement, emission for the printing operation is performed six times.

Returning to FIG. 30 once again, since emission for the printing operation is performed six times, the operations in steps A18 through A21 are repeated two more times in steps A22 through A28. Thus, "month" and "year" are printed in, e.g., the "year, month, day" mode. In this case, the last emission interval time 2 is unnecessary.

Figure 35:
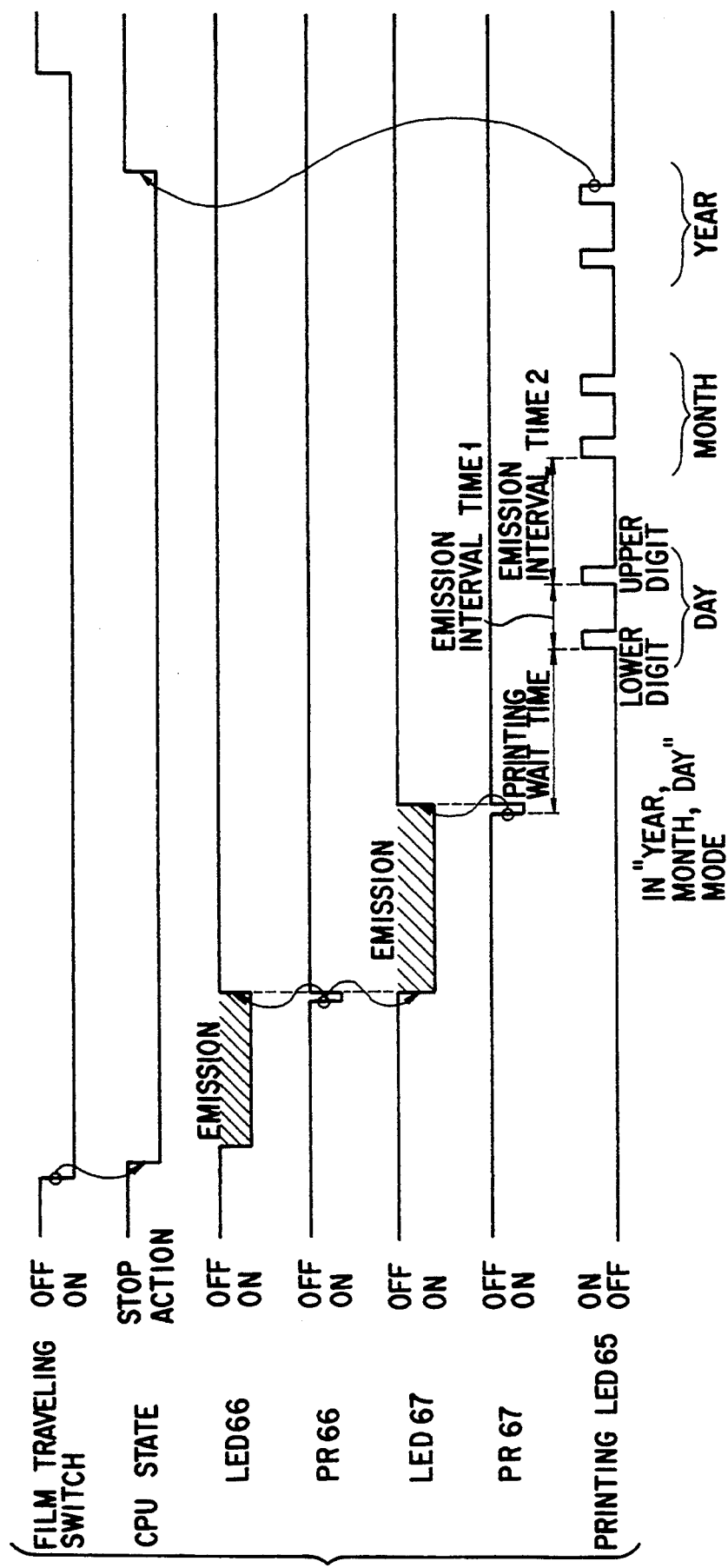
FIG. 35 is a timing chart when a printing wait time is required upon detection of the film traveling speed.

FIG. 35 is a timing chart when the PRs 66 and 67 for detecting the traveling speed of the film 4 are arranged at positions illustrated in FIGS. 27A through 27F, and the printing wait time from the ON operation of the PR 67 until the start of the printing operation is required.

When the PR 67 is turned on, the control waits for the printing wait time calculated based on the time interval between the ON operations of the PRs 66 and 67, and thereafter, the first exposure operation is performed.

The timing chart shown in FIG. 35 exemplifies a case wherein the LEDs 66a and 66a of the PRs 66 and 67 are controlled not to be turned on at the same time. More specifically, when the film feed operation is started, the LED 66a of the PR 66 is turned on first, and the control waits for the ON operation of the detection unit of the PR 66. If the film is fed and the PR 66 is turned on, emission of the LED 66a of the PR 66 becomes unnecessary. Therefore, the LED 66a is turned off, the LED 66a of the PR 67 is then turned on, and the control waits for the ON operation of the PR 67.

With this arrangement, current consumption can be suppressed.

The third embodiment of the present invention will be described below. In the above-mentioned embodiments, an instant sheet film is used. However, in the third embodiment, a date is printed on a 35-mm film.

Figure 36:
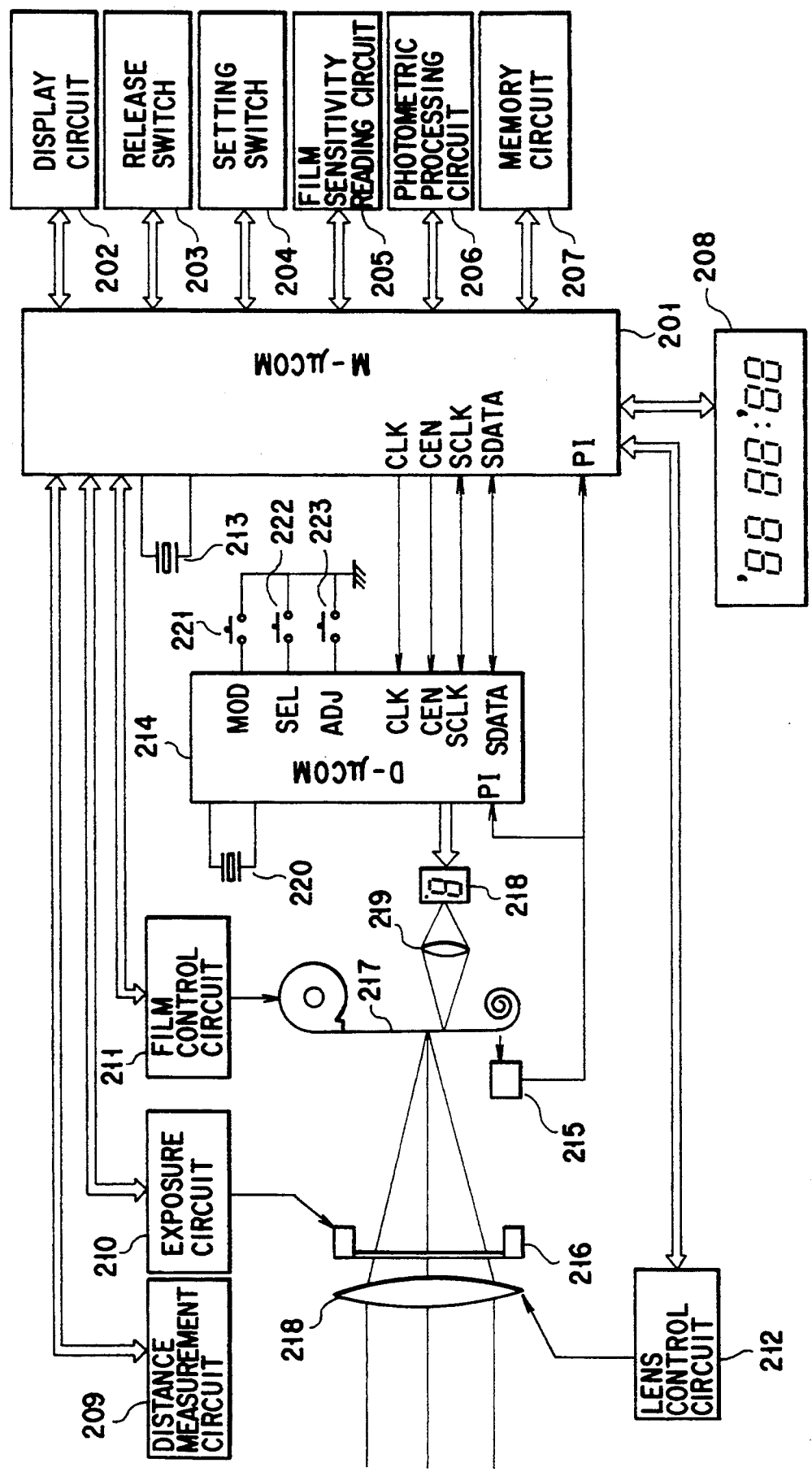
FIG. 36 is a schematic block diagram of a camera adopting a data printing apparatus according to the third embodiment of the present invention.

FIG. 36 is a schematic block diagram of a 35-mm camera adopting a data printing apparatus. A main microcomputer (to be abbreviated to as an M-μCOM hereinafter) 201 performs sequence control of the overall camera system, and various calculations. The M-μCOM 201 is connected, through a bus, to a display circuit 202, a release switch 203, a setting switch 204, a film sensitivity reading circuit 205, a photometric processing circuit 206, a memory circuit 207, a date display circuit 208, a distance measurement circuit 209, an exposure circuit 210, a film control circuit 211, and a lens control circuit 212. The M-μCOM 201 is also connected to an oscillator 213 for generating an operation clock of the M-μCOM 201, a date microcomputer (to be abbreviated to as a D-μCOM hereinafter) 214, and a film movement detection unit 215.

The display circuit 202 displays an operation mode, exposure data, and a photographed film frame count of the camera. The release switch 203 is a two-stroke switch. When the first-stroke switch is turned on, a distance measurement operation is executed, and when the second-stroke switch is turned on, an exposure operation is executed. The setting switch 204 is used for setting the operation mode of the camera. Furthermore, the film sensitivity reading circuit 205 reads a DX code of a film, and supplies an SV value signal to the M-μCOM 201.

The memory circuit 207 is a nonvolatile memory for storing data such as a film frame count, the operation mode of the camera, and the like, which must be stored after a power supply is turned off. The date display circuit 208 displays date data on the basis of data from the D-μCOM 214.

The distance measurement circuit 209 supplies data necessary for measuring a distance to an object to the M-μCOM 201. The exposure circuit 210 controls a lens shutter 216 having functions of both a stop and a shutter on the basis of a control signal from the M-μCOM 201.

The film control circuit 211 performs an automatic wind-up operation, a rewind operation, and the like of a film 217 on the basis of a control signal from the M-μCOM 201. The lens control circuit 212 drives a photographing lens 218 on the basis of a control signal from the M-μCOM 201, thereby forming an object image on the film 217.

The film movement detection unit 215 supplies pulse signals according to the moving amount of the film 217 to the M-μCOM 201 and the D-μCOM 214. The M-μCOM 201 controls the automatic wind-up and rewind operations on the basis of the pulse signals.

The D-μCOM 214 is a microcomputer for printing date data on a film. The D-μCOM 214 prints date data on the film using a 7-segment LED 218 and a printing lens 219 on the basis of a control signal from the M-μCOM 201. The printing operation is performed in synchronism with the pulse signals from the film movement detection unit 215.

An oscillator 220 generates the operation clocks for the D-μCOM 214. By counting the number of clocks, the D-μCOM 214 generates printing data of "year", "month", "day", "hour", and "minute". Switches 221, 222, and 223 are respectively a mode (MOD) switch, a selector (SEL) switch, and an adjust (ADJ) switch. A photographer can select a printing mode, and correct printing data by operating these three switches. Since the selection state of the printing mode and the correction state of printing data are displayed on the date display circuit 208, the photographer need only operate the three switches 221, 222, and 223 while confirming data on the two displays.

The operation of the D-μCOM 214 is controlled by four control signal lines CLK, CEN, SCLK, and SDATA. The CLK line is used for sending clocks from the M-μCOM 201 to the D-μCOM 214.

The D-μCOM 214 need only perform a timepiece count operation while the operation of the M-μCOM 201 is halted. Therefore, the D-μCOM 214 executes a minimum required operation at a minimum required speed using the operation clocks from the oscillator 220. Thus, current consumption of the system can be minimized. However, during an operation of the M-μCOM 201, the D-μCOM 214 must perform date printing control onto the film 217, control based on a switch operation by a photographer, and the like in addition to the timepiece count operation. Therefore, the operation clocks of the oscillator 220 cannot provide a sufficient processing speed.

For this reason, the D-μCOM 214 must be operated using the operation clocks supplied from the M-μCOM 201. Since the clocks from the M-μCOM 201 are utilized as operation clocks in a high-speed operation mode, two oscillators need not be prepared unlike in the first embodiment.

The CEN line is used for sending a communication request signal from the M-μCOM 201 to the D-μCOM 214. Furthermore, the SCLK line and the SDATA line are bidirectional signal lines used for sending serial data.

FIG. 37 shows the arrangement of the film movement detection unit 215 shown in FIG. 36. In FIG. 37, a photointerrupter constituted by an infrared light-emitting diode 224 and a phototransistor 225 is arranged to sandwich the film 217 from both the sides, and outputs a signal according to movement of the film 217 upon movement of perforations. The output signal from the photointerrupter is waveshaped to a pulse signal by a waveshaping circuit 226, and the pulse signal is then converted into a doubled pulse signal by a multiplier 227. By counting this pulse signal, the M-μCOM 201 and the D-μCOM 214 can detect the moving amount of the film.

Figure 38A:
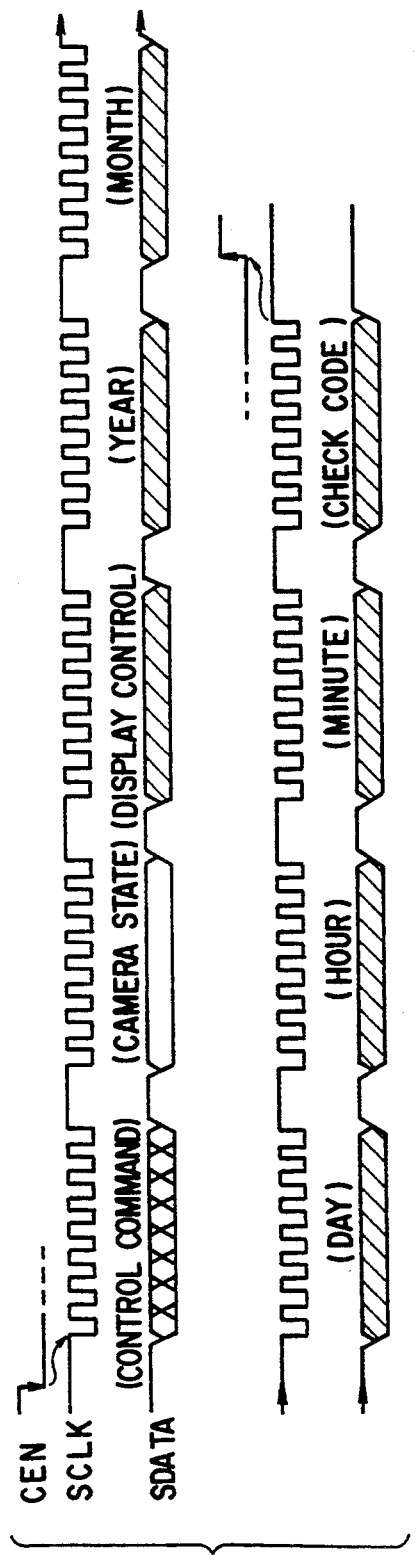
FIGS. 38A, 38B, and 38C are timing charts for explaining the operation of the third embodiment.
Figure 38B:
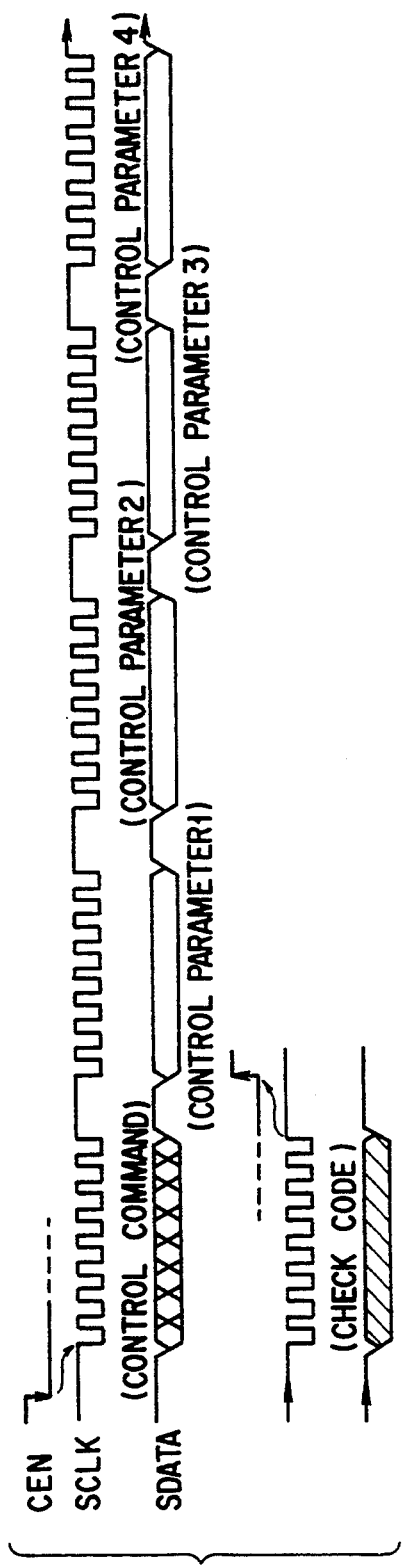
Figure 38C:
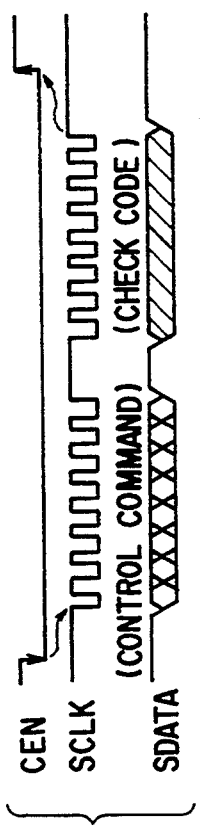

A communication method between the M-μCOM 201 and the D-μCOM 214 will be described below with reference to the timing charts shown in FIGS. 38A, 38B, and 38C. Note that a data communication direction in FIGS. 38A, 38B, and 38C is assumed as follows. That is, hatched portions represent communications from the D-μCOM 214 to the M-μCOM 201, and other portions represent communications from the M-μCOM 201 to the D-μCOM 214.

A communication is started when the M-μCOM 201 sets the CEN line from high level (Hi) to low level (Lo). Since a communication request is generated from only the M-μCOM 201, a master-and-slave relationship can be maintained between the M-μCOM 201 and the D-μCOM 214.

After an elapse of a predetermined wait time after the CEN line is set at Lo, the M-μCOM 201 outputs a control command onto the SDATA line in synchronism with a signal on the SCLK line. The wait time is determined in consideration of the processing time of the D-μCOM 214. The control command is used by the D-μCOM 214 to identify a communication mode. Therefore, in any communication mode, the control command is located at the beginning of communication data.

A communication mode A will be explained below with reference to FIG. 38A.

The M-μCOM 201 outputs, as the first data, a code corresponding to the communication mode A as a control command. The M-μCOM 201 then outputs data including a code representing the state of the camera. With this camera state data, the D-μCOM 214 can discriminate whether the M-μCOM 201 is in a normal operation state or is about to enter a standby mode.

After the M-μCOM 201 outputs the two data, the D-μCOM 214 outputs six data necessary for displaying data on the date display circuit 208 to the M-μCOM 201. After these data are output, the D-μCOM 214 outputs a check code, thus ending the data output operation. Upon reception of the check code, the M-μCOM 201 determines that the communication operation is ended, and sets the CEN line from Lo to Hi. Any communication mode is ended when the M-μCOM 201 receives the check code.

The six data will be described below.

Display control data is data indicating a display method on the date display circuit 208. Following the display control data, data indicating "year", "month", "day", "hour", and "minute" are output. These five data indicate the contents of timepiece counters for counting timepiece reference clocks generated inside the D-μCOM 214. The M-μCOM 201 discriminates based on the upper four bits of the display control data which of the five data are to be displayed on the display circuit 208 (display mode).

Table 1 shows a correspondence between the data and display modes. These data also represent a printing mode used when the D-μCOM 214 prints date data on the film 217. The display mode is changed like "1"→"2"→ . . . →"5"→"1" every time the MOD switch 221 connected to the D-μCOM 214 is turned on.

Lower 4-bit data will be described below. The 4-bit data represents digits to be flashed by the M-μCOM 201 of six digits on the date display circuit 208 (flash mode). Table 2 shows a correspondence between the 4-bit data and the flash modes. In Table 2, hatched digits are assumed to flash. The flash mode is changed like "1"→"2"→"3"→"4"→"1" every time the SEL switch 222 connected to the D-fCOM 214 is turned on.

A photographer operates the SEL switch 222 to flash desired digits. The photographer then operates the ADJ switch 223 connected to the D-μCOM 214. Thus, the D-μCOM 214 changes the contents of the timepiece counters corresponding to the flashing digits, and outputs the changed data to the M-μCOM 201. Therefore, the photographer can change date data while confirming it on the date display circuit 208.

A communication mode B will be described below with reference to FIG. 38B.

The M-μCOM 201 outputs, as the first data, a code corresponding to the communication mode B as the control command. The M-μCOM 201 outputs 4-byte control parameters necessary for the D-μCOM 214 for printing date data on the film 217. Table 3 shows the data contents of the control parameters. A printing time of date data for one digit (i.e., an emission time of a 5-segment LED) is determined by a printing reference time in a control parameter 1, and a film sensitivity coefficient in the upper nibble of a control parameter 2. That is, STDTM×FSK=emission time.

A measurement start timing in the lower nibble of the control parameter 2 indicates a position where the measurement of the moving speed of the film 217 is started. When the M-μCOM 201 starts an auto-loading operation of the film 217, the film movement detection unit 215 outputs pulse signals. The D-μCOM 214 starts measurement of the film moving speed from a timing when pulse signals, the number of which is represented by STRTM, are input after detection of the first pulse signal. The reason why detection of the moving speed is inhibited for a time corresponding to the STRTM pulses is that the moving speed of the film 217 is not stable in an early state of the auto-loading operation.

The D-μCOM 214 measures the interval between pulse signals using a timer, thereby detecting the moving speed of the film 217. The timer value will be referred to as TFV hereinafter. The D-μCOM 214 waits for a printing delay time in a control parameter 3 after detection of the film moving speed, and then starts a printing operation.

Therefore, the printing start position of printing data on the film 217 is determined by data set by STRTM and TMDLY. The interval between numerical characters to be printed is determined by a printing interval coefficient in the upper nibble of a control parameter 4, and TFV. More specifically, date data is printed digit by digit at a time interval determined by TFV×ITVK. A printing format in the control parameter 4 is used for selecting whether the printing operation of date data is started from the lower digit or the upper digit. This format is data determined by the position of the 7-segment LED and the moving direction of the film 217.

A communication mode C will be described below with reference to FIG. 38C. In the communication mode C, the M-μCOM 201 outputs only a code corresponding to the communication mode C as the control command.

Since the communication mode C is a mode executed immediately before the M-μCOM 201 starts a film wind-up operation, the D-μCOM 214 can detect the wind-up timing upon reception of this communication.

The operation of the M-μCOM 201 will be described below with reference to the flow chart shown in FIG. 39.

In step S61, the M-μCOM 201 is reset upon power-ON, and then performs initialization. In step S62, the M-μCOM 201 begins to output operation clocks necessary for the D-μCOM 214 to perform a high-speed operation. In step S63, the M-μCOM 201 sets two timers, and starts the count operations of the timers.

One of the two timers is a display timer. This timer is initialized every time a photographer operates a switch on the camera. When no switch operation is performed for a predetermined period of time (e.g., 90 sec), and the timer counter overflows, the M-μCOM 201 is set in the standby mode to save power consumption. The other timer is a 100-msec timer, and its output is utilized as a sync signal for periodically receiving date data from the D-μCOM 214.

In step S64, it is checked if the display timer overflows. If it is determined that the display timer overflows and is ended, the flow advances to step S65. In step S65, a communication is performed in the communication mode A. In this case, the camera state data represents that the M-μCOM 201 enters the standby mode.

In step S66, the clock output for operating the D-μCOM 214 is stopped. In step S67, all the displays are turned off to inform to a photographer that the standby mode is set. In step S68, an interrupt is enabled. Thereafter, the M-μCOM 201 is set in the standby mode, and its operation is halted. The operation of the M-μCOM 201 can be started by generating an interrupt signal upon operation of a switch by a photographer. When the interrupt signal is generated, the standby mode is canceled, and the M-μCOM 201 restarts an operation from step S62.

If it is determined in step S64 that the display timer does not overflow, the flow advances from step S64 to step S69. In step S69, it is checked if the 100-msec timer overflows. If YES in step S69, the flow advances to step S70; otherwise, the flow advances to step S73.

In step S70, a communication is performed in the communication mode A to receive data necessary for a date display from the D-μCOM 214. In step S71, date data is displayed on the date display circuit 208 on the basis of the input data. Also, display circuit 202 performs an operation for displaying data corresponding to the operating mode of the camera. In step S72, the 100-msec timer is initialized, and thereafter, its count operation is started.

With the operations in steps S69 through S72 described above, data displayed on the date display circuit 208 and display circuit 202 are sequentially updated in correspondence with the operations of the M-μCOM 201 and the D-μCOM 214.

The M-μCOM 201 fetches the state of the setting switch 204 in step S73, and determines an operation mode of the camera according to the operation state of the switch in step S74. In step S75, the M-μCOM 201 fetches a Bv value as the brightness of an object from the photometric processing circuit 206. In addition, the M-μCOM 201 fetches an Sv value as a film sensitivity from the film sensitivity reading circuit 205. In step S76, the M-μCOM 201 calculates a film exposure time on the basis of the Bv and Sv values.

In step S77, the M-μCOM 201 checks the state of the first-stroke switch (1RSW) of the release switch 203. If it is determined that the 1RSW is ON, the flow advances to step S78; otherwise, the flow returns to step S64. In step S78, the M-μCOM 201 initializes the display timer so as not to be set in the standby mode, and starts the count operation. In step S79, the M-μCOM 201 calculates a distance to an object on the basis of data from the distance measurement circuit 209.

In step S80, the M-μCOM 201 checks the state of the second-stroke switch (2RSW) of the release switch 203. If it is determined that the 2RSW is ON, the flow advances to step S81; otherwise, the flow returns to step S64. In step S81, a communication is performed in the communication mode B. The reason why data necessary for determining date printing conditions are sent to the D-μCOM 214 is that the D-μCOM 214 can complete a preparation necessary for the printing operation during the exposure operation of the M-μCOM 201.

Thereafter, in step S82, the lens control circuit 212 drives the photographing lens 218 according to the object distance. In step S83, the M-μCOM 201 drives the lens shutter 216 according to the exposure time using the exposure circuit 210. Upon completion of exposure, the M-μCOM 201 performs a communication in the communication mode C prior to the wind-up operation of the film in step S84. In this manner, when the film is wound up by one frame by the film control circuit 211 in step S85, the photographing operation is ended.

Figure 40:
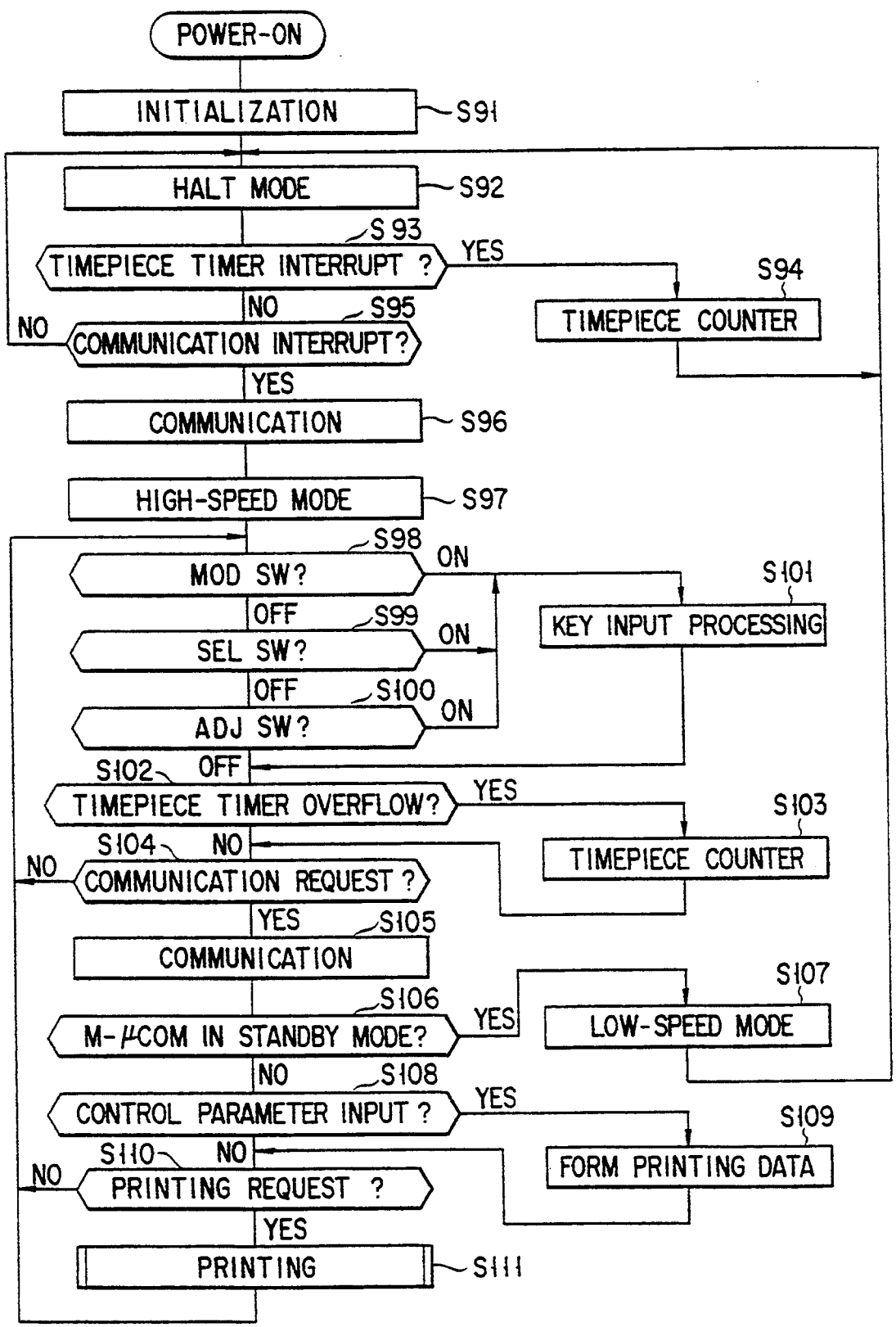
FIG. 40 is a flow chart for explaining the operation of a date printing microcomputer.

The operation of the D-μCOM 214 will be described below with reference to the flow chart shown in FIG. 40.

In step S91, the D-fCOM 214 is reset upon power-ON, and then performs initialization. In this initialization, the D-μCOM 214 inputs predetermined data to the timepiece counters whose contents are used as printing data. In step S92, the D-μCOM 214 is set in a HALT mode. In the HALT mode, only a timepiece timer for counting clocks from the oscillator, and an interrupt function are enabled. The timepiece timer overflows at 1-sec intervals. This overflow state is used as one of interrupt signals.

Therefore, when the five timepiece counters (minute, hour, day, month, and year) are counted up using the interrupt signal as a reference clock, date data can be generated. When the interrupt signal is generated by the timepiece timer, the timepiece counters are updated by processing in steps S93 and S94. After the counters are updated, the flow returns to step S92, and the D-μCOM 214 is set in the HALT state.

The M-μCOM 201 periodically performs a communication with the D-μCOM 214 when it is set in an operative state. More specifically, the M-μCOM 201 sets the CEN line from Hi to Lo. In response to this change in CEN line, a communication interrupt signal is generated, and the flow advances to processing in steps S95 and S96. In step S96, processing corresponding to a communication mode is performed. In step S97, the clocks supplied from the M-μCOM 201 are used as the operation clocks. More specifically, the processing speed of the D-μCOM 214 is increased.

In processing operations in steps S98, S99, and S100, the states of the three switches (MOD, SEL, and ADJ) 221, 222, and 223 connected to the D-μCOM 214 are judged. If it is determined that one of these switches is operated, the flow advances to step S101. In step S101, processing corresponding to the operated switch is executed. If the MOD switch 221 is operated, the D-μCOM 214 changes the printing mode, and display control data to be supplied to the M-μCOM 201. If the SEL switch 222 is operated, the D-μCOM 214 sets a mode in a date data correction state, and selects digits to be corrected. The D-μCOM 214 also changes the display control data to flash the selected digits. Furthermore, if the ADJ switch 223 is operated, the D-μCOM 214 corrects the content of the timepiece counter corresponding to the selected digit.

In step S102, it is checked if the timepiece timer overflows. If YES in step S102, the processing in step S103 is executed to update the timepiece counters. In step S104, it is checked based on the state of the CEN line if a communication request is input. If the CEN line is Hi, the flow returns to step S98; if it is Lo, the flow advances to step S105.

In step S105, processing corresponding to a communication mode is performed. In step S106, the D-μCOM 214 judges the operation state of the M-μCOM 201 on the basis of a code representing the state of the camera. If it is determined that the M-μCOM 201 is about to enter the standby mode, the flow advances to step S107 to stop use of the clocks supplied from the M-μCOM 201. In this case, the clocks output from the oscillator 220 are used as the operation clocks, and the processing speed is decreased, thereby saving power consumption. On the other hand, if it is determined in step S106 that the standby mode is not set, the flow advances to step S108. If the control parameters are input in the communication mode B, the flow advances to step S109.

In step S109, the D-μCOM 214 calculates the product of STDTM and FSK included in the control parameters for emission time control of the 7-segment LED. This value will be referred to as TON hereinafter. The D-μCOM 214 reads out counter values corresponding to date data to be printed from the timepiece counters. The D-μCOM 214 converts the readout values into data for turning on the 7-segment LED. The converted data are 8-byte data (DATA1 through DATA8) including data other than numerals. FIG. 41 shows an example of data other than numerals. When "1990, Sep. 15" is printed, as shown in FIG. 41, portions indicated by "s" in FIG. 41 are also processed as data for turning on the LED.

In step S110, it is checked if the M-μCOM 201 issues a printing request in the communication mode C. If YES in step S110, a "printing" subroutine in step S111 is executed.

Figure 42:
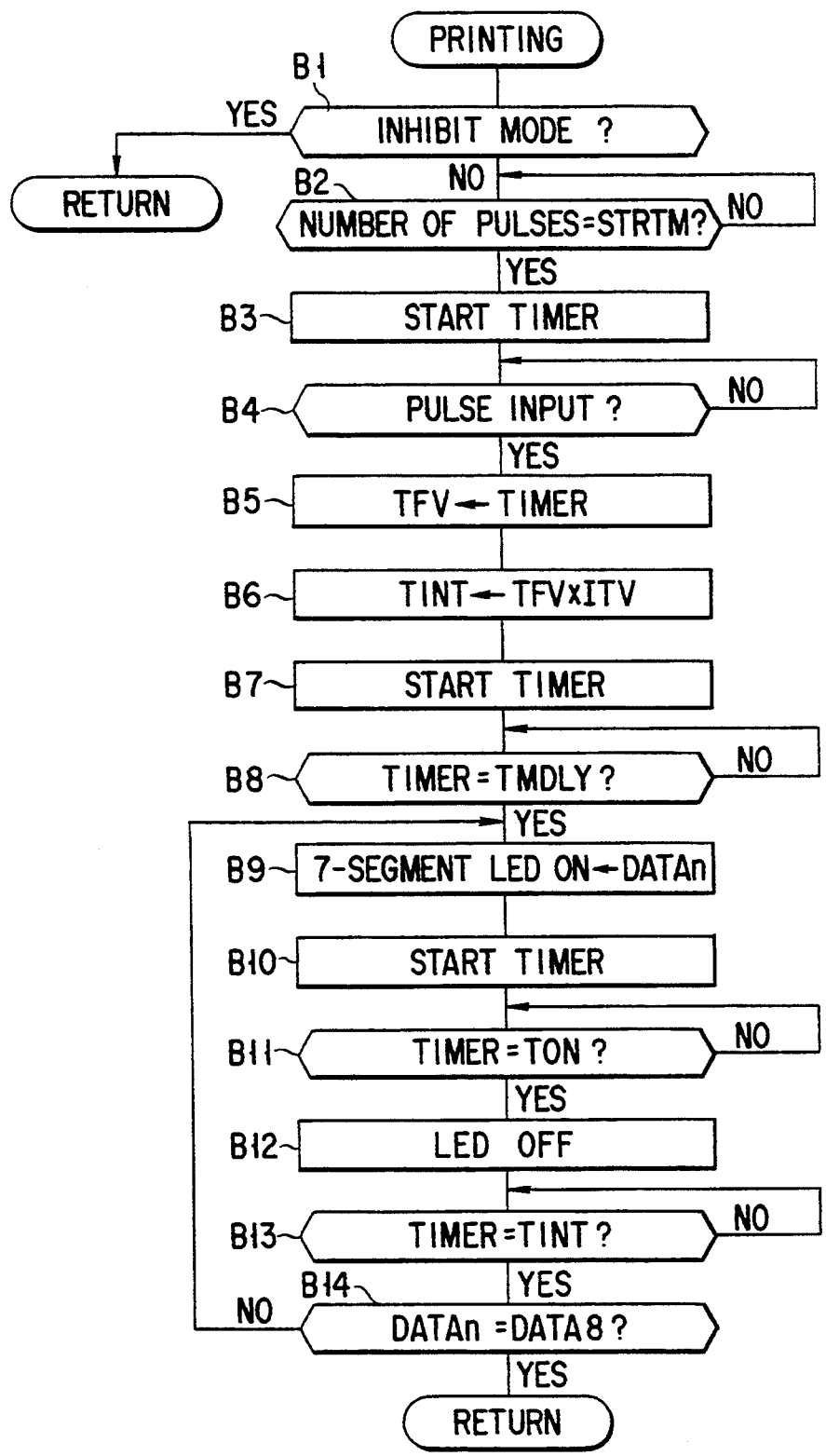
FIG. 42 is a flow chart showing a subroutine for explaining a printing operation.

The "printing" subroutine will be described below with reference to FIG. 42.

In step B1, it is checked if a printing inhibition mode is set. If YES in step B1, the flow returns to the main routine. When the M-μCOM 201 starts the wind-up operation of the film 217, the film movement detection unit 215 outputs pulse signals. In step B2, pulse signals are skipped by the predetermined number of pulses (STRTM) prior to detection of the film speed. In step B3, a timer counter is initialized to detect the film moving speed, and its count-up operation is started. In this manner, the control waits in step B4 until the next pulse signal is output.

If the pulse signal is detected in step B4, the flow advances to step B5, and the timer counter value is fetched as TFV. The value TFV serves as time data corresponding to the moving speed of the film 217. In step B6, TFV is multiplied with a coefficient (ITVK) to yield TINT. TINT determines an interval between numerals (or symbols) to be printed.

Then, a wait time is set prior to the ON operation of the LED. With the processing in steps B7 and B8, the printing operation is delayed by a predetermined period of time (TMDLY). In step B9, data for turning on the 7-segment LED is output from the output port of the D-μCOM 214. Thus, the printing operation for one numeral is started.

In step B10, the timer counter is initialized, and its count-up operation is then started. The control waits for the printing time (TON) in step B11. In step B12, the LED is turned off, thus ending the printing operation for one numeral.

In step B13, the control waits until the timer counter=TINT, thereby forming an interval up to the next numeral (although the timer counter=TINT−TON in a strict sense, there is no problem since TINT>>TON). In step B14, it is checked if the printing operations for 8-byte data are ended.

With the processing in steps B9 through B14 described above, data DATA1 through DATA8 are sequentially printed.

Additional advantages and modifications will readily occur to those skilled in the art. Therefore, the invention in its broader aspects is not limited to the specific details, and representative devices shown and described herein. Accordingly, various modifications may be made without departing from the spirit or scope of the general inventive concept as defined by the appended claims and their equivalents.

TABLE 1

| | UPPER 4-BIT DATA | | | | DISPLAY MODE |
|---|---|---|---|---|---|
| 1 | 0 | 0 | 0 | 0 | DISPLAY OFF MODE |
| 2 | 0 | 0 | 0 | 1 | "YEAR, MONTH, DAY" DISPLAY MODE |
| 3 | 0 | 0 | 1 | 0 | "MONTH, DAY, YEAR" DISPLAY MODE |
| 4 | 0 | 0 | 1 | 1 | "DAY, MONTH, YEAR" DISPLAY MODE |
| 5 | 0 | 1 | 0 | 0 | "DAY, HOUR, MINUTE" DISPLAY MODE |

TABLE 2

| | LOWER 4-BIT DATA | | | | FLASH MODE |
|---|---|---|---|---|---|
| 1 | 0 | 0 | 0 | 0 | INHIBIT FLASHING |
| 2 | 0 | 0 | 1 | 0 | ▯▯·▯▯ ▯▯ |
| 3 | 0 | 1 | 0 | 0 | ▯▯ ▯▯ ▯▯ |

TABLE 2-continued

| LOWER 4-BIT DATA | | | | FLASH MODE |
|---|---|---|---|---|
| 4 | 1 | 0 | 0 | 0 |

TABLE 3

| | DATA CONTENT |
|---|---|
| CONTROL PARAMETER 1 | PRINTING REFERENCE TIME; STDTM |
| CONTROL PARAMETER 2 | FILM SENSITIVITY COEFFICIENT; FSK    MEASUREMENT START TIMING; STRTM |
| CONTROL PARAMETER 3 | PRINTING DELAY TIME; TMDLY |
| CONTROL PARAMETER 4 | PRINTING INTERVAL COEFFICIENT; ITVK    PRINTING FORMAT; PRFLAG |

What is claimed is:

1. A data printing apparatus for a camera using a sheet film having no perforations, comprising;
feed means for feeding said sheet film from an exposure position after an exposure operation is ended;
printing means having a light-emitting element for emitting light in a pattern of a digital numeral representing a date to be printed, and an optical system for focusing the date to be printed on said sheet film, said printing means including means for printing the date while said sheet film is caused to travel by said feed means;
film reflectance detection means, arranged along a traveling path of said sheet film, for detecting an emulsion portion of said sheet film on which an object image from a photographing lens is exposed, and for detecting a remaining frame portion on the basis of a difference in reflectance;
timer means for measuring a moving time between detection of the frame portion and detection of the emulsion portion; and
emission control means for controlling an emission timing of said light-emitting element on the basis of the measured moving time.

2. A data printing apparatus for a camera using a sheet film having no perforations, comprising;
feed means for feeding said sheet film from an exposure position after an exposure operation is ended;
printing means having a light-emitting element for emitting light in a pattern of a digital numeral representing a date to be printed, and an optical system for focusing the date to be printed on said sheet film, said printing means including means for printing the date while said sheet film is caused to travel by said feed means;
first and second film leading end portion detection means, arranged at different positions separated by a predetermined distance from each other along a traveling path of said sheet film, for detecting a leading end portion of said sheet film;
timer means for measuring a moving time required for feeding said sheet film across the predetermined distance by measuring a time interval between detection of the leading end portion of said sheet film by said first film leading end portion detection means and detection of the leading end portion of said sheet film by said second film leading end portion detection means; and
emission control means for controlling an emission timing of said light-emitting element on the basis of the measured moving time.

3. A data printing apparatus for a camera using a sheet film having no perforations, comprising;
feed means for feeding said sheet film from an exposure position after an exposure operation is ended;
printing means having a light-emitting element for emitting light in a pattern of a digital numeral representing a date to be printed, and an optical system for focusing the date to be printed on said sheet 4. A data printing apparatus for a camera using a sheet film having no perforations, comprising:
feed means for feeding said sheet film from an exposure position after an exposure operation is ended;
printing means having a light-emitting element for emitting light in a pattern of a digital numeral representing a date to be printed, and an optical system for focusing the date to be printed on said sheet film, said printing means including means for printing the date while said sheet film is caused to travel by said feed means;
light-emitting elements for forming data to be printed on said sheet film, the number of said light-emitting elements being smaller than the number of characters required for printing all data to be printed on said sheet film, and said light-emitting elements including means for emitting light a plurality of times during traveling of said sheet film to enable printing of all the data;
an optical system for printing the printing data formed by said light-emitting elements on said sheet film while said sheet film is traveling along a traveling path;
traveling speed detection means for projecting infrared light on said sheet film, for receiving light reflected from said sheet film, and for detecting a traveling speed of said sheet film on the basis of a variation in the amount of received reflected light; and
printing control means for controlling emission timings of said light-emitting elements, on the basis of the traveling speed detected by said traveling speed detection means. film, said printing means including means for printing the date while said sheet film is caused to travel by said feed means;
film traveling detection means for detecting a start of traveling of said sheet film fed by said feed means;
film leading end portion detection means, arranged along a traveling path of said sheet film, for detecting a leading end portion of said sheet film;
timer means for measuring a moving time of said sheet film between detection of the start of traveling by said film traveling detection means and detection of the leading end portion of said sheet film by said film leading end portion detection means; and emission control means for controlling an emission timing of said light-emitting element on the basis of the measured moving time.

5. An apparatus according to claim 4, wherein said traveling speed detection means comprises a photoreflector arranged along the traveling path of said sheet film, and detects the traveling speed of said sheet film by measuring a time required for said sheet film to change from a high reflectance portion to a low reflectance portion during traveling.

6. An apparatus according to claim 4, wherein said traveling speed detection means comprises first and second photosensors, arranged along the traveling path of said sheet film, and detects the traveling speed of said sheet film on the basis of a time between detection of an end portion of said sheet film by said first photosensor and detection of the end portion of said sheet film by said second photosensor.

7. An apparatus according to claim 4, wherein said traveling speed detection means comprises a detection switch for detecting a start of traveling of said sheet film, and a photosensor arranged along the traveling path of said sheet film, and detects the traveling speed of said sheet film on the basis of a time between detection by said detection switch and detection by said photosensor.

8. An apparatus according to claim 4, wherein said light-emitting elements are form two digits of digital numerals representing at least one of year, month and day.

9. An apparatus according to claim 8, wherein said light-emitting elements perform a printing operation using one of the two digits of the digital numerals, and thereafter, perform another printing operation using the other digital numeral.

10. An apparatus according to claim 8, wherein said light-emitting elements include means for providing a dot on an upper left portion of the two digits of digital numerals, and for printing the dot before the numerals when the year is expressed by the numerals.

11. An apparatus according to claim 8, wherein said light-emitting elements include means for providing a dot on an upper left portion of the two digits of digital numerals, and the dot before the numerals when a time is expressed by the numerals.

12. An apparatus according to claim 4, wherein said printing control means includes means for predicting the traveling speed upon printing by multiplying the traveling speed detected by said traveling speed detection means by a coefficient, and controls the emission timings of said light-emitting elements based on the predicted traveling speed.

13. An apparatus according to claim 4, wherein said printing control means includes means for inhibiting printing when the traveling speed detected by said traveling speed detection means is larger than a first predetermined value.

14. An apparatus according to claim 4, wherein said printing control means includes means for inhibiting printing when the traveling speed detected by said traveling speed detection means is smaller than a second predetermined value.

15. A printing apparatus for a camera, comprising:
exposure means for exposing an object image focused by a photographing lens on a film;
moving means for moving said film from an exposure position after an exposure operation of said exposure means is ended;
printing means having a light-emitting element for printing data on said film;
moving speed detection means for detecting a moving speed of said film moved by said moving means; and
printing control means for controlling a light emission timing of said light-emitting element, which emits light a plurality of times during traveling of said film, on the basis of the moving speed of said film detected by said moving speed detection means;
wherein said printing control means comprises:
means for predicting a moving speed of said film upon printing by multiplying the moving speed detected by said moving speed detection means with a coefficient; and
means for controlling the light emission timing on the basis of the predicted moving speed.

16. A data printing apparatus comprising:
(1) film feed means for feeding a film;
(2) a light-emitting unit, including a plurality of light-emitting elements which are arranged two dimensionally, for causing a combination of light-emitting elements to emit light so as to optically print at least one character or symbol on a surface of said film; and
(3) emission control means for causing said light-emitting unit to repetitively emit light during traveling of said film;
wherein said emission control means comprises:
(a) projection means for projecting infrared light to the traveling film;
(b) light-receiving means for receiving the projected light via said film;
(c) speed detection means for detecting a traveling speed of said film on the basis of a change over time in a light amount received by said light-receiving means; and
(d) means for controlling a light emission timing on the basis of the detected film traveling speed after the film traveling speed is detected by said speed detection means; and
wherein:
said means for controlling said light emission timing includes means for inhibiting a printing operation when the film traveling speed detected by said speed detection means is larger than a first predetermined value.

17. A data printing apparatus, comprising:
(1) film feed means for feeding a film;
(2) a light-emitting unit, including plurality of light-emitting elements which are arranged two dimensionally, for causing a combination of light-emitting elements to emit light so as to optically print at least one character or symbol on a surface of said film; and
(3) emission control means for causing said light-emitting unit to repetitively emit light during traveling of said film;
wherein said emission control means comprises:
(a) projection means for projecting infrared light to the traveling film;
(b) light-receiving means for receiving the projected light via said film;
(c) speed detection means for detecting a traveling speed of said film on the basis of a change over time in a light amount received by said light-receiving means; and (d) means for controlling a light emission timing on the basis of the detected film traveling speed after the film traveling speed is detected by said speed detection means; and wherein:
said means for controlling said light emission timing includes means for inhibiting a printing operation when the film traveling speed detected by said speed detection means is smaller than a second predetermined value.

18. A data printing apparatus comprising:
(1) film feed means for feeding a film;
(2) a light-emitting unit, including a plurality of light-emitting elements which are arranged two dimensionally, for causing a combination of light-emitting elements to emit light so as to optically print at least one character or symbol on a surface of said film; and
(3) emission control means for causing said light-emitting unit to repetitively emit light during traveling of said film;

wherein said emission control means comprises:
(a) projection means for projecting infrared light to the traveling film;
(b) light-receiving means for receiving the projected light via said film;
(c) speed detection means for detecting a traveling speed of said film on the basis of a change over time in a light amount received by said light-receiving means;
(d) means for controlling a light emission timing on the basis of the detected film traveling speed after the film traveling speed is detected by said speed detection means;
(e) means for predicting a moving speed of said film upon printing by multiplying a moving speed of said film detected by said speed detection means with a coefficient; and
(f) means for further controlling the light emission timing on the basis of the predicted moving speed of said film upon printing.

19. A data printing apparatus comprising:
(1) film feed means for feeding a sheet film;
(2) a light-emitting unit, including a plurality of light-emitting elements which are arranged two dimensionally, for causing a combination of light-emitting elements to emit light so as to optically print at least one character or symbol on a surface of said sheet film; and
(3) emission control means for causing said light-emitting unit to repetitively emit light during traveling of said sheet film, wherein said emission control means comprises:
(a) speed detection means for detecting a traveling speed of said sheet film on the basis of an output from a photosensor; and
(b) means for controlling timings of the repetitive light emission operations on the basis of a predicted traveling speed of said sheet film after the film traveling speed is detected by said speed detection means, said light emission operations being performed after exposure is finished.

20. A data printing apparatus comprising:
(1) film feed means for feeding a film;
(2) a light-emitting unit for causing a combination of a plurality of light-emitting segments to emit light so as to optically print at least one character or symbol on a surface of said film; and
(3) emission control means for causing said light-emitting unit to repetitively emit light during traveling of said film, wherein said emission control means comprises:
(a) speed detection means for detecting a traveling speed of said film on the basis of an output from a photosensor; and
(b) means for controlling timings of the repetitive light emission operations on the basis of the traveling speed of said film; and
said speed detection means comprises:
means for measuring a reflectance of the surface of said film and for producing a reflectance signal corresponding to the measured reflectance; and
means for obtaining the traveling speed of said film on the basis of a change in the reflectance signal during feeding of said film.

21. A data printing apparatus comprising:
(1) film feed means for feeding a film;
(2) a light-emitting unit for causing a combination of a plurality of light-emitting segments to emit light so as to optically print at least one character or symbol on a surface of said film; and
(3) emission control means for causing said light-emitting unit to repetitively emit light during traveling of said film, wherein said emission control means comprises:
(a) speed detection means for detecting a traveling speed of said film on the basis of an output from a photosensor; and
(b) means for controlling timings of the repetitive light emission operations on the basis of the traveling speed of said film; and
a photointerrupter, having a light projecting portion and a light receiving portion between which the film travels, arranged in a traveling path of said film, for detecting perforations provided in said film, and for producing an output; and
means for calculating the traveling speed of said film on the basis of a change in the output from said photointerrupter.

22. A data printing apparatus for printing data on a sheet film used in a camera having a self development function, comprising:
means for feeding an exposed sheet film from a film pack;
traveling speed detection means for detecting a traveling speed of said sheet film as it is fed from the film pack;
a light-emitting unit for causing a combination of a plurality of light-emitting elements to emit light so as to optically print at least one character or symbol on a surface of said sheet film; and
emission means for causing said light-emitting unit to repetitively emit light during traveling of said sheet film, said emission means including means for controlling timings of the repetitive emission operations on the basis of the detected traveling speed after detection of the film traveling speed to print at least one character at each respective light emission by said light-emitting unit; and wherein:
said traveling speed detection means comprises a photoreflector arranged along a traveling path of said sheet film, and detects the traveling speed of said sheet film by measuring a time required for said sheet film to change from a high reflectance portion to a low reflectance portion during traveling of said sheet film.

23. An apparatus according to claim 22, wherein said traveling speed detection means further comprises first and second photosensors, arranged along a traveling path of said sheet film, and detects the traveling speed of said sheet film on the basis of a time period between detection of an end portion of said sheet film by said first photosensor and detection of the end portion of said sheet film by said second photosensor.

24. An apparatus according to claim 22, wherein said traveling speed detection means further comprises a detection switch for detecting a start of traveling of said sheet film and a photosensor arranged along a traveling path of said sheet film, and detects the traveling speed of said sheet film on the basis of a time between detection by said detection switch and detection by said photosensor.

25. A printing apparatus for a camera, comprising:
exposure means for exposing an object image focused by a photographing lens on a film;
moving means for moving said film from an exposure position after an exposure operation of said exposure means is ended;
data recording means for recording data on said film;
moving speed detection means for detecting a moving speed of said film moved by said moving means; and
recording control means for controlling a recording timing of said data recording means, on the basis of the moving speed of said film detected by said moving speed detection means;
wherein said recording control means comprises:
means for predicting a moving speed of said film upon data recording by multiplying the moving speed detected by said moving speed detection means with a coefficient; and
means for controlling the recording timing on the basis of the predicted moving speed.

26. A data recording apparatus comprising:
(1) film feed means for feeding a film;
(2) data recording means including a light-emitting unit which includes a plurality of light-emitting elements which are arranged two dimensionally, for causing a combination of light-emitting elements to emit light so as to optically record at least one character or symbol on a surface of said film; and
(3) recording control means for causing said light-emitting unit to repetitively emit light during traveling of said film;
wherein said recording control means comprises:
(a) projection means for projecting infrared light to the traveling film;
(b) light-receiving means for receiving the projected light via said film;
(c) speed detection means for detecting a traveling speed of said film on the basis of a change over time in a light amount received by said light-receiving means; and
(d) means for controlling a light emission timing on the basis of the detected film traveling speed after the film traveling speed is detected by said speed detection means;
(e) means for predicting a moving speed of said film upon data recording by multiplying the moving speed of the film during data recording as detected by said speed detection means with a coefficient, and
(f) means for controlling the light emission timing on the basis of the predicted moving speed.

27. A data recording apparatus comprising:
(1) film feed means for feeding a sheet film;
(2) a light-emitting unit, including a plurality of light-emitting elements which are arranged two dimensionally, for causing a combination of light-emitting elements to emit light so as to optically record at least one character or symbol on a surface of said sheet film; and
(3) emission control means for causing said light-emitting unit to repetitively emit light during traveling of said sheet film to record said at least one character or symbol on said sheet film,
wherein said emission control means comprises:
(a) speed detection means for detecting a traveling speed of said sheet film on the basis of an output from a photosensor; and
(b) means for controlling timings of the repetitive light emission operations on the basis of a predicted traveling speed of said sheet film after the film traveling speed is detected by said speed detection means, said light emission operations being performed after exposure is finished.

* * * * *